(12) United States Patent
Ishida et al.

(10) Patent No.: US 6,436,524 B1
(45) Date of Patent: *Aug. 20, 2002

(54) MAGNETO-OPTICAL RECORDING MEDIUM

(75) Inventors: Masaya Ishida; Takeo Kawase, both of Nagano (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/913,974
(22) PCT Filed: Jul. 30, 1996
(86) PCT No.: PCT/JP96/02148
§ 371 (c)(1),
(2), (4) Date: Jan. 13, 1998
(87) PCT Pub. No.: WO97/26652
PCT Pub. Date: Jul. 24, 1997

(30) Foreign Application Priority Data

Jan. 19, 1996 (JP) .............................. 8-007215
Mar. 29, 1996 (JP) .............................. 8-077643

(51) Int. Cl.$^7$ .............................. G11B 5/66
(52) U.S. Cl. ................ 428/332; 423/336; 423/694 ML; 423/694 RE; 423/694 MM; 423/900; 369/13; 369/14; 369/116; 369/110; 369/275.2; 360/59; 360/114; 365/122
(58) Field of Search .................. 428/694 ML, 694 RE, 428/694 MM, 900, 332, 336; 369/13, 14, 116, 110, 275.2; 360/59, 114; 365/122

(56) References Cited

U.S. PATENT DOCUMENTS 5,648,162 A * 7/1997 Hirokane .................... 478/332
5,691,963 A * 11/1997 Hirokane .................... 369/13
5,772,856 A * 6/1998 Kawase .................... 204/192.2

FOREIGN PATENT DOCUMENTS

| JP | 61-296551 | 12/1986 |
| JP | 4-67334 | 3/1992 |
| JP | 4-370550 | 12/1992 |
| JP | WO 94/03892 | 2/1994 |
| JP | 7-244877 | 9/1995 |

* cited by examiner

Primary Examiner—Leszek Kiliman
(74) Attorney, Agent, or Firm—Harness, Dickey & Pierce, P.L.C.

(57) ABSTRACT

When recording using magnetic field modulation recording, the magneto-optical recording medium which is disclosed is capable of satisfactory recording with a low magnetic field. This recording medium is a layered superposition of a recording layer 13 and an auxiliary recording layer 14 having a film thickness of less than or equal to 100 angstroms. The recording layer 13 is a film having an easy perpendicular axis of magnetization whose value of magnetization at room temperature is at least 150 emu/cc, and for example a heavy rare earth—transition metal alloy, a magnetic multilayer film which employs a precious metal, an oxide like a garnet or Spinel ferrite, or some other magnetic alloy may be used. The auxiliary recording layer 14 is typically a heavy rare earth—transition metal alloy, and has a Curie temperature higher (desirably at least 30K higher) than that of the recording layer 13. It is desirable to further provide a stabilizing layer superimposed upon the recording layer 13 which has a lower Curie temperature and also a higher coercive field at room temperature than the recording layer recording layer 13. If $HRE_x(Fe_{1-y}Co_y)_{1-x}$ is used for the recording layer recording layer 13 (here HRE is a heavy rare earth metal), it is desirable that $0.08 \leq x \leq 0.20$ and also $0.0 \leq y \leq 0.3$.

27 Claims, 35 Drawing Sheets

AUXILIARY RECORDING LAYER THICKNESS(ANGSTROMS)

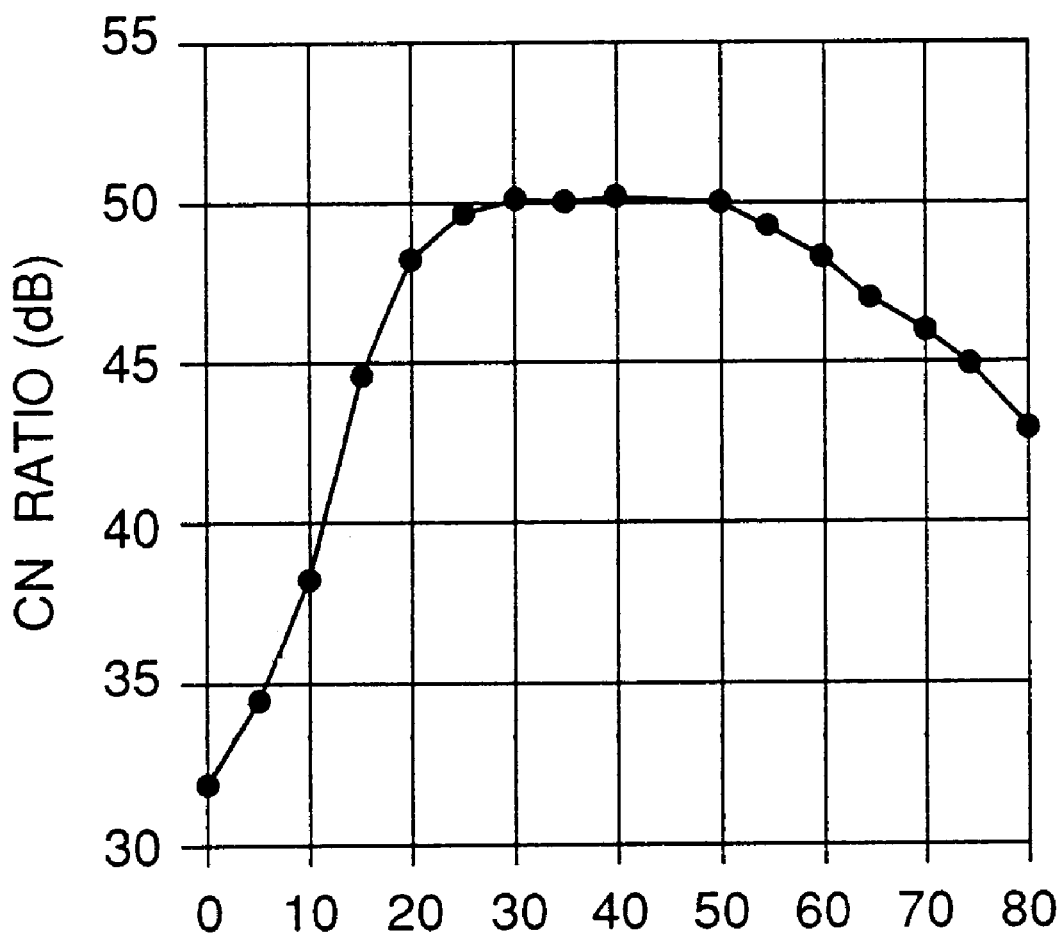

RECORDING LAYER

EXTERNAL MAGNETIC FIELD    MAGNETIZATION

MAGNETIC WALL

MAGNETIC WALL

AUXILIARY RECORDING LAYER
THICKNESS(ANGSTROMS)

AUXILIARY RECORDING LAYER
THICKNESS(ANGSTROMS)

MAGNETO-OPTICAL RECORDING MEDIUM

FIELD OF THE INVENTION

The present invention relates to a magneto-optical recording medium, and in particular relates to a magneto-optical recording medium adapted to the use of a magnetic field modulation recording method.

BACKGROUND OF THE INVENTION

Methods for recording upon magneto-optical recording media can be broadly divided into optical modulation methods and magnetic field modulation recording methods. An optical modulation method is a method in which recording marks (magnetic domains) are formed by blinking a recording laser while applying a constant magnetic field to the medium. And a magnetic field modulation recording method is a method in which recording marks are formed upon the medium by varying a magnetic field while illuminating the medium with a recording laser at a constant power or with pulses of constant period and constant width. A magnetic field modulation recording method can be easily overwritten, and is suitable for mark edge recording. Here, mark edge recording means a method of recording in which channel bits are established in correspondence to the positions of the leading and trailing edges of the recording marks (magnetic domains) which are formed upon the magneto-optical recording medium. Position recording is an alternative to mark edge recording. Position recording is a recording method in which channel bits are established in correspondence to the positions of the centers of the recording marks. Mark edge recording can be applied for recording at a higher density than position recording, but more accurate recording mark control is required than with position recording. With magnetic field modulation recording methods accurate recording mark control is easy since the edges of the recording marks are determined almost entirely only by the timings of reversals of the magnetic field, and accordingly magnetic field modulation recording methods are suitable for mark edge recording. In contrast, with optical modulation methods, since the edges of the recording marks are determined by the on/off timing of the laser, accordingly the positions of the edges vary according to the temperature of the medium and according to the lengths of the recording marks (i.e., according to the amounts of heat accumulated in the recording marks). Thus, accurate recording mark control is difficult with optical modulation methods.

However, a magnetic head is required with a magnetic field modulation recording method, and moreover it is necessary for the inductance of the head to be minimized and for high currents to be switched, in order for the magnetic field to be reversed at high speed. A flying magnetic head such as disclosed in Japanese Patent Laying Open Publication Showa 63-217548 is advantageous in practice, so as to bring the magnetic head as close as possible to the recording layer of the recording medium, in order to ensure that the magnetic field which acts upon the recording layer is as great as possible.

In any case, with a magnetic field modulation recording method, it is desirable for the magneto-optical recording medium to have the characteristic of being able to be recorded with a low magnetic field, in order to utilize as low a magnetic field strength as possible. In order to reduce the magnetic field which is required for recording, it is disclosed upon page 53 of "Magnetics Study Group Materials: MAG-86-95" to optimize the amounts of heavy rare earth in a heavy rare earth —Fe—Co three element composition recording layer. And upon page 268 of "DIGEST of 11th Annual Conference on Magnetics in Japan" it is described further to include a fourth element such as Nd, in order to enhance the characteristics in a low magnetic field. Japanese Patent Laying Open Publication Showa 62-128040 teaches to exchange-couple magnetic layers of different compositions so as to reduce the stray magnetic field, in order to improve the responsiveness to external magnetic fields. Further, in order to reduce the required intensity for the modulation magnetic field, Japanese Patent Laying Open Publication Showa 61-188758 discloses the concept of laminating together a layer with perpendicular magnetization and a layer with in-plane magnetization, so as efficiently to promote the magnetic flux in the perpendicular magnetization layer.

Even using these prior arts, it is difficult in practice to lower the required intensity of the modulation magnetic field below 100 Oersteds. Further, it may happen that the addition of the fourth element or of the additional layer with in-plane magnetization has the secondary effect of deteriorating the characteristics of the reproduced signals. In view of this problem, Japanese Patent Laying Open Publication Heisei 6-309711 teaches to provide, next to the recording layer of the magneto-optical recording medium, an ultra thin magnetic layer having a higher Curie temperature than that recording layer. The magnetic field required for modulation is considerably reduced by this layer construction. However, further reduction of the modulation magnetic field is desirable.

OBJECTIVE OF THE INVENTION

The objective of the present invention is to provide a magneto-optical recording medium suitable for a magnetic field modulation recording method, with which recording can be properly performed with a smaller modulation magnetic field than in the prior art.

SUMMARY OF THE INVENTION

The magneto-optical recording medium of the present invention comprises a recording layer and an auxiliary recording layer having a film thickness of less than or equal to 100 angstroms. This ultra-thin auxiliary recording layer enhances the magnetic characteristics of the recording layer and improves the magnetic field sensitivity of the medium. In other words, since the auxiliary recording layer enhances the magnetic characteristics of the recording layer, thereby it becomes possible to employ a material for the recording layer from which a film having an easy perpendicular axis of magnetization cannot easily be formed as a single layer because the value of its magnetization is great. Accordingly the magnetic field sensitivity of the medium is enhanced, and as a result it is possible to obtain a sufficient CN ratio even when recording is performed with a weak magnetic field. This type of medium is suitable for methods of recording using magnetic field modulation recording. Of course, it can also be applied to methods of recording using other modulation methods.

It is typically possible to use a heavy rare earth-transition metal alloy for the recording layer. Using "HRE" has a term for "heavy rare earth metal", if an alloy of composition given by $HRE_x(Fe_{1-y}Co_y)_{1-x}$ is used for the recording layer, it is necessary that $0.08 \leq x \leq 0.20$. Desirably, $0.08 \leq x \leq 0.20$ and also $0.0 \leq y \leq 0.3$. More desirably, $0.11 \leq x \leq 0.16$ and also $0.0 \leq y \leq 0.3$. Here, for example, it is possible to select one or a plurality of elements from Tb, Dy, and Gd for the heavy rare earth metal HRE.

The recording layer is not limited to being the above described heavy rare earth-transition metal alloy; other materials may be employed. For example, it would be acceptable to utilize a magnetic multilayer film of Pt/Co, Pd/Co, Pt/Fe, Au/Co, or Au/Fe; or an alloy like PtMnSb, CuCrSeBr, PtCo, or PdCo would also be acceptable; or, again, it is possible to utilize an oxide film like spinel ferrite or garnet. Whichever be the case, for the recording layer it is desirable to utilize a magnetic material of which the value of the magnetization at room temperature is at least 150 emu/cc.

It is necessary for the auxiliary recording layer to have a higher Curie temperature than that of the recording layer. Desirably, the Curie temperature of the auxiliary recording layer is at least 30K higher than that of the recording layer. It is typically possible to use a heavy rare earth-transition metal alloy for the auxiliary recording layer. If an alloy of composition given by $HRE_v(Fe_{1-w}Co_w)_{1-v}$ is used for the auxiliary recording layer, it is desirable that $0.25 \leq v \leq 0.35$ and also $0.2 \leq w \leq 1.0$.

It is possible to use, not only a two layered structure of a recording layer and an auxiliary recording layer, but also a three layered structure of a stabilizing layer, a recording layer, and an auxiliary recording layer. The stabilizing layer has a thickness thinner than that of the recording layer, and it moreover has a Curie temperature lower than that of the recording layer and a coercivity at room temperature greater than that of the recording layer.

It is possible to prevent deterioration in the magnetic characteristics of the medium due to lapse of time by including Al, Ti, or Cr in the recording layer. For example, when A represents Al, Ti, or Cr and the composition of the recording layer is given by $HRE_x(Fe_{1-y}Co_y)_{1-x-z}A_z$, then it is desirable that $0 \leq z \leq 0.12$, and it is more desirable that $0.11 \leq x \leq 0.16$ and also $0.0 \leq z \leq 0.08$.

It is possible to increase the Kerr rotation in the short wavelength region by including Pr, Nd, or Sm in the recording layer. For example, when B represents Pr, Nd, or Sm and the composition of the recording layer is given by $HRE_x(Fe_{1-y}Co_y))_{1-x-z}B_z$, then it is desirable that $0 \leq z \leq 0.12$, and it is more desirable that $0.11 \leq x \leq 0.16$ and also $0.0 \leq z \leq 0.08$.

According to the theory of the present invention, it is also possible to apply a recording film of a two layer structure, made as a layered superposition of a recording layer and an auxiliary recording layer, or a recording film of a three layer structure, made as a layered superposition of a stabilizing layer, a recording layer and an auxiliary recording layer, as a magneto-optical recording medium which can be replayed using a Magnetically-Induced Super-Resolution (MSR) method. Various types of structure for magneto-optical recording mediums for use with MSR methods are known, such as for example ones having a replay layer additional to the recording film, and ones further having a control layer additional to the replay layer. With any of these types of magneto-optical recording medium, the magnetic field sensitivity of the medium is increased by using a recording film according to the present invention of a two layer structure or of a three layer structure. As a result, it becomes easy to perform recording at a high density suitable for replaying by a MSR method.

BRIEF DESCRIPTION OF THE DRAWINGS

FIG. 2 is a figure showing the relationship between the film thickness and the CN ratio for an auxiliary recording layer.

FIG. 3 is a model view for magneto-optical recording, in which in FIG. 3(c), the slantingly hatched portions show regions which are magnetized in a specific direction, while the remainder shows a region which is magnetized in the opposite direction.

THE DESCRIPTION OF THE PREFERRED EMBODIMENTS

1. Embodiment 1

Figure 1:
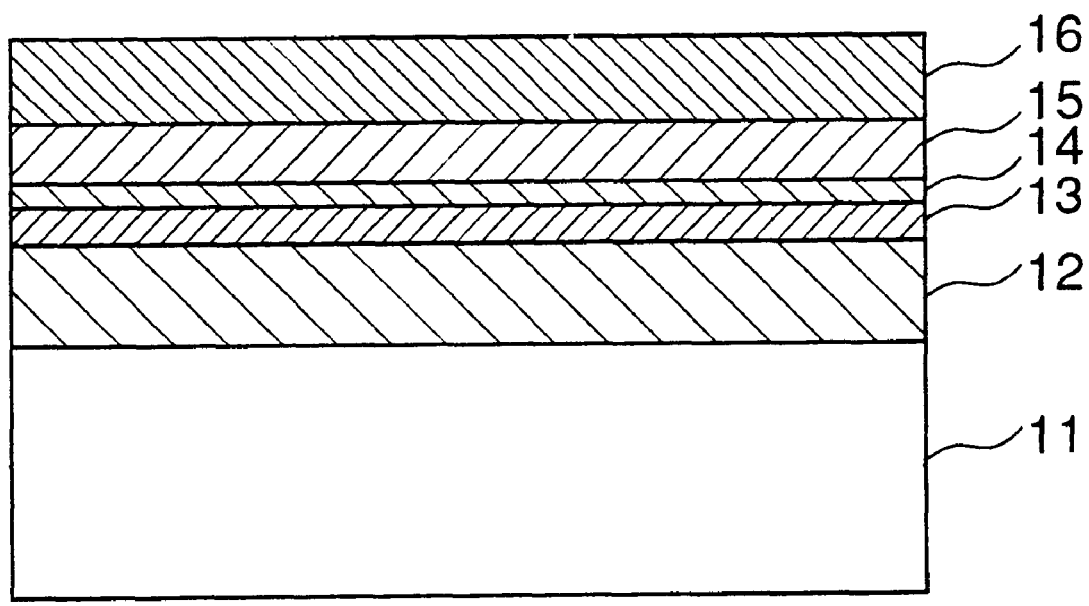
FIG. 1 is a sectional view of a magneto-optical recording medium according to a first embodiment of the present invention.

FIG. 1 shows the sectional structure of a first embodiment of the magneto-optical recording medium suitable for recording by a magnetic field modulation method of the present invention. A first dielectric layer 12, a recording layer 13, an auxiliary recording layer 14, a second dielectric layer 15, and a reflective layer 16 are sequentially laminated upon the surface of a transparent substrate 11. The recording layer 13 and the auxiliary recording layer 14 are rare earth-transition metal alloys. The Curie temperature of the auxiliary recording layer 14 is greater than that of the recording layer 13. The thickness of the auxiliary recording layer is less than or equal to 100 angstroms. The exemplary materials for these layers are as follows: the transparent substrate 11 is poly carbonate (PC) substrate; the first dielectric layer 12 and the second dielectric layer 15 are layers of Al—Si—N; the recording layer 13 is a layer of Tb—Fe—Co; the auxiliary recording layer is a layer of Dy—Fe—Co; and the reflective layer 15 is a layer of Al.

In order to increase the Curie temperature of the auxiliary recording layer 14 above that of the recording layer 13, it is desirable to increase the amount of the transition metal contained in the rare earth-transition metal alloy, particularly the amount of Co, or to increase the amount contained of Gd as the rare earth metal. It is easy to raise the Curie temperature of the auxiliary recording layer 14 by 10 degrees or more above that of the recording layer 13 by this type of adjustment of their compositions.

The following experiments were performed in order to determine the characteristics of this embodiment.

(1) Experiment 1: Relationship between the film thickness of the auxiliary recording layer 14 and the magnetic field sensitivity.

A rare earth-transition metal alloy having the composition Tb0.14(Fe0.96Co0.04)0.86 was used as the recording layer 13. The suffixed numbers indicate atomic proportions. The recording layer 13 was formed by DC magnetron sputtering, using a target manufactured by alloy casting, under the following conditions: argon gas pressure 1.2 mTorr; and supplied power 300 W. Its Curie temperature was 150 degrees centigrade.

A rare earth-transition metal alloy having the composition Dy0.30(Fe0.50Co0.50)0.70 was used as the auxiliary recording layer 14. The auxiliary recording layer 14 was formed by DC magnetron sputtering, using a target manufactured by alloy casting, under the following conditions: argon gas pressure 0.4 mTorr; and supplied power 100 W. Its Curie temperature was 280 degrees centigrade.

AlSiN was used as the material for the first dielectric layer 12 and for the second dielectric layer 15. The first dielectric layer 12 and the second dielectric layer 15 were formed by a sputtering method using an alloy target made from AlSi under the following conditions: the sputter gas was 60% Ar+40% N2; the gas pressure was 1.7 mTorr; and the supplied power was 2500 W RF. And the reflective layer 16 was formed by sputtering using an Al target under the following conditions: argon gas pressure 1.5 mTorr; and supplied power 660 W.

Test pieces were made with the film thickness of the auxiliary recording layer 14 ranging from 0 to 80 angstroms by steps of 5 angstroms, using the method of successively layering the first dielectric layer 12, the recording layer 13, the auxiliary recording layer 14, the second dielectric layer 15, and the reflective layer 16 in order upon the transparent substrate 11, and with the film thicknesses of the first dielectric layer 12, the recording layer 13, the second dielectric layer 15 and the reflective layer 16 being respectively 600, 200, 200, and 600 angstroms. And the sensitivities of these test pieces to the modulation magnetic field were investigated. It should be understood that these are not actually measured film thickness values for the auxiliary recording layer 14, but are values calculated from the speed of formation of the auxiliary recording layer 14 which was measured in advance, and from the time periods for sputtering which were actually measured. Recording upon the test pieces was performed under the following conditions:

linear velocity 1.4 m/s; recording frequency 720 kHz; power of the recording laser 5.8 mW; and modulation magnetic field ±35 Oersted.

FIG. 2 is a figure showing the relationship between the film thickness of the auxiliary recording layer 14 and the CN ratio. It will be understood that a beneficial effect for improvement of the CN ratio was apparent just by forming an ultra thin auxiliary recording layer 14 of 10 angstroms thickness. The CN ratio when recording was performed using a low modulation magnetic field of ±35 Oersted strongly depended upon the thickness of the auxiliary recording layer 14, and a beneficial effect was observed over the range from 15 angstroms to 70 angstroms, and in particular a remarkably great CN ratio was obtained in the region from 25 angstroms to 50 angstroms. Above 55 angstroms, the CN ratio diminished along with increase of film thickness.

(2) Theoretical considerations: the role of the auxiliary recording layer 14.

Figure 3A:
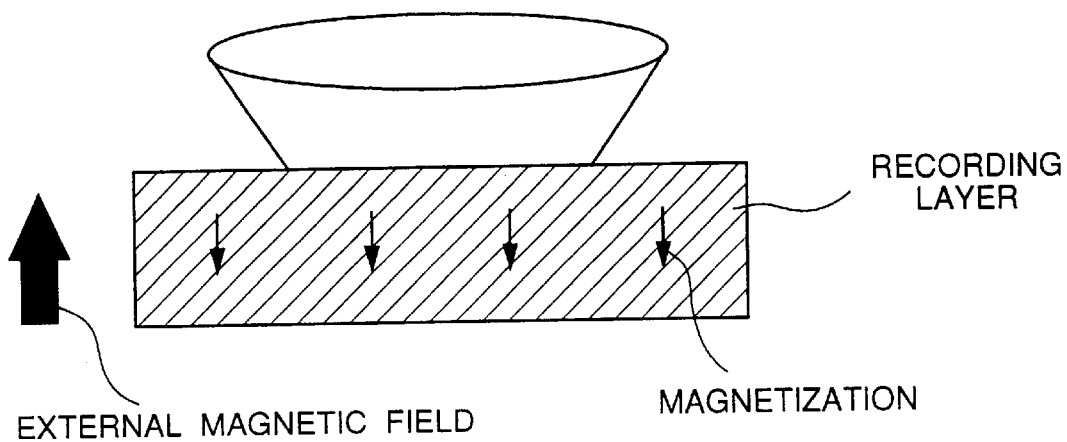
FIG. 3(a) shows the state before recording.
Figure 3B:
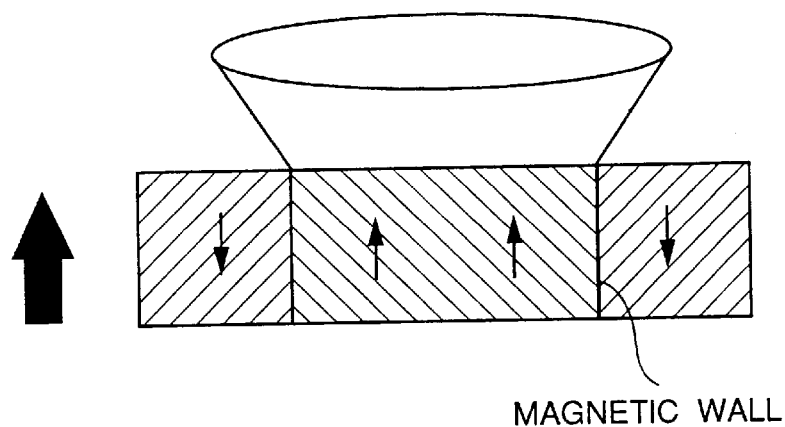
FIG. 3(b) shows the state after recording.

The cause of the phenomenon of the magnetic field sensitivity becoming extremely good when the auxiliary recording layer 14 is made very thin is conjectured to be as follows. FIG. 3 shows the manner in which the domains are formed within the magnetic layer during magneto-optical recording. The situation before formation of a domain is shown in FIG. 3(a), while the situation after formation of the domain is shown in FIG. 3(b). When the domain is formed, the energy of this domain is reduced by just the value of the magnetostatic energy, and is increased by just the value of the magnetic wall energy. If the magnetization is termed Ms, the external magnetic field is termed Hex, and the angle subtended between Hex and Ms is termed θ, then the magnetostatic energy is given by Ms·Hex·cos θ. The magnetic wall energy is given by the product of the magnetic wall energy density and the area of the magnetic walls.

Figure 3C:
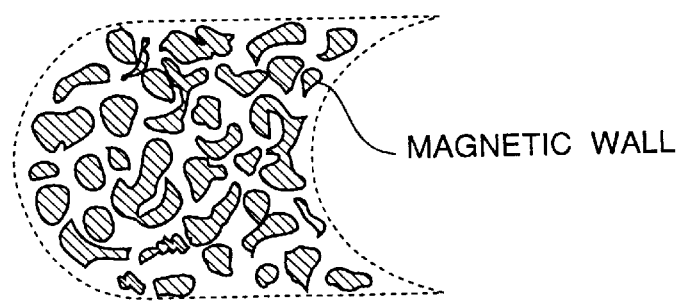
FIG. 3(c) shows the structure of the maze domains.

In order to form a domain in a low magnetic field, it is desirable to have a magnetic layer with which the drop of energy due to formation of the domain is great, in other words a magnetic layer which has the characteristic that the contribution of the magnetostatic energy is great. However, with a layer with which the magnetostatic energy is great, or in other words with a layer with which the magnetization is great, it is known that each of the domains which has been recorded has a maze domain structure which is a mass of minute domains such as shown in FIG. 3(c). The reason is that the lowering of the demagnetization energy due to the formation of the maze domains is greater than the increase of the magnetic wall energy due to the increase in the area of the magnetic walls. The reproduced signal from a recording domain which has this maze domain structure is not satisfactory, since the carrier level drops due to the mutual cancellation of the Kerr effect between the upwards and downwards oriented minute domains. Accordingly, it is desirable for each of the recording domains to have a single domain structure.

In order to get rid of this maze domain construction, it becomes necessary suitably to select the magnitudes of the magnetization and the magnetic wall energy of the magnetic layer. With a TbFeCo composition or a DyFeCo composition, the magnetic wall energy increases along with increase of the amount of the heavy rare earth which is included, but the proportional change thereof is known to be comparatively small. By contrast, since the magnetization changes greatly in dependence upon the composition, a composition of low magnetization, in other words a composition in the vicinity of the compensation composition, is used by choice as the magneto-optical recording layer, in order to obtain a single domain structure. In relation to a TbFeCo composition, there is disclosed in Japanese Patent Laying Open Publication Showa 58-73746 a recording layer which has a composition in the vicinity of the compensation composition, and further in Japanese Patent Laying Open Publication Showa 59-159510 there is disclosed a composition which, in comparison to the compensation composition, includes a large amount, or a small amount, of a heavy rare earth. Compositions which are actually used for magneto-optical recording layers include from 19 at % to 25 at % of Tb, and, even within the range of compositions which are disclosed in Japanese Patent Laying Open Publication Showa 58-73746, these are limited to the near vicinity of the compensation composition. As described upon page 55 of "Magnetics Study Group Materials: MAG-86-95", with a composition in which the amount of heavy rare earth is small, the magnitude of the magnetic field which is required for recording increases sharply with reduction of the heavy rare earth amount. Due to this, it has not been possible in practice to utilize a composition in which the amount of included heavy rare earth is small for a recording medium for magnetic field modulation recording in which a small recording magnetic field is desirable.

Even if a publicly known composition which is in the vicinity of the compensation composition is utilized, it is not possible to attain a high magnetic field sensitivity. In actual practice, upon testing the magnetic field sensitivity for test materials in which the amount of heavy rare earth has been varied with this type of composition, there have been problems in reducing the necessary modulation magnetic field below ±100 Oersted. The reason is that, in the vicinity of the compensation composition, although the balance of the magnitudes of the magnetization and the magnetic wall energy is suitable, since the absolute value of the magnetization is small, the responsiveness with respect to an external magnetic field is poor, and recording with a low modulation magnetic field cannot be satisfactorily performed.

The present inventors have discovered that the magnetic field sensitivity is improved by providing an auxiliary recording layer in contact with the recording layer (Japanese Patent Laying Open Publication Heisei 6-309711). According to this invention, in contact with the recording layer which is in the vicinity of the compensation composition, there is formed a very thin magnetic layer (the auxiliary recording layer) whose Curie temperature is higher than that of the recording layer. As a result, regions for which the recording layer becomes dominant and regions for which the auxiliary recording layer becomes dominant are mixed during domain formation, and the magnetic field sensitivity is enhanced. The distinguishing feature of this invention is that the auxiliary recording layer is ultra thin, a few tens of angstroms thick. With the relevant film thickness greater than 100 angstroms, with superimposed layers of magnetic material which have mutually differing magnetic characteristics, after domains are formed in the magnetic layer which has the higher Curie temperature, these domains are transcribed to the other magnetic layer. As a result, the recording characteristics of the magnetic layer which has the higher Curie temperature exert an undesirable influence upon the recording characteristics of such a superimposed layer film. On the other hand, with a layered superimposition of an ultra thin magnetic layer and a recording layer, it is possible to realize a high magnetic field sensitivity which it has not been possible to obtain with a unitary magnetic layer, due to the fact that domain formation occurs in the vicinity of the recording temperature under the influence of the individually respective characteristics of the recording layer and the auxiliary recording layer.

The present inventors have further pursued their researches in order to exploit to the full the technique of this ultra thin auxiliary recording layer, and with the present invention have achieved a yet higher magnetic field sensitivity. The recording film of the present invention has a range of compositions which include a much smaller amount of heavy rare earth than could previously be employed. This type of recording film has low coercive field, and the value of its magnetization is quite large.

Figure 4:
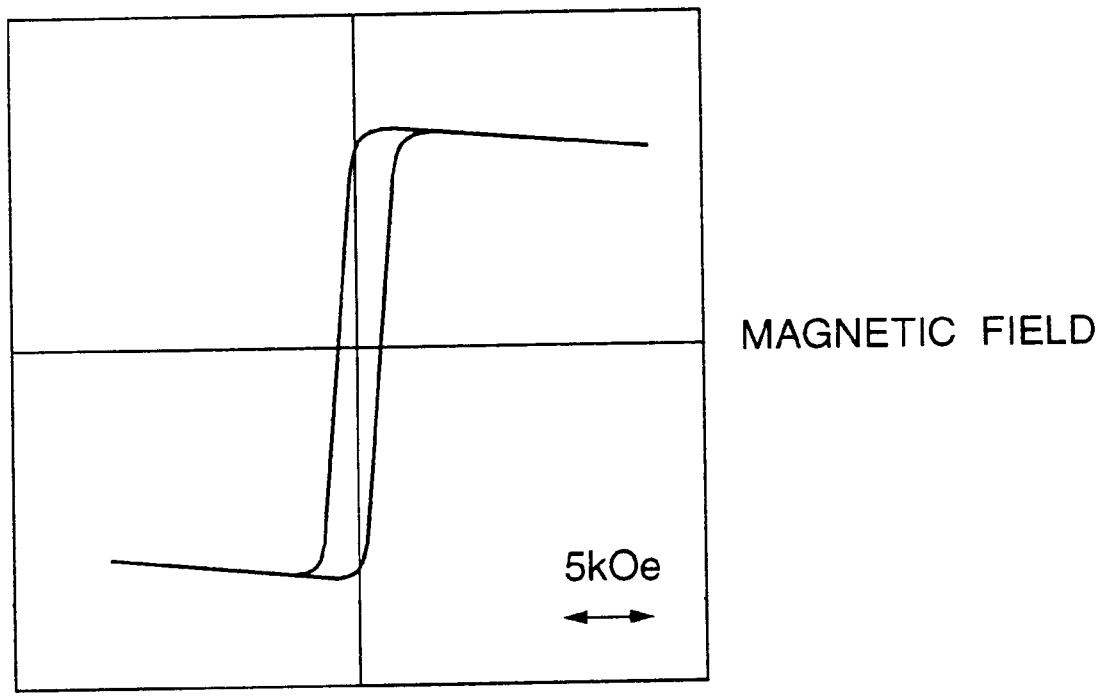
FIG. 4 is a figure showing the Kerr hysteresis loop for a single recording layer of $Tb_{0.14}(Fe_{0.96}Co_{0.04})_{0.86}$ used in the first embodiment.

The Kerr hysteresis loop of the $Tb0.14(Fe0.96Co0.04)$ 0.86 recording layer used in Experiment 1 at room temperature is shown in FIG. 4. The squareness of this loop at room temperature is somewhat less than 1, and this is the minimum limit for satisfying performance as a recording medium to preserve data. If a unit layer film of this composition is utilized as a recording medium, the recording domains are in a maze domain structure, since the value of the magnetization is extremely large, and only a replayed signal of small signal amplitude can be obtained. When an ultra thin DyFeCo layer of a (RE rich: Rare Earth rich) composition in which sublattice magnetization of a metallic rare earth is dominant is formed, satisfactory recording becomes possible even for a low recording magnetic field, as shown in FIG. 2. The squareness ratio for a Kerr hysteresis of a recording layer made with a superimposed ultra thin layer thicker than 15 angstroms is 1, and, compared with a unitary layer film of above 1500 Oersted, the coercive field of the recording layer is also large. Therefore, this recording layer exhibits a sufficiently tolerant characteristic for preservation of data.

The reason for enhancement of the magnetic field sensitivity for a layered superposition of a recording film of a (TM rich: Transition Metal rich) composition in which sublattice magnetization of a transition metal is dominant, and an ultra thin magnetic layer, is conjectured to be as follows. It has already been stated that it is necessary for the magnetization to be large in order for recording with a low magnetic field to be possible. It is the recording layer which offers this large magnetization. The TM rich magnetic layer has a comparatively large magnetization value until directly below the Curie temperature, which is the driving force for domain formation. However, with a single layer, a recording film of this composition easily forms maze domains, and satisfactory recording is not possible. Repression of this formation of maze domains is the action of the ultra thin magnetic layer. The Curie temperature is high in this ultra thin magnetic layer, and a composition is chosen for which the perpendicular magnetization anisotropy is large. Maze domain structure is repressed with a film whose perpendicular magnetization anisotropy is large, since the magnetic wall energy is high. Furthermore, the fact that the film is very thin also contributes to repression of the maze domains. It is known that, as reduction of the thickness of a magnetic film with the same magnetization and magnetic anisotropy progresses, below some film thickness the film assumes a single domain structure, and this limit film thickness is termed the critical film thickness. In other words, the thinner is the film, the easier it is for it to assume a single domain structure, and the more difficult it is for it to assume a maze domain structure. Accordingly, it is desirable for the auxiliary recording layer to be ultra thin.

The upper limit for the film thickness of the auxiliary recording layer can be explained as follows.

The objective of the auxiliary recording layer is to assist recording as much as possible. In other words, the objective of the auxiliary recording layer is not achieved by domains being formed in the auxiliary recording layer and being fixed. With a rare earth-transition metal amorphous alloy, the coercive field drops as the film thickness is reduced. For magnetic films of the same composition, although hysteresis of good squareness is exhibited if the film thickness is high, if the film thickness drops below 50 angstroms a characteristic with almost no hysteresis is exhibited. In other words, it is difficult for domains to be maintained with an ultra thin magnetic layer. With a layered superimposition of a recording layer and an auxiliary recording layer which have different Curie temperatures, above the Curie temperature of the recording layer, the magnetism of the recording layer is almost extinguished, and only the magnetism of the ultra thin auxiliary recording layer remains. In this state, the domains are not fixed in the auxiliary recording layer. When the temperature drops and the coercive field of the recording layer has increased, the domains become fixed. From the above theory, the upper limit for the film thickness of the auxiliary recording layer is determined as a film thickness for which fixing of the domains does not occur in the temperature range above the Curie temperature of the recording layer. The actual value differs according to the Curie temperature of the recording layer and the composition of the auxiliary recording layer. However, according to the results of many experiments, it is desirable for it to be less than about 120 angstroms.

Further, with the present invention a magnetic layer of high Curie temperature is selected for the auxiliary recording layer. Normally, the perpendicular magnetic anisotropy of the magnetic film drops monotonously from room temperature to the Curie temperature. However, a high perpendicular magnetic anisotropy of the auxiliary recording layer is maintained even in the vicinity of the Curie temperature of the recording layer, since the Curie temperature of the auxiliary recording layer is high. Due to this, in the vicinity of the Curie temperature of the recording layer, the comparatively large magnetization of the recording layer and the comparatively large magnetic anisotropy of the auxiliary recording layer are balanced, and it becomes possible for a single domain structure to be assumed. Furthermore, domains can be formed even if the external magnetic field is relatively small, since the recording layer has comparatively high magnetization. In this manner, the ultra thin auxiliary recording layer improves the magnetic characteristics in the vicinity of the recording temperature of the recording film, and makes it possible to form domains in a desirable state.

According to the present invention the magnetic field sensitivity is considerably improved, as compared with a layered superposition of a recording film of a composition near to the compensation composition and an ultra thin auxiliary recording layer, as disclosed in Japanese Patent Laying Open Publication Heisei 6-309711. The reason is that the value of the magnetization is increased by lowering the amount of the heavy rare earth which is included in the recording layer. Further, the present invention makes possible the use of a recording film of a composition which could not previously be utilized. Although a TM rich TbFeCo material was shown by way of example in the first embodiment as a material for the recording layer, it would also be possible to employ some other material, such as a TM rich DyFeCo material, a TM rich GdFeCo material, or a TM rich TbDyFeCo, TbGdFeCo, or DyGdFeCo material or the like. Furthermore, it is possible to anticipate an improvement of the magnetic field sensitivity, even if, for the sake of high magnetization, a precious metal/transition metal magnetic multilayer film such as Pd/Co or Pt/Co or the like of which the recording characteristics are not desirable is used as the recording film. These magnetic multilayer films are suited to increase of the density of magneto-optical media by reduction of the wavelength of the light source, since at short wavelengths their Kerr rotational angles are great. The other side to this is that, because the magnetization values of magnetic multilayer films are great, it is difficult to perform recording properly with a single layer thereof, and in particular they are not suitable for recording with magnetic field modulation recording methods. However, according to the present invention, it is possible to utilize this type of high magnetization recording film in a layered superposition with an auxiliary recording layer. The role of the auxiliary recording layer is to make it possible to utilize a recording material with which, as a prior type single layer, suitable recording was not possible.

(3) Experiment 2: Relationship between the composition of the recording layer 13 and the magnetic field sensitivity.

Next, the composition of the TbFeCo recording layer 13 was varied and the magnetic field sensitivity was investigated. The test pieces were manufactured under the same conditions as in Experiment 1, except for their compositions. The manufacture of the recording layers 13 was performed by DC magnetron sputtering using targets of different compositions manufactured by alloy casting, under the conditions: argon gas pressure 1.2 mTorr; and supplied power 300 W. The compositions of the recording layers which were obtained are shown in Table 1. The coercivities of the recording layers 13, as single layers, are also shown in Table 1 as well.

TABLE 1

| Test piece number | Composition | Coercive field [Oe] |
|---|---|---|
| 1-1 | Tb0.21(Fe0.91Co0.09)0.79 | >10000 |
| 1-2 | Tb0.20(Fe0.91Co0.09)0.80 | >10000 |
| 1-3 | Tb0.186(Fe0.91Co0.09)0.814 | 4140 |
| 1-4 | Tb0.17(Fe0.91Co0.09)0.83 | 3110 |
| 1-5 | Tb0.157(Fe0.92Co0.08)0.843 | 2610 |
| 1-6 | Tb0.143(Fe0.92Co0.08)0.857 | 1120 |
| 1-7 | Tb0.13(Fe0.92Co0.08)0.87 | 630 |
| 1-8 | Tb0.11(Fe0.92Co0.08)0.89 | — |
| 1-9 | Tb0.08(Fe0.93Co0.07)0.92 | — |
| 1-10 | Tb0.07(Fe0.93Co0.07)0.93 | — |

A rare earth-transition metal alloy having a composition Dy0.30(Fe0.50Co0.50)0.70 was used as the auxiliary recording layer 14. The Curie temperature of the auxiliary recording layer 14 was 280 <degrees> C. For each composition for the recording layer, test pieces were made which differed from one another by the film thickness of the auxiliary recording layer 14 varying from 0 angstroms to 80 angstroms in steps of 5 angstroms, and the sensitivities of these with respect to a modulation magnetic field for a magneto-optical recording medium were investigated. It should be understood that these are not actually measured film thickness values for the auxiliary recording layer 14, but are values calculated from the speed of formation of the auxiliary recording layer 14 which was measured in advance, and from the time periods for sputtering which were actually measured. Recording upon the test pieces was performed under the following conditions: linear velocity 1.4 m/s; recording frequency 720 kHz; power of the recording laser 6.0 mW; and modulation magnetic field ±35 Oersted.

Figure 5:
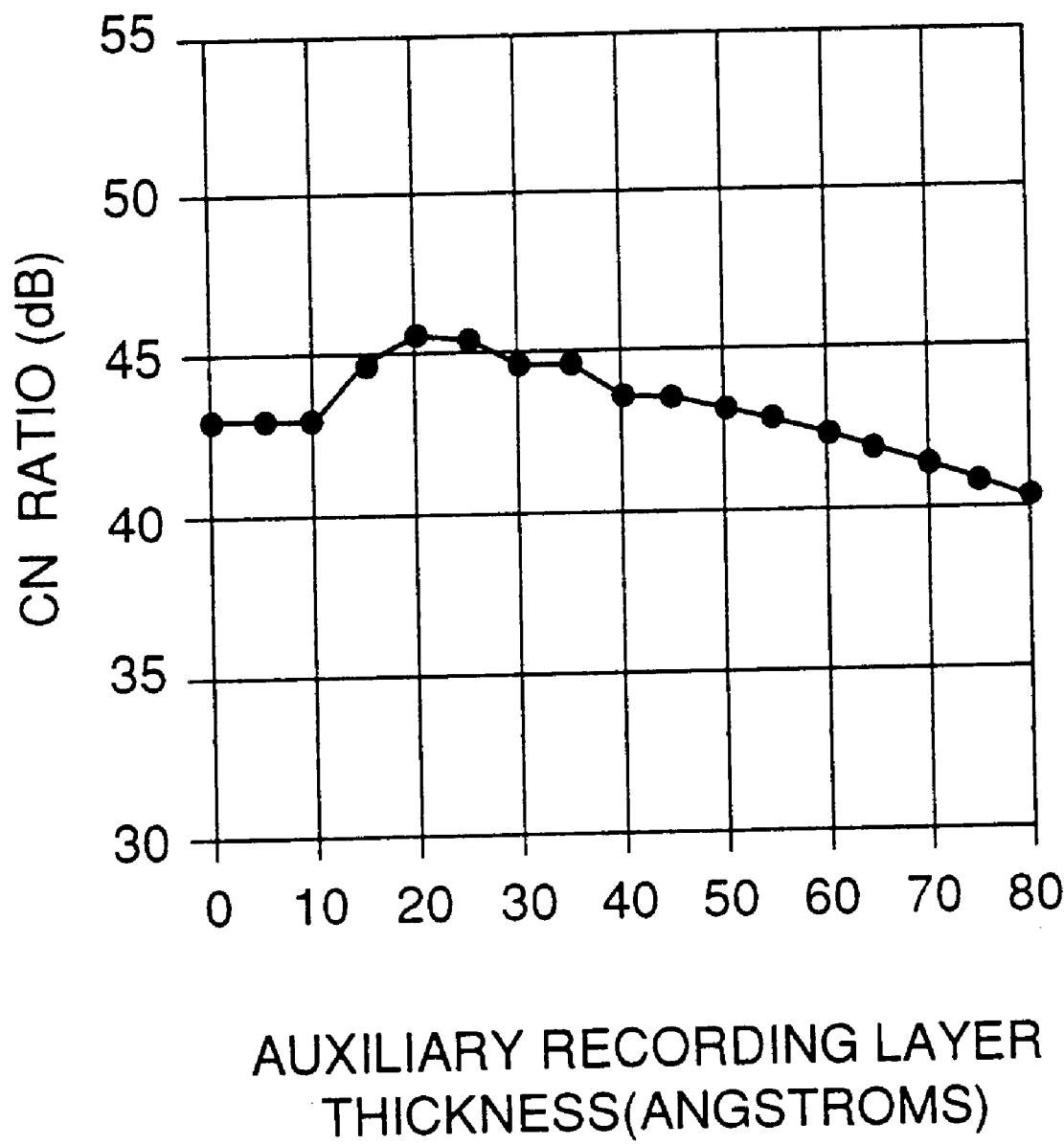
FIG. 5 is a figure showing the relationship between the auxiliary recording layer film thickness and the CN ratio for a medium using a recording layer of $Tb_{0.21}(Fe_{0.91}Co_{0.09})_{0.79}$ according to the first embodiment.
Figure 6:
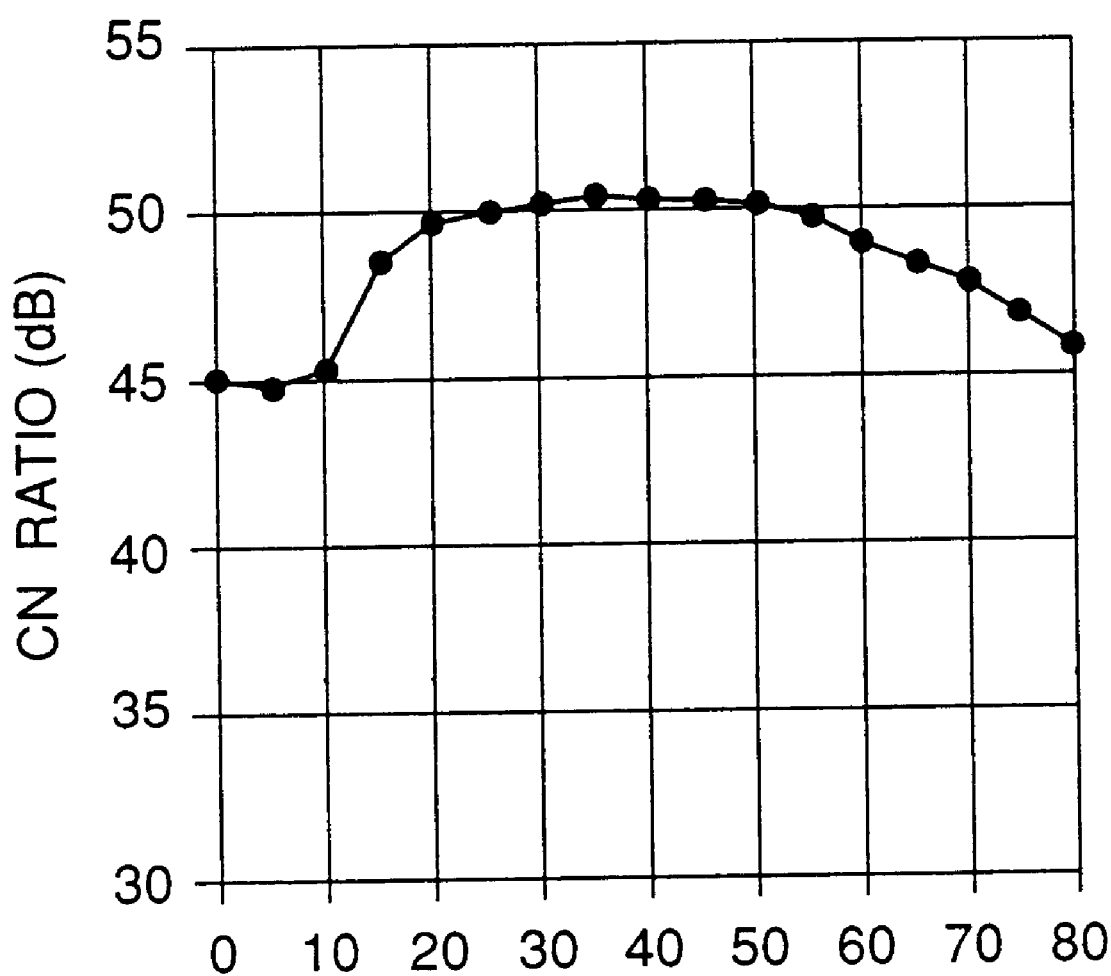
FIG. 6 is a figure showing the relationship between the auxiliary recording layer film thickness and the CN ratio for a medium using a recording layer of $Tb_{0.17}(Fe_{0.91}Co_{0.09})_{0.83}$ according to the first embodiment.
Figure 7:
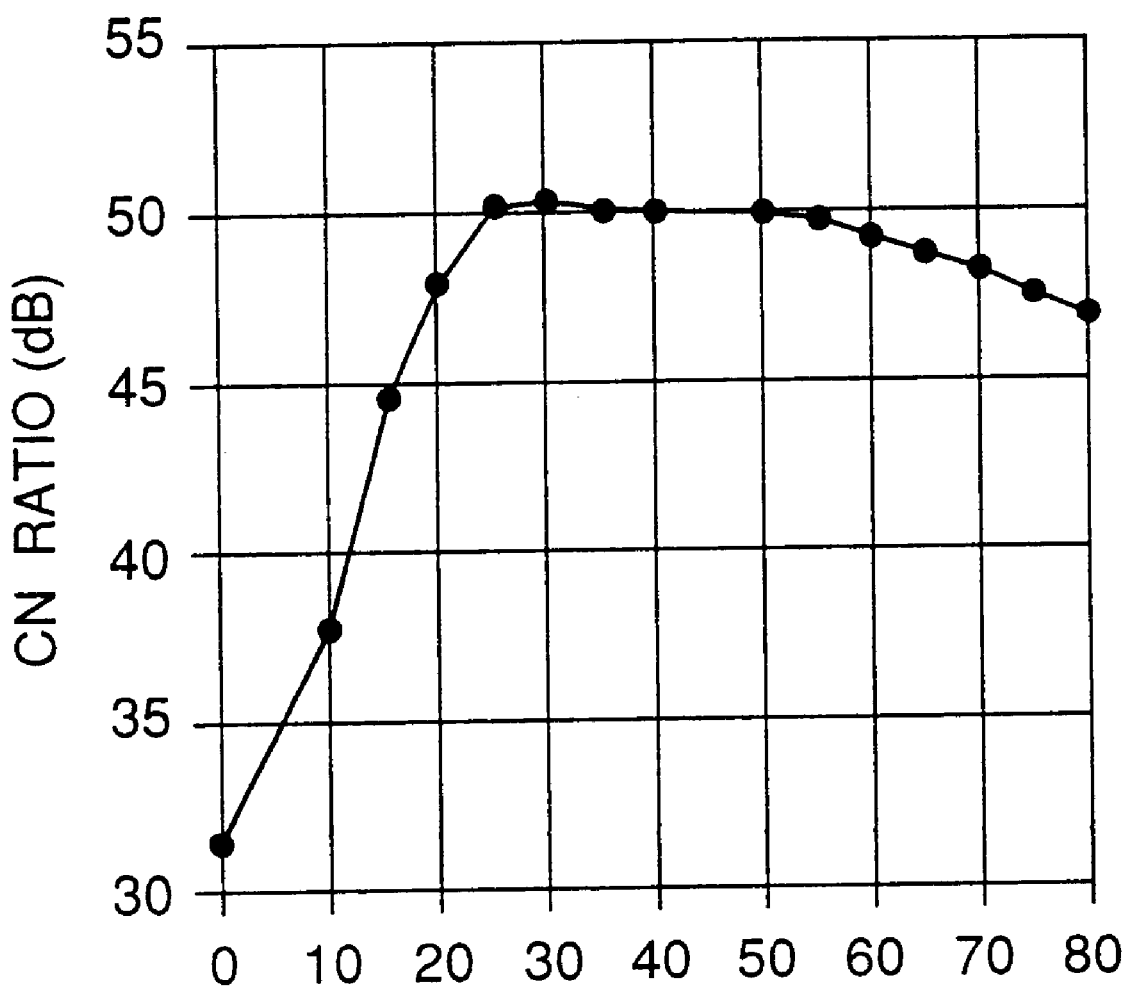
FIG. 7 is a figure showing the relationship between the auxiliary recording layer film thickness and the CN ratio for a medium using a recording layer of $Tb_{0.13}(Fe_{0.92}Co_{0.08})_{0.87}$ according to the first embodiment.

In FIG. 5 there is shown the relationship between the auxiliary recording layer 14 and the CN ratio when the test composition number 1-1 in Table 1 was used as the recording layer 13. In the same manner, in FIG. 6 there is shown the case of the test composition number 1-4, in FIG. 7 there is shown the case of the test composition number 1-7, and in FIG. 8 there is shown the case of the test composition number 1-9. In the cases of the recording layers of the test compositions numbers 1-4 and 1-7, the CN ratio when recording was performed with a modulation magnetic field of ±35 Oersted was strongly dependent upon the film thickness of the auxiliary recording layer 14, and a beneficial effect of improvement of the magnetic field sensitivity from 15 angstroms to 70 angstroms was verified, and in particular a remarkably great CN ratio was obtained in the vicinity of from 25 angstroms to 55 angstroms. Above 55 angstroms, the CN ratio somewhat dropped along with increase of the film thickness. In the case of the recording layers of the test composition number 1-1, as shown in FIG. 5, the CN ratio when recording was performed with a modulation magnetic field of ±35 Oersted was almost independent of the film thickness of the auxiliary recording layer 14, and the magnetic field sensitivity of the medium was not satisfactory.

Figure 8:
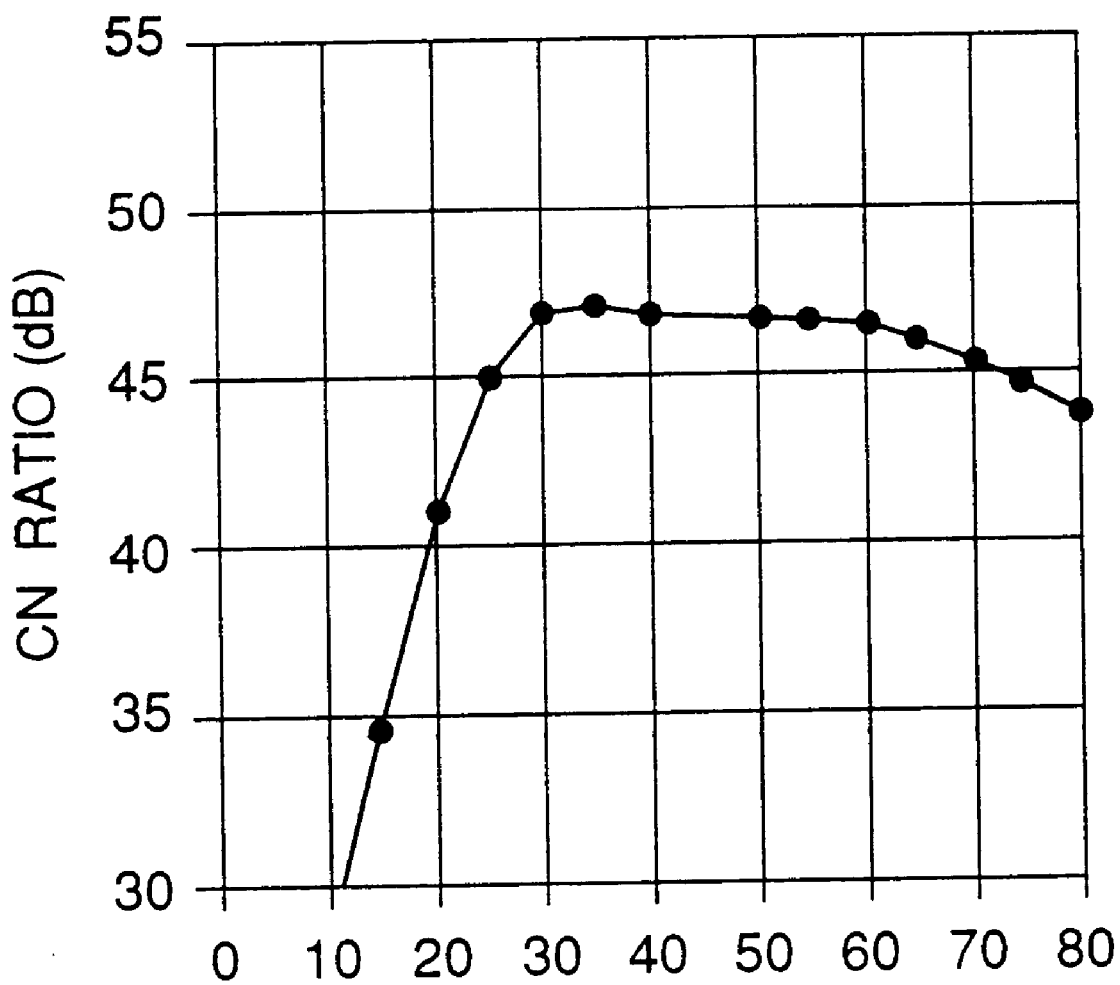
FIG. 8 is a figure showing the relationship between the auxiliary recording layer film thickness and the CN ratio for a medium using a recording layer of $Tb_{0.08}(Fe_{0.93}Co_{0.07})_{0.92}$ according to the first embodiment.

In the case of the recording layers of the test composition number 1-9, as shown in FIG. 8, the CN ratio when recording was performed with a modulation magnetic field of ±35 Oersted depended upon the film thickness of the auxiliary recording layer 14, and the magnetic field sensitivity was improved along with increase of the film thickness, but the magnetic field sensitivity of the medium was quite bad in comparison with superposed layer films of the test materials 1-4 and 1-7.

(4) Experiment 3: Relationship between the amount of Tb included in the recording layer 13 and the magnetic field sensitivity.

Next, for test pieces which used recording layers 13 composed of each of the test compositions from number 1-1 through 1-9, the relation between the amount of Tb included in the recording layer 13 and the CN ratio was investigated. Recording was performed with a modulation magnetic field of ±35 Oersted. For each composition for the recording layer 13, that film thickness was chosen for the film thickness of the auxiliary recording layer 14 which gave the maximum CN ratio. The linear velocity and the recording frequency were the same as in Experiment 1, and that laser power was selected for the power of the recording laser for which the CN ratio was the maximum. It should be noted that no evaluation was performed of any recording layer of the test composition number 1-10, because its characteristics were not considered sufficient for a recording medium, since when it was layered together with an auxiliary recording layer the squareness of the Kerr hysteresis was 0.9.

Figure 9:
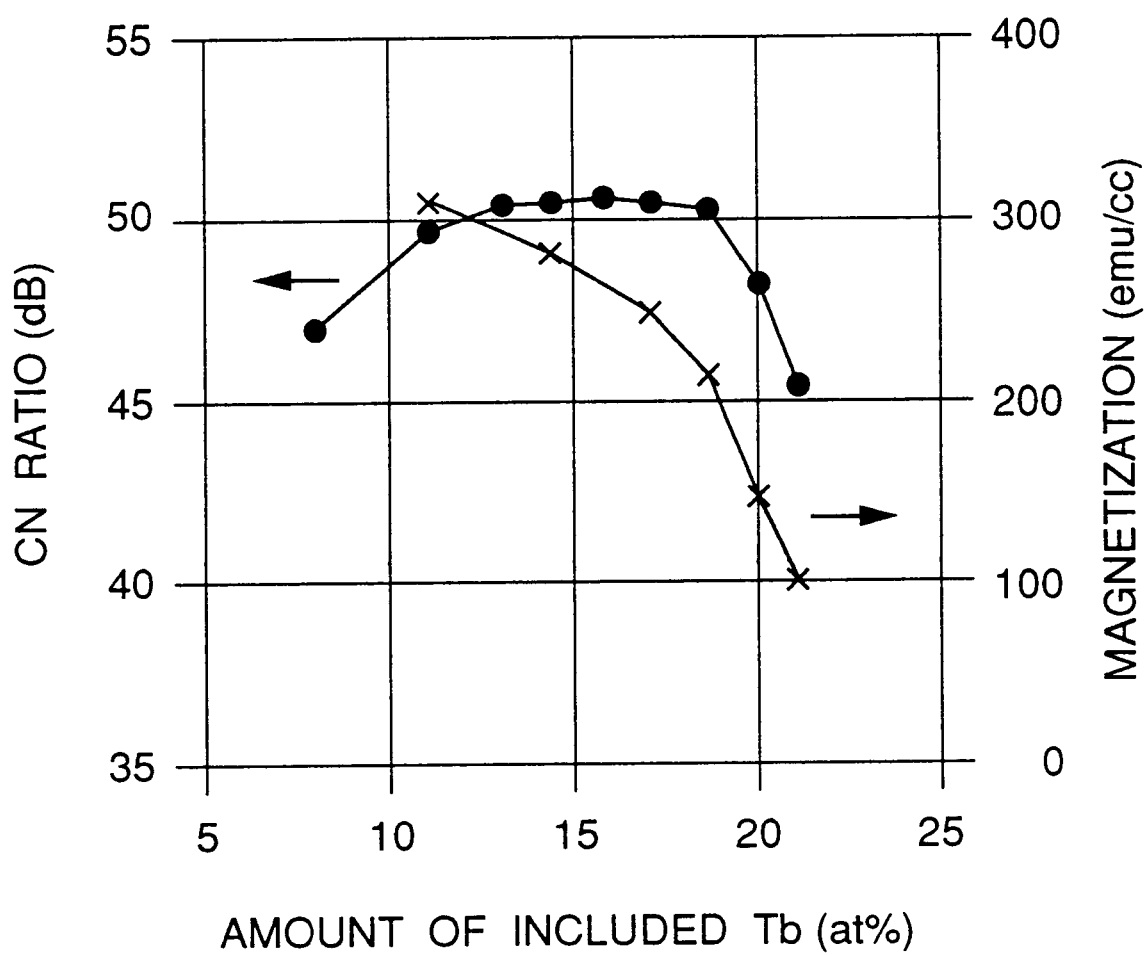
FIG. 9 is a figure showing the relationship between the amount of included Tb and the CN ratio for a recording layer according to the first embodiment.

FIG. 9 shows the measured results for the CN ratio (by the plot of '●' symbols). Further, the relationship between the amount of Tb included in the recording layer and the value of the magnetization as a single layer is also shown as well in FIG. 9 (by the plot of the 'x' symbols). When recording was performed with a low modulation magnetic field of ±35 Oersted, the CN ratio exhibited a desirable value with the amount of included Tb less than or equal to 20 at %, exhibited a higher value with it less than or equal to 18 at %, and exhibited the highest value with it less than or equal to 17 at %. In relation to the lower limit, the results were obtained that the CN ratio exhibited its most desirable values with the amount of included Tb greater than or equal to 13 at %, and the CN ratio exhibited desirable values with the amount of included Tb greater than or equal to 11 at %, while the improvement of the CN ratio was small with the amount of included Tb greater than or equal to 8 at %.

With regard to the relationship between the composition of the recording layer and the magnetization, as has been reported from the past, the value of the magnetization at room temperature increased along with reduction of the amount of included Tb from the compensation composition. With regard to the relationship between the value of the magnetization and the magnetic field sensitivity, it is understood that the CN ratio of the reproduced signal was improved by using a recording layer of which the value of the magnetization exceeded 150 emu/cc. In particular, it is desirable to use a recording layer having a magnetization of from 200 to 300 emu/cc. Further, as shown in FIG. 9, the peak of the CN ratio with respect to the amount of included Tb is in the vicinity of 13 to 18 at %. On the other hand, when the same measurements were performed in the case of a single layer recording film, the CN ratio had its peak in the vicintiy of 20 to 21 at % which is the compensation composition, and in the range where the amount of included Tb was lower than the above the CN ratio abruptly dropped. From the above results it is understood that, for a recording layer provided with an auxiliary recording layer and for a single layer recording layer, the dependence of their characteristics upon their composition is quite different. In other words, it is understood that a magneto-optical recording medium which is provided with an ultra-thin recording layer has characteristics fundamentally different from those of a conventional magneto-optical recording film which has a single recording layer.

(5) Experiment 4: Relationship between the amount of Tb included in a recording layer 13 which had a different amount of Co and the magnetic field sensitivity.

Next, the relation between the amount of Tb included in the recording layer 13 and the magnetic field sensitivity was investigated, with the amount of Co in the recording layer 13 being different from that described above. The test pieces were manufactured under the same conditions as in Experiment 1, except for the compositions of the recording layer 13 and of the auxiliary recording layer 14. The formation of the recording layer 13 was performed by DC magnetron sputtering, using a target manufactured by casting an alloy of a different composition, under the conditions: argon gas pressure 1.2 mTorr; and supplied power 300 W. The compositions of the recording layers which were obtained are shown in Table 2. The coercivities of the recording layers, as single layers, are also shown in Table 2 as well.

TABLE 2

| Test piece number | Composition | Coercive field [Oe] |
| --- | --- | --- |
| 1-11 | Tb0.21(Fe0.87Co0.13)0.79 | >10000 |
| 1-12 | Tb0.20(Fe0.87Co0.13)0.80 | >10000 |
| 1-13 | Tb0.186(Fe0.87Co0.13)0.814 | 4520 |
| 1-14 | Tb0.17(Fe0.87Co0.13)0.83 | 3300 |
| 1-15 | Tb0.157(Fe0.88Co0.12)0.843 | 2790 |
| 1-16 | Tb0.143(Fe0.88Co0.12)0.857 | 1220 |
| 1-17 | Tb0.13(Fe0.88Co0.12)0.87 | 600 |
| 1-18 | Tb0.11(Fe0.88Co0.12)0.89 | — |
| 1-19 | Tb0.08(Fe0.89Co0.11)0.92 | — |
| 1-20 | Tb0.07(Fe0.89Co0.11)0.93 | — |

A rare earth-transition metal alloy having a composition Dy0.31Co0.69 was used as the auxiliary recording layer 14. The Curie temperature of the auxiliary recording layer 14 was greater than or equal to 300 <degrees> C. For each composition for the recording layer, test pieces were made which differed from one another by the film thickness of the auxiliary recording layer 14 varying from 0 angstroms to 100 angstroms in steps of 5 angstroms, and the sensitivities of these with respect to a modulation magnetic field were investigated. It should be understood that these are not actually measured film thickness values for the auxiliary recording layer 14, but are values calculated from the speed of formation of the auxiliary recording layer 14 which was measured in advance, and from the time periods for sputtering which were actually measured.

Figure 10:
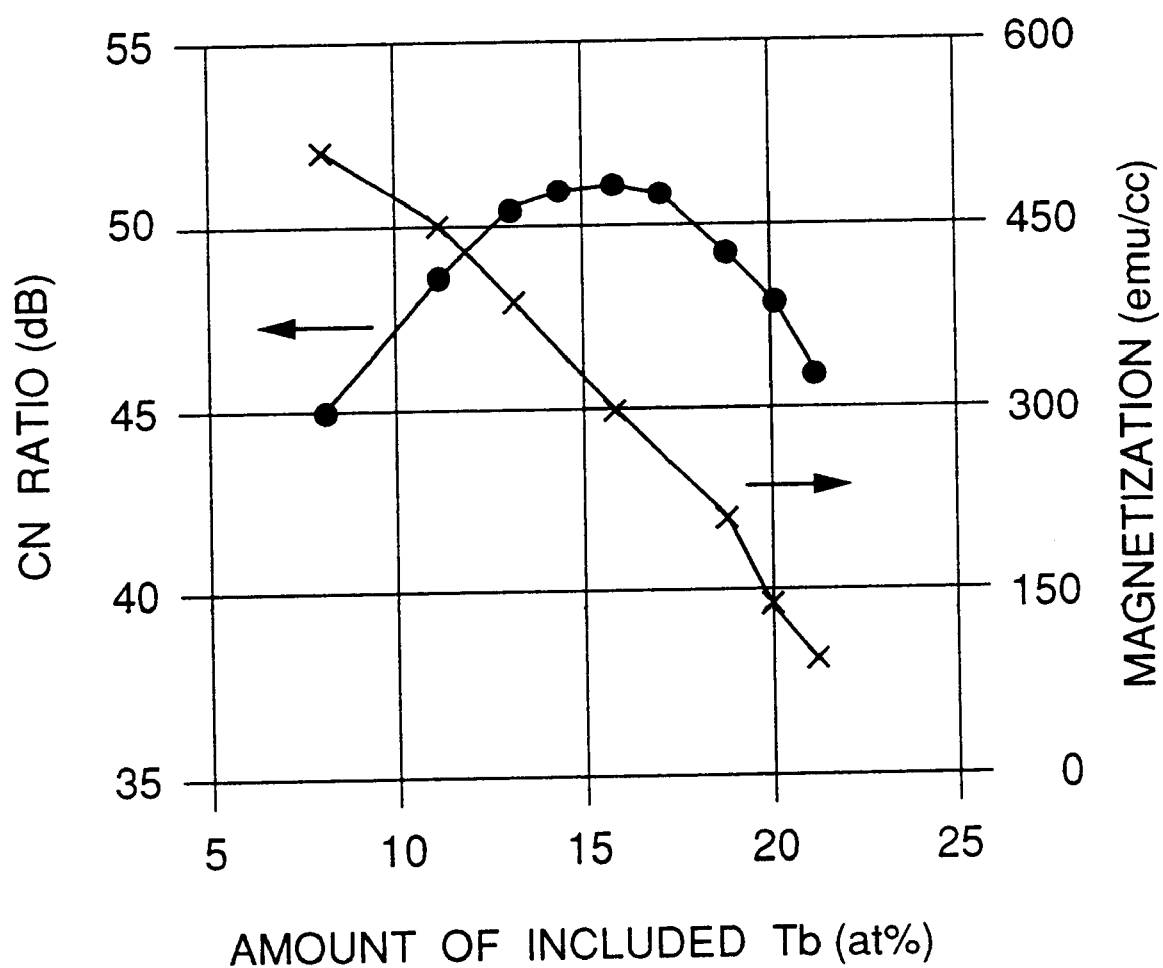
FIG. 10 is a figure showing the relationship between the amount of included Tb and the CN ratio for a recording layer according to the first embodiment.

For test mediums using recording layers 13 of the test compositions numbers 1-11 through 1-19 in Table 2, there is shown in FIG. 10 (by the plot of the '●' symbols) the relationship between the amount of included Tb and the CN ratio of the medium. The relationship between the amount of Tb included in the recording layer 13 and the value of the magnetization as a single layer is also shown as well in FIG. 10 (by the plot of the 'x' symbols).

For each composition for the recording layer, that film thickness was chosen for the film thickness of the auxiliary recording layer 14 which gave the maximum CN ratio. The linear velocity and the recording frequency were the same as in Experiment 1, and that laser power was selected for the power of the recording laser for which the CN ratio was the maximum. It should be noted that no evaluation was performed of any recording layer of the test composition number 1-20, because its characteristics were not considered sufficient for a recording medium, since when it was layered together with an auxiliary recording layer the squareness of the Kerr hysteresis was 0.9.

When recording was performed with a low modulation magnetic field of ±35 Oersted, the CN ratio exhibited a desirable value with the amount of included Tb less than or equal to 20 at %, and exhibited the highest value with it less than or equal to 17 at %. In relation to the lower limit, the results were obtained that the CN ratio exhibited its most desirable values with the amount of included Tb greater than or equal to 13 at %, and the CN ratio exhibited desirable values with the amount of included Tb greater than or equal to 11 at %, while the improvement of the CN ratio was small with the amount of included Tb greater than or equal to 8%.

With regard to the relationship between the composition and the value of the magnetization of the recording layer, just as with the results of Experiment 2, the value of the magnetization at room temperature increased along with reduction of the amount of included Tb from the compensation composition. With regard to the relationship between the value of the magnetization of the recording layer and the magnetic field sensitivity, it is understood that the CN ratio of the reproduced signal is improved by using a recording layer of which the value of the magnetization exceeds 150 emu/cc. In particular, it is desirable to use a recording layer having a magnetization of from 200 to 400 emu/cc.

(6) Experiment 5: Relationship between the composition (the Curie temperature) of the auxiliary recording layer and the magnetic field sensitivity.

Here, a rare earth-transition metal alloy having a composition Tb0.13(Fe0.93Co0.07)0.87 was used as the recording layer 13. The formation of the recording layer 13 was performed by DC magnetron sputtering, using a target manufactured by alloy casting, under the conditions: argon gas pressure 1.8 mTorr; and supplied power 300 W. Its Curie temperature was 175 degrees centigrade.

A rare earth-transition metal alloy having a composition Dy0.30(Fe1−xCox)0.70 was used as the auxiliary recording layer 14. This layer 14 was made by DC magnetron three elements simultaneous sputtering using a Dy target, a Fe target, and a Co target under the condition of argon gas pressure 0.4 mTorr. The composition of the auxiliary recording layer 14 was varied by varying the power supplied to the target. Its Curie temperature was from 145 degrees centigrade to 280 degrees centigrade.

The conditions of manufacture of the first dielectric layer 12, the second dielectric layer 15, and the reflective layer 16 were the same as in Experiment 1. For each composition for the auxiliary recording layer 14, the film thicknesses of the first dielectric layer 12, the recording layer 13, the second dielectric layer 15 and the reflective layer 16 were respectively 600, 200, 200, and 600 angstroms, and test pieces were made with the film thickness of the auxiliary recording layer 14 ranging from 0 angstroms to 80 angstroms by steps of 5 angstroms; and their magnetic field sensitivities were investigated. It should be understood that these are not actually measured film thickness values for the auxiliary recording layer 14, but are values calculated from the speed of formation of the auxiliary recording layer 14 which was measured in advance, and from the time periods for sputtering which were actually measured. Recording was performed with linear velocity 1.4 m/s, recording frequency 720 kHz, and recording laser power 6.5 mW. The relationship at a modulation magnetic field of ±35 Oersted between the composition of the auxiliary recording layer 14 and the CN ratio is shown in Table 3. For each composition for the auxiliary recording layer 14, the measured result is shown in Table 3 for that film thickness of the auxiliary recording layer 14 for which the maximum CN ratio was obtained.

TABLE 3

| Test piece number | Composition | Curie temperatue | Variation of CN |
| --- | --- | --- | --- |
| Recording layer | Tb0.13(Fe0.93Co0.07)0.87 | 175° C. | — |
| Auxilialy recording layer | | | |
| 3-1 | Dy0.30(Fe0.80Co0.20)0.70 | 145° C. | 0 dB |
| 3-2 | Dy0.30(Fe0.78Co0.22)0.70 | 160° C. | 0 dB |
| 3-3 | Dy0.30(Fe0.76Co0.24)0.70 | 170° C. | 0 dB |
| 3-4 | Dy0.30(Fe0.74Co0.26)0.70 | 180° C. | 1.0 dB |
| 3-5 | Dy0.30(Fe0.72Co0.28)0.70 | 195° C. | 2.0 dB |
| 3-6 | Dy0.30(Fe0.70Co0.30)0.70 | 205° C. | 5.0 dB |
| 3-7 | Dy0.30(Fe0.66Co0.34)0.70 | 220° C. | 10.0 dB |
| 3-8 | Dy0.30(Fe0.62Co0.38)0.70 | 235° C. | 11.0 dB |
| 3-9 | Dy0.30(Fe0.58Co0.42)0.70 | 250° C. | 11.0 dB |
| 3-10 | Dy0.30(Fe0.54Co0.46)0.70 | 265° C. | 11.0 dB |
| 3-11 | Dy0.30(Fe0.50Co0.50)0.70 | 280° C. | 11.0 dB |

As will be understood from Table 3, no enhancement at all of the magnetic field sensitivity was obtained when the Curie temperature of the auxiliary recording layer 14 was the same as or was a lower temperature than the Curie temperature of the recording layer 13. Further, when the Curie temperature of the auxiliary recording layer 14 was higher than the Curie temperature of the recording layer recording layer 13 and also the difference between them was less than 10K, then some result is obtained. In this range an enhancement of the CN ratio of about 1 dB was observed as compared with test pieces which had no auxiliary recording layer 14, when recording was performed with ±35 Oersted. Further, when the Curie temperature of the auxiliary recording layer 14 was higher than the Curie temperature of the recording layer recording layer 13 and also the difference between them was greater than or equal to 10K, the enhancement of the magnetic field sensitivity was striking. In particular, when the temperature difference was greater than or equal to 30K, the CN ratio when recording was performed with ±35 Oersted was saturated, and a value of around 50 dB was obtained.

2. Embodiment 2

Figure 11:
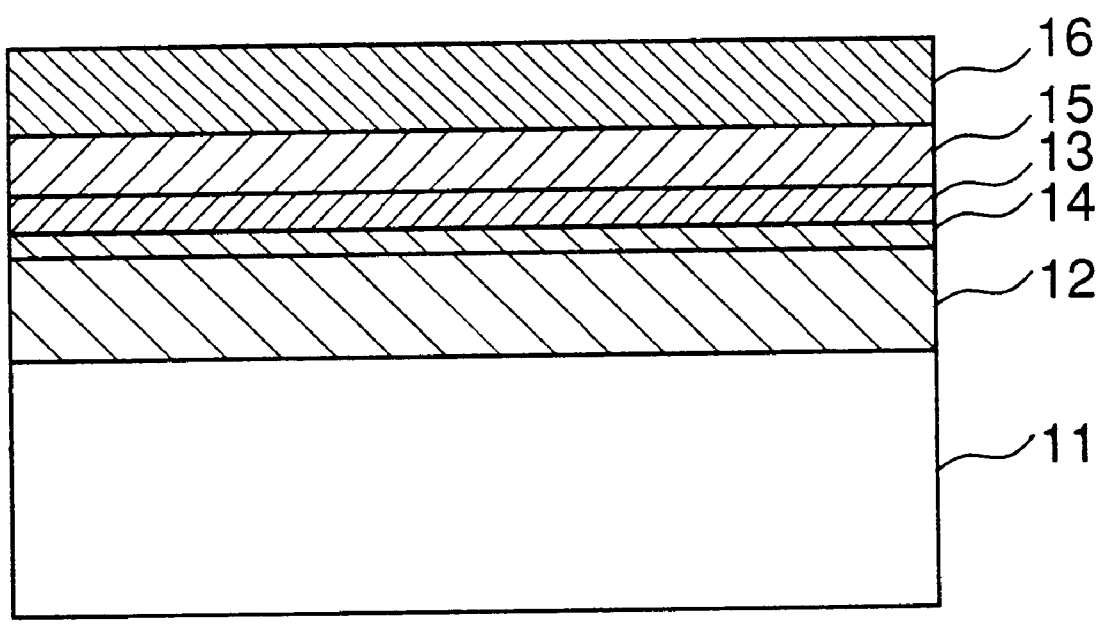
FIG. 11 is a sectional view of a magneto-optical recording medium according to a second embodiment of the present invention.

FIG. 11 shows the sectional structure of a magneto-optical recording medium of this embodiment. A first dielectric layer 12, an auxiliary recording layer 14, a recording layer 13, a second dielectric layer 15, and a reflective layer 16 are sequentially laminated upon a transparent substrate 11. Thus, the only difference as compared with the medium which was shown in FIG. 1 is that the order of superimposition of the recording layer 13 and the auxiliary recording layer 14 is opposite.

(1) Experiment 6: Relationship between the film thickness of the auxiliary recording layer 14 and the magnetic field sensitivity.

Here, a rare earth-transition metal alloy having the composition Tb0.15(Fe0.91Co 0.09)0.85 was used as the recording layer 13. This layer 13 was formed by DC magnetron sputtering, using a target manufactured by alloy casting, under the following conditions: argon gas pressure 1.8 mTorr; and supplied power 300 W. Its Curie temperature was 190 <deg>C.

A rare earth-transition metal alloy having the composition Tb0.31 (Fe0.6Co0.4)0.69 was used as the auxiliary recording layer 14. The auxiliary recording layer 14 was formed by DC magnetron sputtering according to a three element co-sputtering method using a Tb target, a Fe target, and a Co target under the following conditions: argon gas pressure 0.4 mTorr; and supplied power 100 W. Its Curie temperature was 300 degrees centigrade.

The conditions of manufacture of the first dielectric layer 12, the second dielectric layer 15, and the reflective layer 16 were the same as in Experiment 1.

Test pieces were made with the film thickness of the auxiliary recording layer 14 ranging from 0 to 80 angstroms by steps of 5 angstroms, with the film thicknesses of the first dielectric layer 12, the recording layer 13, the second dielectric layer 15 and the reflective layer 16 being respectively 600, 200, 200, and 600 angstroms, and their sensitivities to the modulation magnetic field were investigated. It should be understood that these are not actually measured film thickness values for the auxiliary recording layer 14, but are values calculated from the speed of formation of the auxiliary recording layer 14 which was measured in advance, and from the time periods for sputtering which were actually measured. Recording upon the test pieces was performed under the following conditions: linear velocity 1.4 m/s; recording frequency 720 kHz; power of the recording laser 6.9 mW; and modulation magnetic field ±35 Oersted.

Figure 12:
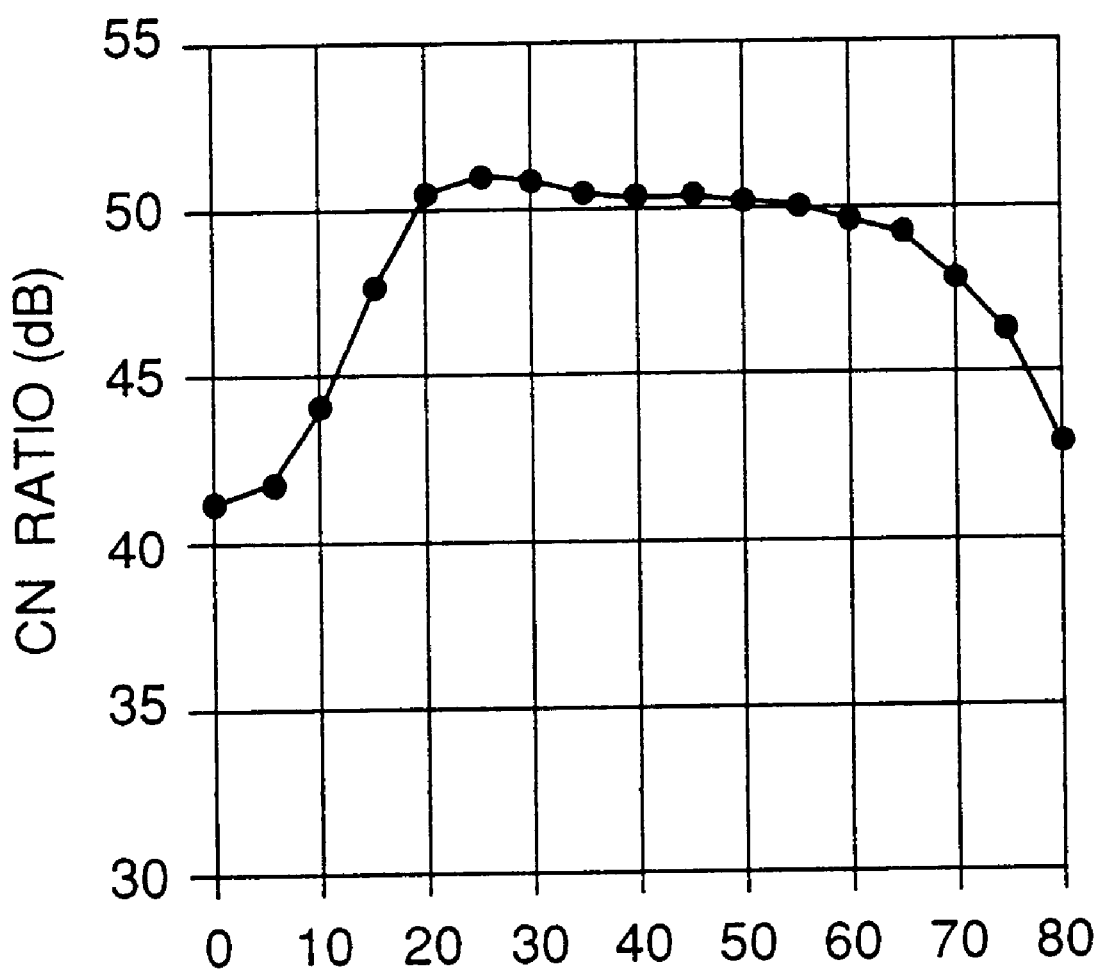
FIG. 12 is a figure showing the relationship between the film thickness of an auxiliary recording layer according to the second embodiment and the CN ratio.

FIG. 12 is a figure showing the relationship between the film thickness of the auxiliary recording layer 14 and the CN ratio.

It will be understood that a beneficial effect for improvement of the CN ratio was apparent just by forming an ultra thin auxiliary recording layer 14 of 15 angstroms thickness. The CN ratio when recording was performed using a weak modulation magnetic field of ±35 Oersted strongly depended upon the thickness of the auxiliary recording layer 14, and a beneficial effect was observed over the range from 15 angstroms to 70 angstroms, and in particular a remarkably great CN ratio was obtained in the region from 20 angstroms to 55 angstroms. Above 65 angstroms, the CN ratio somewhat diminished along with increase of film thickness.

In this manner, an improvement of the magnetic field sensitivity was noted not only for a construction, as in the first embodiment, in which the auxiliary recording layer 14 was formed after the recording layer 13, but also, as in this embodiment, for a construction in which the auxiliary recording layer 14 was formed before the recording layer 13.

3. Embodiment 3

Figure 13:
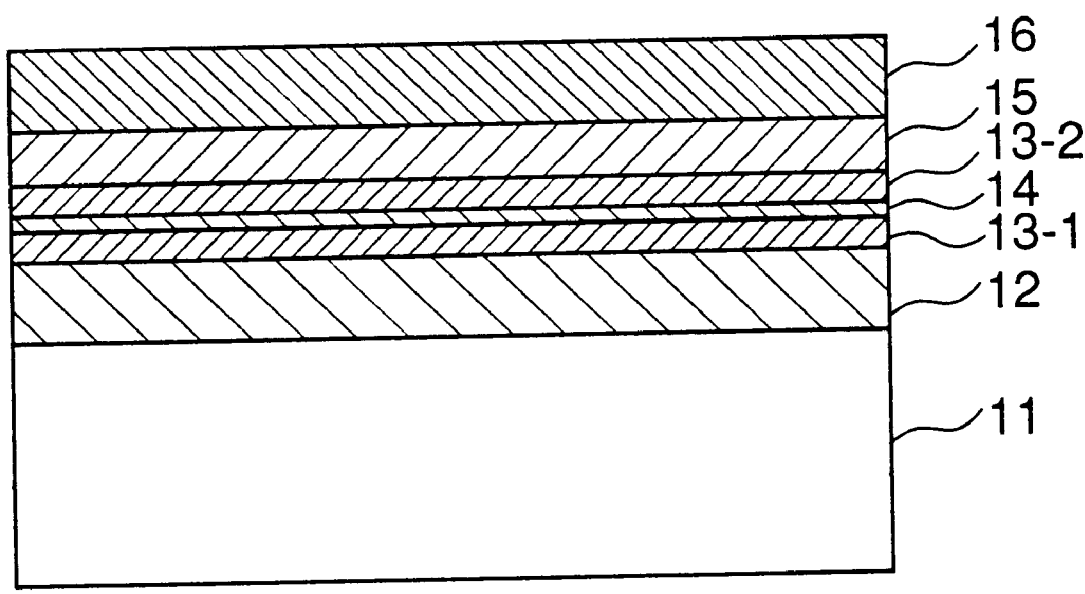
FIG. 13 is a sectional view of a magneto-optical recording medium according to a third embodiment of the present invention.

FIG. 13 shows the sectional structure of a magneto-optical recording medium of this embodiment. In this embodiment, the auxiliary recording layer is interposed in the space between two recording layers 13-1 and 13-2. In other words, a first dielectric layer 12, a first recording layer 13-1, an auxiliary recording layer 14, a second recording layer 13-2, a second dielectric layer 15, and a reflective layer 16 are sequentially laminated upon a transparent substrate 11.

(1) Experiment 7: Relationship between the film thickness of the auxiliary recording layer 14 and the magnetic field sensitivity.

Here, a rare earth-transition metal alloy having the composition Tb0.16(Fe0.8Co 0.20)0.84 was used for the recording layers 13-1 and 13-2. These layers 13-1 and 13-2 were formed by DC magnetron sputtering, using a target manufactured by alloy casting, under the following conditions: argon gas pressure 1.8 mTorr; and supplied power 300 W. Their Curie temperature was 240 degrees centigrade.

A rare earth-transition metal alloy having the composition Tb0.32 (Fe0.50Co0.50)0.68 was used for the auxiliary recording layer 14. The auxiliary recording layer 14 was formed by DC magnetron sputtering according to a three element co-sputtering method using a Tb target, a Fe target, and a Co target under the following conditions: argon gas pressure 0.4 mTorr; and supplied power 100 W. The Curie temperature of the auxiliary recording layer was 320 degrees centigrade.

The conditions of manufacture of the first dielectric layer 12, the second dielectric layer 15, and the reflective layer 16 were the same as in Experiment 1.

Test pieces were made with the film thickness of the auxiliary recording layer 14 ranging from 0 to 80 angstroms by steps of 5 angstroms, with the film thicknesses of the first dielectric layer 12, the first recording layer 13-1, the second recording layer 13- 2, the second dielectric layer 15 and the reflective layer 16 being respectively 600, 100, 100, 200, and 600 angstroms, and their sensitivities to the modulation magnetic field were investigated. It should be understood that these are not actually measured film thickness values for the auxiliary recording layer 14, but are values calculated from the speed of formation of the auxiliary recording layer 14 which was measured in advance, and from the time periods for sputtering which were actually measured. Recording upon the test pieces was performed under the following conditions: linear velocity 1.4 m/s; recording frequency 720 kHz; power of the recording laser 7.4 mW; and modulation magnetic field ±35 Oersted.

Figure 14:
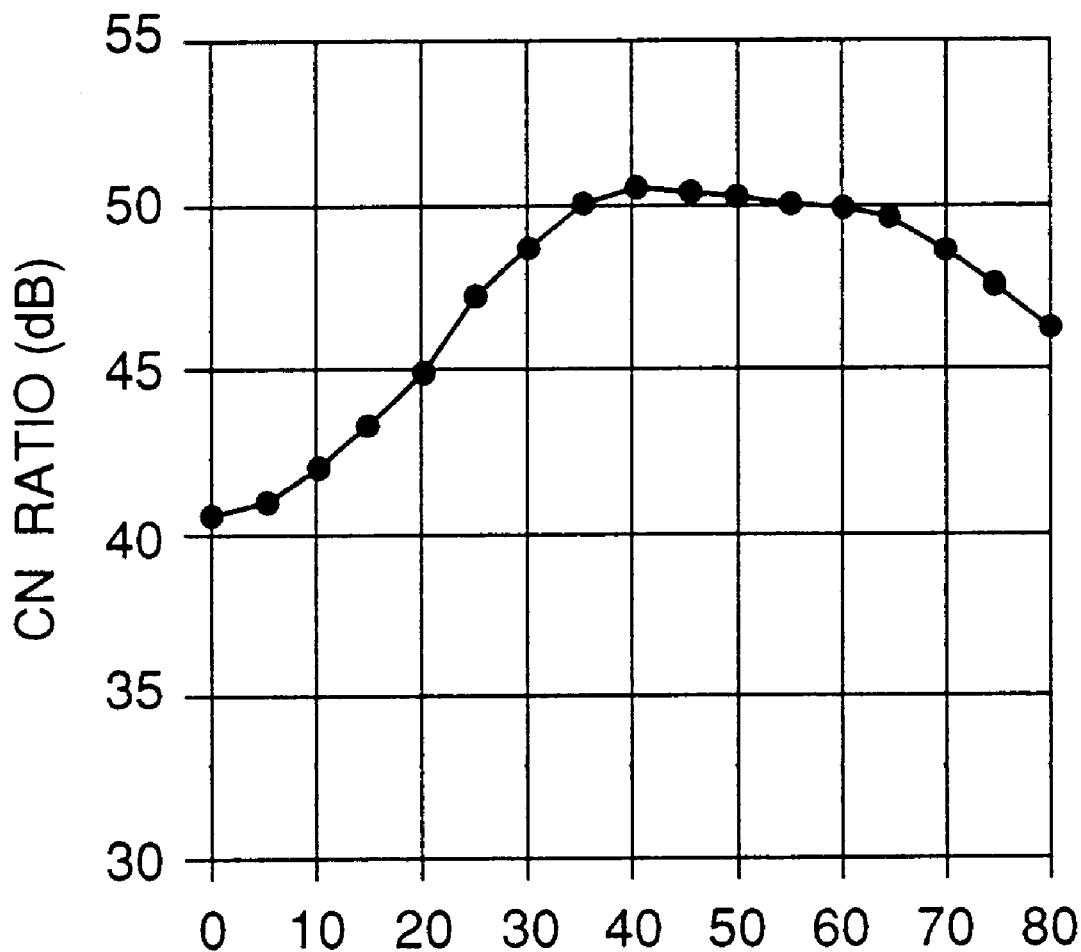
FIG. 14 is a figure showing the relationship between the film thickness of an auxiliary recording layer according to the third embodiment and the CN ratio.

FIG. 14 is a figure showing the relationship between the film thickness of the auxiliary recording layer 14 and the CN ratio.

The CN ratio when recording was performed using a weak modulation magnetic field of ±35 Oersted strongly depended upon the thickness of the auxiliary recording layer 14, and a beneficial effect was observed over the range from 20 angstroms to 70 angstroms, and in particular a remarkably great CN ratio was obtained in the region from 35 angstroms to 65 angstroms. Above 65 angstroms, the CN ratio somewhat diminished along with increase of film thickness.

In this manner, an improvement of the magnetic field sensitivity was also attained for a magneto-optical recording medium of a construction in which the auxiliary recording layer 14 was formed in a space between recording layers.

4. Embodiment 4

In the above described first through third embodiments, a Tb—Fe composition type alloy was used for the recording layer 13, while a Dy—Fe composition type alloy was used for the auxiliary recording layer 14. In this embodiment, an aloy of a composition different from the first through the third embodiment is used for both, or for one, of the recording layer and the auxiliary recording layer. For example, Dy—Fe—Co, Gd—Fe—Co, Tb—Dy—Fe—Co, or Tb—Gd—Fe—Co is used for the recording layer 13. Or Tb—Fe—Co, Gd—Fe—Co, Tb—Dy—Fe—Co, or Tb—Gd—Fe—Co is used for the auxiliary recording layer 14.

As for the sectional structure of the medium of this embodiment, as shown in FIG. 1, a first dielectric layer 12, a recording layer 13, an auxiliary recording layer 14, a second dielectric layer 15, and a reflective layer 16 are sequentially laminated upon the surface of a transparent substrate 11.

(1) Experiment 8: Relationship between the compositions of the recording layer and the auxiliary recording layer and the magnetic field sensitivity.

Next, investigations were performed relating to the magnetic field sensitivities of magneto-optical recording mediums having recording layers and auxiliary recording layers of various different compositions.

The recording layers 13 were formed by DC magnetron sputtering, using targets of various different compositions manufactured by alloy casting, under the following conditions: argon gas pressure 1.8 mTorr; and supplied power 300 W. The auxiliary recording layers 14 were formed by DC magnetron sputtering, using targets of various different compositions manufactured by alloy casting, under the following conditions: argon gas pressure 0.4 mTorr; and supplied power 100 W. The compositions of the recording layers 13 and the auxiliary recording layers 14 of the test pieces which were manufactured, and the differences between the Curie temperatures of the recording layers 13 and the auxiliary recording layers 14, are shown in Table 4. Further, the conditions of manufacture of the first dielectric layer 12, the second dielectric layer 15, and the reflective layer 16 were the same as in Experiment 1.

For each of the test piece numbers shown in FIG. 4, test pieces were made with the film thickness of the auxiliary recording layer ranging from 0 to 80 angstroms by steps of 5 angstroms, with the film thicknesses of the first dielectric layer 12, the recording layer 13, the second dielectric layer 15 and the reflective layer 16 being respectively 600, 200, 200, and 600 angstroms. It should be understood that these are not actually measured values for the film thickness of the auxiliary recording layer 14, but are values calculated from the speed of formation of the auxiliary recording layer 14 which was measured in advance, and from the time periods for sputtering which were actually measured. Recording upon the test pieces was performed under the following conditions: linear velocity 1.4 m/s; recording frequency 720 kHz; and modulation magnetic field ±35 Oersted. For the power of the recording laser, that laser power was selected for which the CN ratio was the maximum.

In Table 4 there is shown the change in CN ratio for each of the test piece numbers. The change in the CN ratio means the amount of change in the CN ratio by which it improved due to the formation of the auxiliary recording layer 14.

Here, for the film thickness of the auxiliary recording layer 14, for each of the test piece numbers, that film thickness is chosen for the auxiliary recording layer 14 for which the maximum CN ratio was obtained.

TABLE 4

| Test piece number | Recording layer composition | Auxiliary recording layer composition | Curie temperature difference / Change of CN ratio |
|---|---|---|---|
| 4-1 | Dy0.18(Fe0.85Co0.15)0.82 | Dy0.32(Fe0.50Co0.50)0.68 | 90° C. 14 dB |
| 4-2 | Dy0.15(Fe0.81Co0.19)0.85 | Dy0.32(Fe0.40Co0.60)0.68 | 70° C. 12 dB |
| 4-3 | Dy0.13(Fe0.70Co0.30)0.87 | Dy0.32(Fe0.30Co0.70)0.68 | 35° C. 7 dB |
| 4-4 | (Tb0.70Dy0.30)0.16(Fe0.90Co0.10)0.84 | Gb0.30(Fe0.60Co0.40)0.70 | 110° C. 11 dB |
| 4-5 | (Tb0.50Dy0.50)0.16(Fe0.90Co0.10)0.84 | Gb0.30(Fe0.60Co0.40)0.70 | 115° C. 10 dB |
| 4-6 | (Tb0.20Dy0.80)0.16(Fe0.90Co0.10)0.84 | Gb0.30(Fe0.80Co0.20)0.70 | 120° C. 11 dB |
| 4-7 | (Tb0.75Dy0.25)0.16(Fe0.96Co0.04)0.84 | (Tb0.50Dy0.50)0.30(Fe0.60Co0.40)0.70 | 110° C. 13 dB |
| 4-8 | (Tb0.50Dy0.50)0.16(Fe0.96Co0.04)0.84 | (Tb0.50Dy0.50)0.30(Fe0.60Co0.40)0.70 | 100° C. 13 dB |
| 4-9 | (Tb0.30Dy0.70)0.16(Fe0.96Co0.04)0.84 | (Tb0.50Dy0.50)0.30(Fe0.60Co0.40)0.70 | 80° C. 10 dB |
| 4-10 | Gb0.17(Fe0.98Co0.02)0.83 | Tb0.32(Fe0.50Co0.50)0.68 | 120° C. 8 dB |
| 4-11 | Tb0.18(Fe0.96Co0.04)0.82 | (Tb0.20Gd0.80)0.35(Fe0.75Co0.25)0.65 | 110° C. 7 dB |
| 4-12 | Tb0.18(Fe0.96Co0.04)0.82 | (Tb0.20Gd0.80)0.29(Fe0.75Co0.25)0.71 | 120° C. 7 dB |
| 4-13 | Tb0.18(Fe0.96Co0.04)0.82 | (Tb0.20Gd0.80)0.25(Fe0.75Co0.25)0.75 | 130° C. 8 dB |
| 4-14 | Tb0.14(Fe0.92Co0.08)0.86 | Dy0.27Co0.73 | >100° C. 11 dB |
| 4-15 | Tb0.14(Fe0.92Co0.08)0.86 | Dy0.29Co0.71 | >100° C. 13 dB |
| 4-16 | Tb0.14(Fe0.92Co0.08)0.86 | Dy0.32Co0.68 | >100° C. 14 dB |
| 4-17 | Tb0.14(Fe0.92Co0.08)0.86 | Dy0.34Co0.66 | >100° C. 12 dB |
| 4-18 | Tb0.14(Fe0.92Co0.08)0.86 | Dy0.30(Fe0.10Co0.90)0.70 | >100° C. 13 dB |
| 4-19 | Tb0.14(Fe0.92Co0.08)0.86 | Dy0.30(Fe0.21Co0.79)0.70 | >100° C. 13 dB |
| 4-20 | Dy0.17(Fe0.88Co0.12)0.83 | Tb0.29(Fe0.15Co0.85)0.71 | >100° C. 13 dB |
| 4-21 | Dy0.17(Fe0.88Co0.12)0.83 | Tb0.29Co0.71 | >100° C. 14 dB |
| 4-22 | Dy0.17(Fe0.88Co0.12)0.83 | Tb0.29Co0.71 | >100° C. 13 dB |

As is clear from the results for test pieces 4-1 through 4-3, an improvement in the magnetic field sensitivity is noted if DyFeCo is used for the recording layer 13.

As is clear from the results for test pieces 4-4 through 4-6, an improvement in the magnetic field sensitivity is also noted if a mixture of Tb and Dy is used as the heavy rare earth metal included in the recording layer 13. Further, even if an auxiliary recording layer 14 of GdFeCo is used with these recording layers 13, an improvement in the magnetic field sensitivity is observed, just as with an auxiliary recording layer 14 of DyFeCo.

As is clear from the results for test pieces 4-7 through 4-9, an improvement in the magnetic field sensitivity is also noted if a mixture of Tb and Gd is used as the heavy rare earth metal included in the recording layer 13. Further, even if an auxiliary recording layer 14 containing a mixture of Tb and Dy as a heavy rare earth metal is used with these recording layers 13, an improvement in the magnetic field sensitivity is observed, just as with an auxiliary recording layer 14 of DyFeCo or GdFeCo.

As is clear from the results for test piece 4-10, an improvement in the magnetic field sensitivity is also noted if GdFeCo is used as the recording layer 13. Further, even if an auxiliary recording layer 14 of TbFeCo is used with these recording layers 13, an improvement in the magnetic field sensitivity is observed. As is clear from the results for test pieces 4-11 through 4-13, an improvement in the magnetic field sensitivity is also noted even if an auxiliary recording layer 14 containing a mixture of Tb and Gd as the heavy rare earth metal is used.

As is clear from the results for test pieces 4-14 through 4-19, an improvement in the magnetic field sensitivity is noted even for a DyCo composition not including any Fe or a DyFeCo composition including a very small amount of Fe as the auxiliary recording layer 14. Further, it will be understood that the magnetic field sensitivity does not change greatly even when the amount of Dy in the auxiliary recording layer changes by several at %. As is clear from the results for test pieces 4-20 through 4-22, an improvement in the magnetic field sensitivity is noted even for a TbCo or a GdCo composition not including any Fe, or a TbFeCo composition with a very small amount of Fe, as the auxiliary recording layer 14.

With regard to the composition of the auxiliary recording layer 14, from Table 4 it will be understood that a beneficial effect is available for improvement of magnetic field sensitivity at an amount of heavy rare earth metal above 25%. The upper limit for the amount of heavy rare earth metal is set by the Curie temperature of the auxiliary recording layer 14. In other words, when the amount of the heavy rare earth metal exceeds 35 at %, the Curie temperature of the auxiliary recording layer 14 undesirably drops remarkably. In these sorts of circumstances, even if the proportion of Co included in the transition metal (hereinafter termed the Co ratio) is increased, it becomes difficult to increase the Curie temperature of the auxiliary recording layer 14, and it becomes difficult to keep the Curie temperature of the auxiliary recording layer 14 more than 30K above the Curie temperature of the recording layer 13. Due to the above fact, improvement in the magnetic field sensitivity can be realized if the amount of the heavy rare earth metal is within the range from 25 at % to 35 at %.

On the other hand, with regard to a lower limit for the Co ratio of the auxiliary recording layer 14, as shown by test piece no. 4-6 in Table 4, since a beneficial effect of improvement in the magnetic field sensitivity is available at a Co ratio of 20%, accordingly it will be understood that it is desirable for it to be 20 at % or greater. With regard to an upper limit for the Co ratio of the auxiliary recording layer 14, there is no particular limit, and a beneficial effect for improvement in the magnetic field sensitivity is available even for an auxiliary recording layer of a 100% composition, i.e. not including any Fe at all.

5. Embodiment 5

This embodiment has the sectional structure shown in FIG. 1, and TbFeCo is used for the recording layer 13, while TbCo, DyCo, or GdCo is used for the auxiliary recording layer 14.

(1) Experiment 9: Relationship between the film thickness of the auxiliary recording layer and the magnetic field sensitivity.

The influence which the film thickness of the auxiliary recording layer exerted upon the replay characteristics of the magneto-optical recording medium were investigated, using for the recording layer 13 a rare earth-transition metal alloy having the composition Tb0.14(Fe0.91Co0.09)0.86, and using for the auxiliary recording layer 14 the three types of composition Tb0.31Co0.69, Dy0.31Co0.69, and Gd0.31Co0.69. The manufacture of the test pieces was under the same conditions as in Embodiment 1.

For each of the compositions for the auxiliary recording layer 14, test pieces were made with the film thickness of the auxiliary recording layer 14 ranging from 0 to 100 angstroms by steps of 5 angstroms, with the film thicknesses of the first dielectric layer 12, the recording layer 13, the second dielectric layer 15 and the reflective layer 16 being respectively 600, 200, 200, and 600 angstroms, and their sensitivity to the modulation magnetic field was investigated. It should be understood that these are not actually measured values for the film thickness of the auxiliary recording layer 14, but are values calculated from the speed of formation of the auxiliary recording layer 14 which was measured in advance, and from the time periods for sputtering which were actually measured. Recording was performed under the following conditions: linear velocity 1.4 m/s; recording frequency 720 kHz; recording laser power 7.2 mW, and modulation magnetic field ±35 Oersted.

Figure 15:
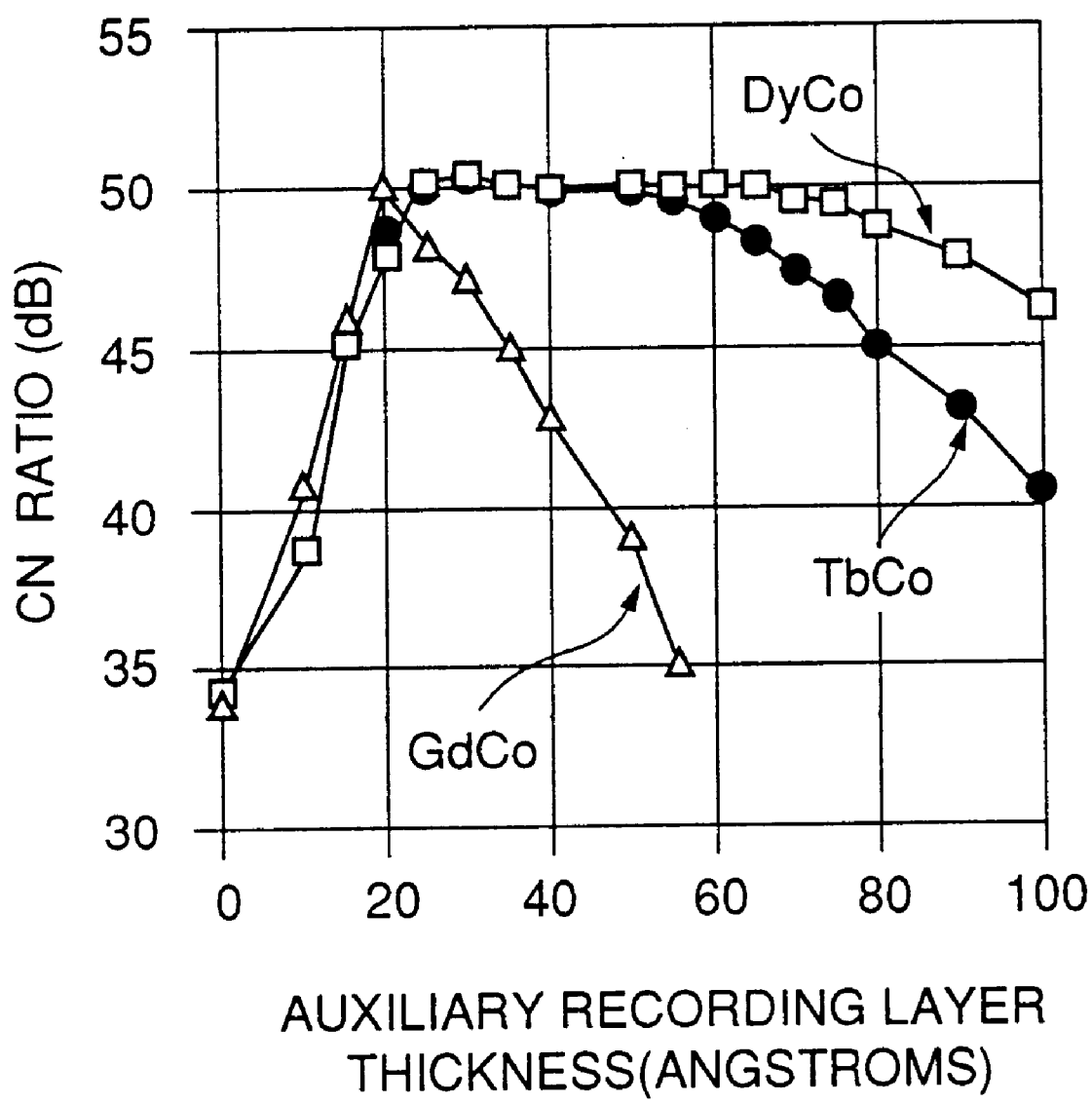
FIG. 15 is a figure showing the relationship between the film thickness of an auxiliary recording layer according to a fifth embodiment of the present invention and the CN ratio.

In FIG. 15 there is shown the relationship between the film thickness of the auxiliary recording layer 14 and the CN ratio, when the above described three types of auxiliary recording layer 14 were used.

It will be understood that the magnetic field sensitivity greatly improved when an auxiliary recording layer 14 of any of the compositions Tb0.31Co0.69, Dy0.31Co0.69, or Gd0.31Co0.69 was used. By selecting the thickness of the auxiliary recording layer 14, it was possible to obtain a CN ratio of 50 dB or greater. However, the dependence of the magnetic field sensitivity with respect to the film thickness of the auxiliary recording layer 14 differed greatly according to differences of the heavy rare earth included in the auxiliary recording layer 14. In the case of Gd0.31Co0.69, although an extremely high CN ratio was obtained when the film thickness of the auxiliary recording layer 14 was 20 angstroms, when the film thickness was thicker than this, the CN ratio dropped abruptly. By contrast to this, in the cases of Tb0.31Co0.69 and Dy0.31Co0.69, the film thickness dependence was small. In particular, in the case of an auxiliary recording layer 14 made from Gd0.31Co0.69, the reduction of the CN ratio was small up to a film thickness of about 80 angstroms, and in the range of film thickness from 15 angstroms to 100 angstroms a beneficial result for the CN ratio of 45 dB or more was obtained. Even with a TbCo auxiliary recording layer 14, it was possible to expect to obtain a CN ratio of 45 dB or more even with a film thickness of about 100 angstroms, by selecting the proportions of Tb and Co and various other conditions.

6. Embodiment 6

With this embodiment, the sectional construction and the basic compositions of the various layers are the same as in Embodiment 1.

(1) Experiment 10: Relationship between the Co proportion in the recording layer 13 and the magnetic field sensitivity.

The magnetic field sensitivity was investigated while varying the proportions of Fe and Co in the recording layer 13. The test pieces were manufactured under the same conditions as in Experiment 1, except for the composition of the recording layer 13. The recording layers 13 were formed by DC magnetron sputtering, using targets of various different compositions manufactured by alloy casting, under the following conditions: argon gas pressure 1.2 mTorr; and supplied power 300 W. The compositions of the recording layers 13 are shown in Table 5. The Curie temperatures for single layers of the recording layers 13 are also shown in Table 5. For recording layers 13 composed as test pieces numbers 5-7 and 5-8, the Curie temperatures were 320 degrees centigrade or greater.

TABLE 5

| Test piece number | Composition | Curie temperature (degrees centigrade) |
| --- | --- | --- |
| 5-1 | Tb0.16Fe0.84 | 125 |
| 5-2 | Tb0.16(Fe0.94Co0.06)0.84 | 155 |
| 5-3 | Tb0.16(Fe0.87Co0.13)0.84 | 200 |
| 5-4 | Tb0.16(Fe0.82Co0.18)0.84 | 240 |
| 5-5 | Tb0.16(Fe0.75Co0.25)0.84 | 270 |
| 5-6 | Tb0.16(Fe0.70Co0.30)0.84 | 310 |
| 5-7 | Tb0.16(Fe0.67Co0.33)0.84 | — |
| 5-8 | Tb0.16(Fe0.60Co0.40)0.84 | — |

Rare earth-transition metal alloys having compositions of Dy0.30(Fe1−xCox)0.70 were used for the auxiliary recording layers 14. The composition of the auxiliary recording layer 14 was adjusted with relation to the composition of the recording layer 13 so that the difference between the Curie temperature of the auxiliary recording layer 14 and the Curie temperature of the recording layer 13 was about 60K. The auxiliary recording layers 14 were manufactured by DC magnetron sputtering, using targets of various different compositions manufactured by alloy casting, under the following conditions: argon gas pressure 0.4 mTorr; and supplied power 100 W.

For each composition shown in FIG. 5 for the recording layer 13, test pieces were made with the film thickness of the auxiliary recording layer 14 ranging from 0 angstroms to 80 angstroms by steps of 5 angstroms, and their sensitivities with respect to a modulation magnetic field were investigated. It should be understood that these are not actually measured values for the film thickness of the auxiliary recording layer 14, but are values calculated from the speed of formation of the auxiliary recording layer 14 which was measured in advance, and from the time periods for sputtering which were actually measured. Recording upon the test pieces was performed under the following conditions: linear velocity 1.4 m/s; recording frequency 720 kHz; and modulation magnetic field ±35 Oersted.

Figure 16:
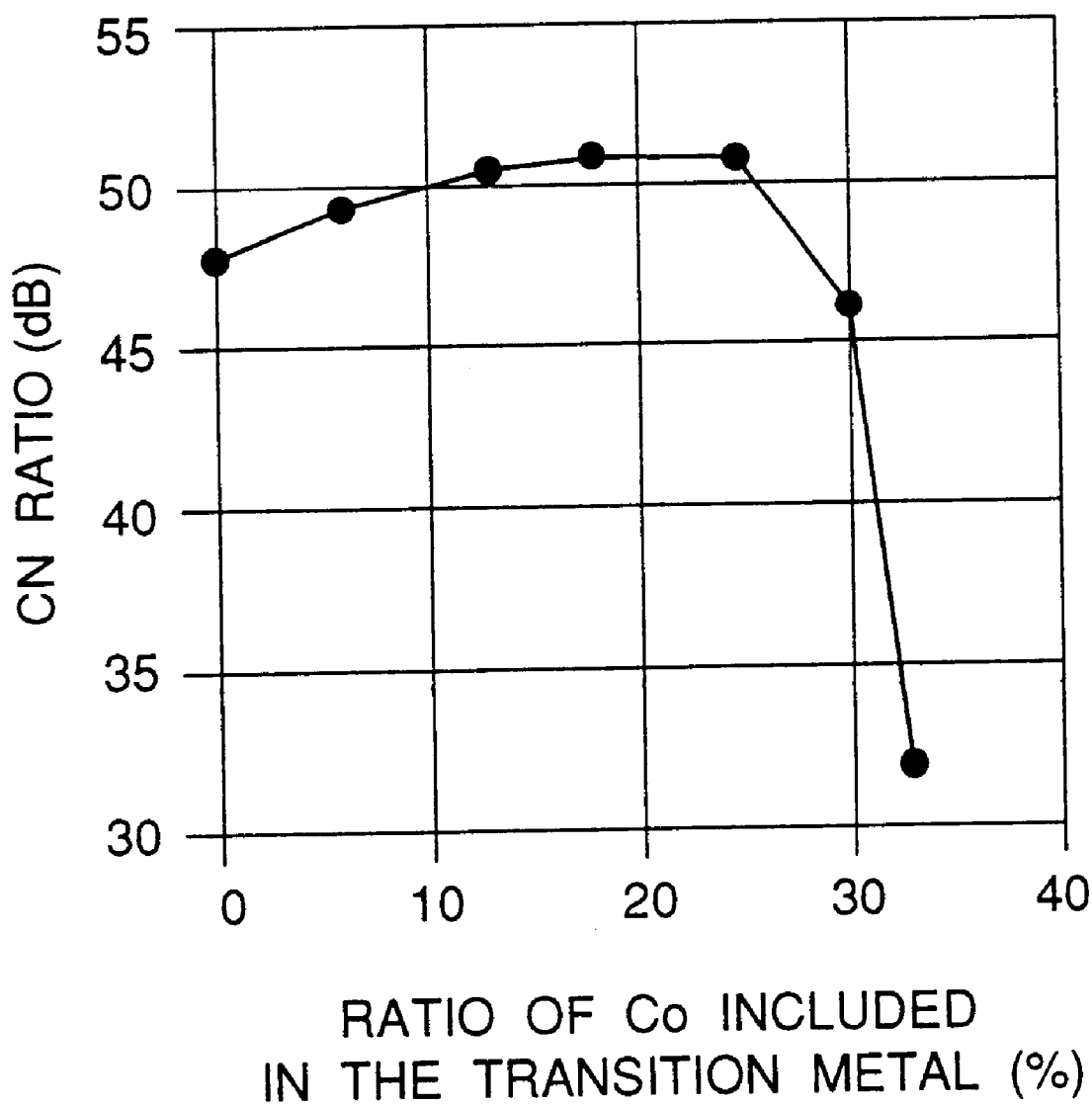
FIG. 16 is a figure showing the relationship between the proportion of Co included in the transition metal of the recording layer according to a sixth embodiment of the present invention and the CN ratio.

FIG. 16 shows the relationship between the Co proportion (the ratio included in the transition metal) of the recording layers 13 of compositions of the test pieces numbers 5-1 through 5-8 and the CN ratio of the test pieces. Here, for the film thickness of the auxiliary recording layer 14, that film thickness was chosen which exhibited the maximum CN ratio for each recording layer composition. The recording laser power was chosen as that laser power for which the CN ratio was the greatest.

When recording was performed with a modulation magnetic field of ±35 Oersted, the CN ratio exhibited good values for Co ratios less than or equal to 30%, and exhibited yet higher values when it was less than or equal to 25%. As for a lower limit for the Co ratio, the CN ratio exhibited the most desirable value at a Co ratio greater than or equal to 6%, and even when the Co ratio was 0% it was understood that the CN ratio exhibited a good value. If the Co ratio was greater than or equal to 30%, not only was the CN ratio not good, but also the laser power necessary for recording became high because the Curie temperature was high. Accordingly recording layers of composition with Co ratio 30% or higher are not desirable in practice.

7. Embodiment 7

Figure 17:
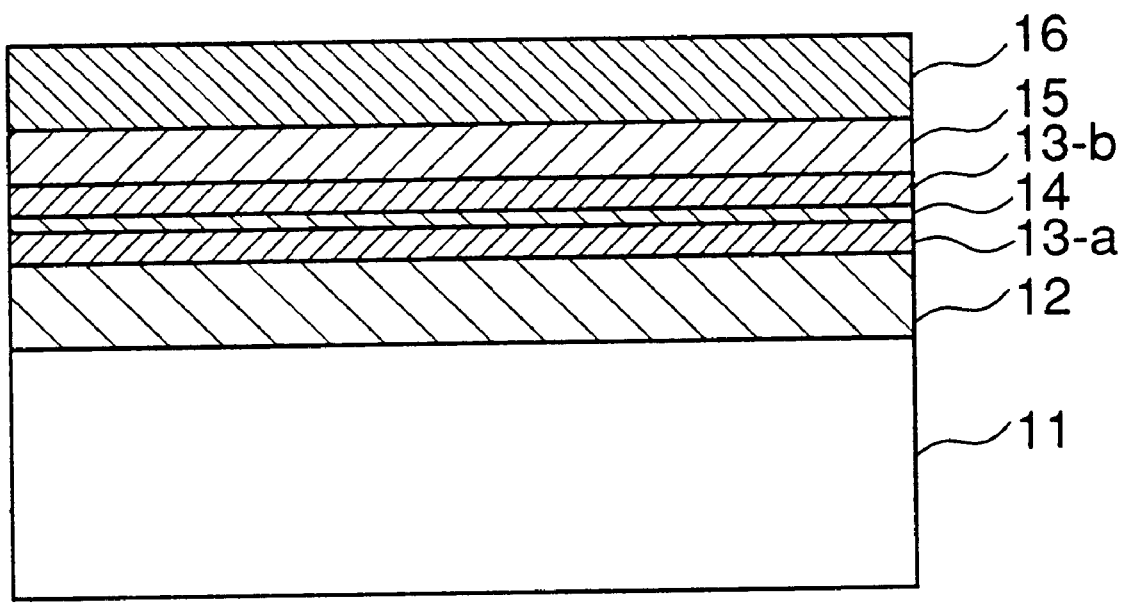
FIG. 17 is a sectional view of a magneto-optical recording medium according to a seventh embodiment of the present invention.

This embodiment, as shown in FIG. 17, has a three layered structure including as recording film a stabilizing layer 13a, a recording layer 13b, and an auxiliary recording layer 14. In detail, a first dielectric layer 12, a stabilizing layer 13a, a recording layer 13b, an auxiliary recording layer 14, a second dielectric layer 15, and a reflective layer 16 are sequentially laminated upon the surface of a transparent substrate 11.

(1) Experiment 11: Relationship between the film thickness of the auxiliary recording layer 14 and the magnetic field sensitivity.

The conditions of manufacture of the first dielectric layer 12, the second dielectric layer 15, and the reflective layer 16 were the same as in Embodiment 1. The stabilizing layer 13a and the recording layer 13b were formed by DC magnetron sputtering under the following conditions: argon gas pressure 1.2 mTorr; and supplied power 300 W. The composition of the stabilizing layer 13a was Tb0.25Fe0.75, and its Curie temperature was 125 degrees centigrade. The composition of the recording layer 13b was Tb0.09(Fe0.93Co0.07)0.91, and its Curie temperature was 170 degrees centigrade. And the composition of the auxiliary recording layer 14 was Dy0.31Co0.69, and its Curie temperature was greater than or equal to 300 degrees centigrade. The auxiliary recording layer 14 was formed by DC magnetron sputtering under the following conditions: argon gas pressure 0.4 mTorr; and supplied power 100 W.

Test pieces were made with the film thickness of the auxiliary recording layer 14 ranging from 0 to 100 angstroms by steps of 5 angstroms, with the film thicknesses of the first dielectric layer 12, the stabilizing layer 13a, the recording layer 13b, the second dielectric layer 15 and the reflective layer 16 being respectively 600, 20, 200, 200, and 600 angstroms, and their sensitivities with respect to the modulation magnetic field were investigated. It should be understood that these are not actually measured values for the film thickness of the auxiliary recording layer 14, but are values calculated from the speed of formation of the auxiliary recording layer 14 which was measured in advance, and from the time periods for sputtering which were actually measured. For the purposes of comparison, media were also made of structure including no stabilizing layer, and their characteristics were investigated. Recording was performed under the following conditions: linear velocity 1.4 m/s; recording frequency 720 kHz; recording power 7.0 mW; and modulation magnetic field ±35 Oersted.

Figure 18:
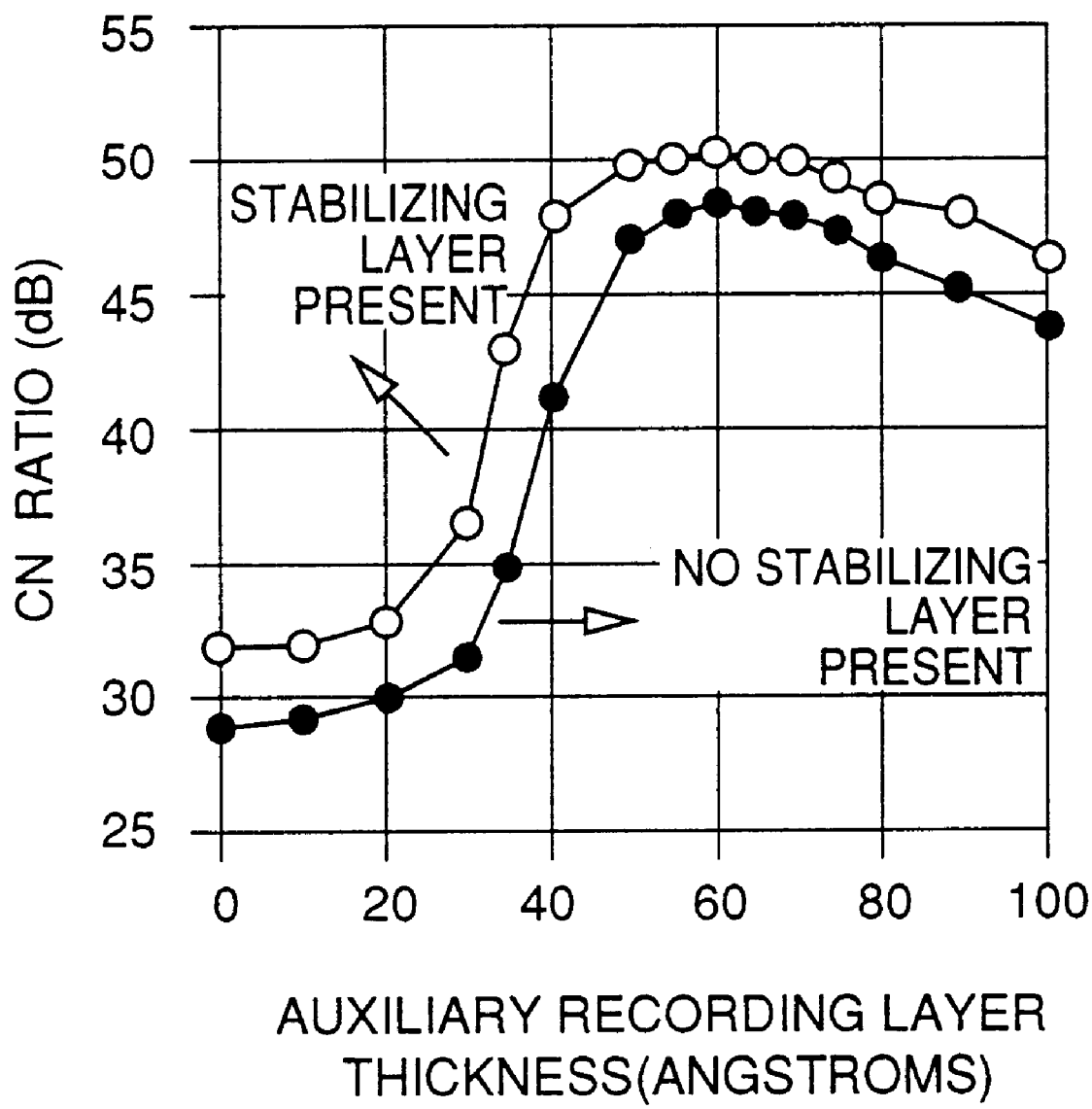
FIG. 18 is a figure showing the relationship between the film thickness of an auxiliary recording layer according to the seventh embodiment and the CN ratio.

FIG. 18 shows the relationship between the film thickness of the auxiliary recording layer 14 and the CN ratio.

It will be understood that the magnetic field sensitivity was improved by the formation of the auxiliary recording layer 14 even for the media which included no stabilizing layer 13a (the plot of the 'O' symbols). Further, the magnetic field sensitivity was improved by the formation of the auxiliary recording layer 14 for the media which had the stabilizing layer 13a of 20 angstroms thickness as well, and it will be understood that the CN ratio was somewhat higher in comparison with the media which had no stabilizing layer 13a.

Figure 19:
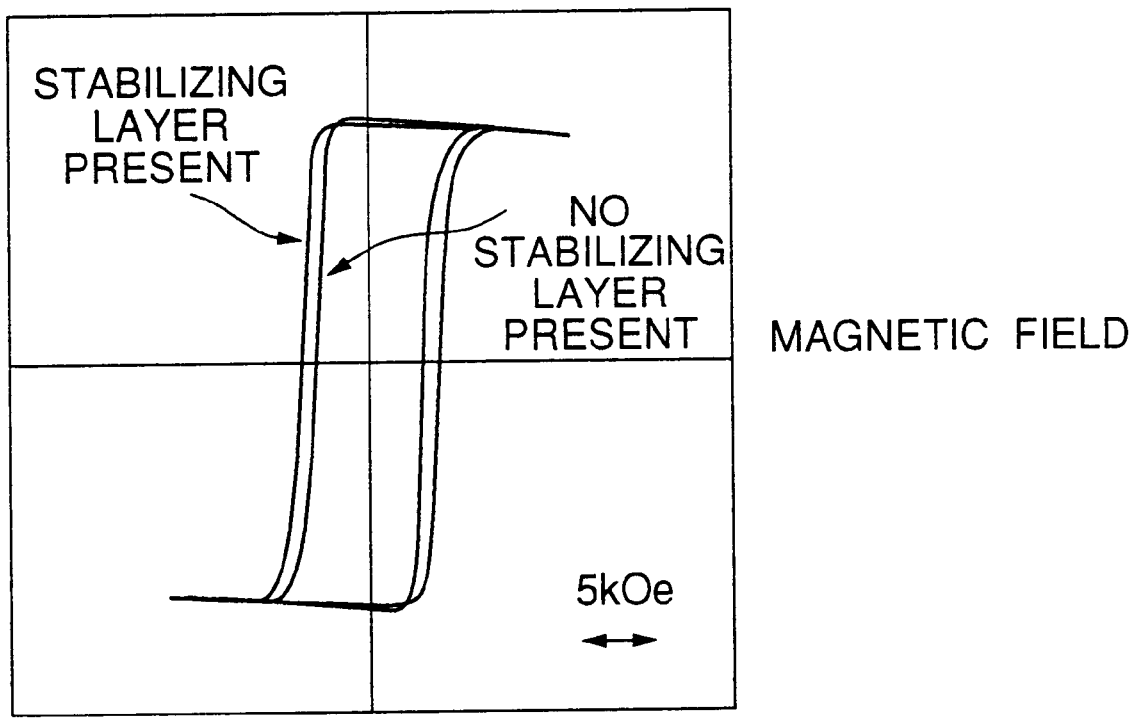
FIG. 19 is a figure showing the difference in the Kerr hysteresis loop for the seventh embodiment, according to the presence or absence of a stabilizing layer.

FIG. 19 shows the variations in the Kerr hysteresis loop due to the presence and absence of the stabilizing layer 13a. Here, in both cases, the film thickness of the auxiliary recording layer 14 was 50 angstroms. It will be understood that the coercivity was increased by the formation of the stabilizing layer 13a.

It is considered that it is possible to store information more stably due to the formation of the stabilizing layer 13a as shown above, which increases the coercivity. Desirable characteristics for the stabilizing layer 13a are for the coercivity at room temperature to be higher than that of the recording layer 13b and for the Curie temperature to be lower than that of the recording layer 13b. It is considered to be necessary for the coercivity of the stabilizing layer 13a at room temperature to be 3000 Oersted at minimum, and desirably to be above about 5000 Oersted. A stabilizing layer which fulfils this type of characteristic provides the beneficial effect of increasing the coercivity at room temperature of a superposed layer type recording film while exerting hardly any influence upon recording. It is necessary for the film thickness of the stabilizing layer 13a to be thinner than that of the recording layer 13b, and it is considered that a considerable beneficial effect is available with a thickness of from 10 angstroms to a few tens of angstroms. It is considered that the influence upon recording is extremely small, although, since as shown in FIG. 18 the CN ratio changes somewhat according to the presence or absence of the stabilization layer 13a, it is not true that no influence at all is exerted upon recording. By utilizing the three layered structure including the stabilizing layer 13a/the recording layer 13b/the auxiliary recording layer 14, it becomes possible to use a material for the recording layer 13b which has a small coercivity characteristic at room temperature. Accordingly it is considered that it becomes possible to widen the scope of selection for the recording layer 13b, since it becomes possible to profit from a recording layer 13b which has a higher magnetization.

8. Embodiment 8

This embodiment utilizes a Pt/Co magnetic multilayer film (which is a combination of multiple alternating ultrathin Pt layers and Co layers) as the recording layer 13. As shown in FIG. 1, a first dielectric layer 12, a recording layer 13, an auxiliary recording layer 14, a second dielectric layer 15, and a reflective layer 16 are sequentially laminated upon the surface of a transparent substrate 11.

(1) Experiment 12: Relationship between the film thickness of the auxiliary recording layer 14 and the magnetic field sensitivity.

For the recording layer 13, a multiple layer film including Pt layers and Co layers was made by DC magnetron sputtering using a Pt target and a Co target under the following conditions: argon gas pressure 1.8 mTorr; and supplied power 300 W. After the process of laying down a Pt layer of film thickness 8 angstroms and a Co layer of film thickness 3 angstroms upon one another had been repeated 14 times, another Pt layer of film thickness 8 angstroms was superimposed. The coercivity at room temperature of the recording layer by itself was 780 Oersted.

A rare earth-transition metal alloy having a composition Tb0.34(Fe0.45Co0.55)0.66 was used for the auxiliary recording layer 14. The auxiliary recording layer 14 was formed by DC magnetron sputtering according to a three element co-sputtering method using a Tb target, a Fe target, and a Co target under the following conditions: argon gas pressure 0.4 mTorr; and supplied power 100 W. The Curie temperature of the auxiliary recording layer 14 was 340 degrees centigrade. The conditions of manufacture of the first dielectric layer 12, the second dielectric layer 15, and the reflective layer 16 were the same as in Experiment 1.

Test pieces were made with the film thickness of the auxiliary recording layer 14 ranging from 0 to 80 angstroms by steps of 5 angstroms, with the film thicknesses of the first dielectric layer 12, the recording layer 13, the second dielectric layer 15 and the reflective layer 16 being respectively 600, 200, 200, and 600 angstroms, and their sensitivities to the modulation magnetic field were investigated. It should be understood that these are not actually measured film thickness values for the auxiliary recording layer 14, but are values calculated from the speed of formation of the auxiliary recording layer 14 which was measured in advance, and from the time periods for sputtering which were actually measured. Recording upon the test pieces was performed under the following conditions: linear velocity 1.4 m/s; recording frequency 720 kHz; recording power 8.0 mW; and modulation magnetic field ±50 Oersted.

Figure 20:
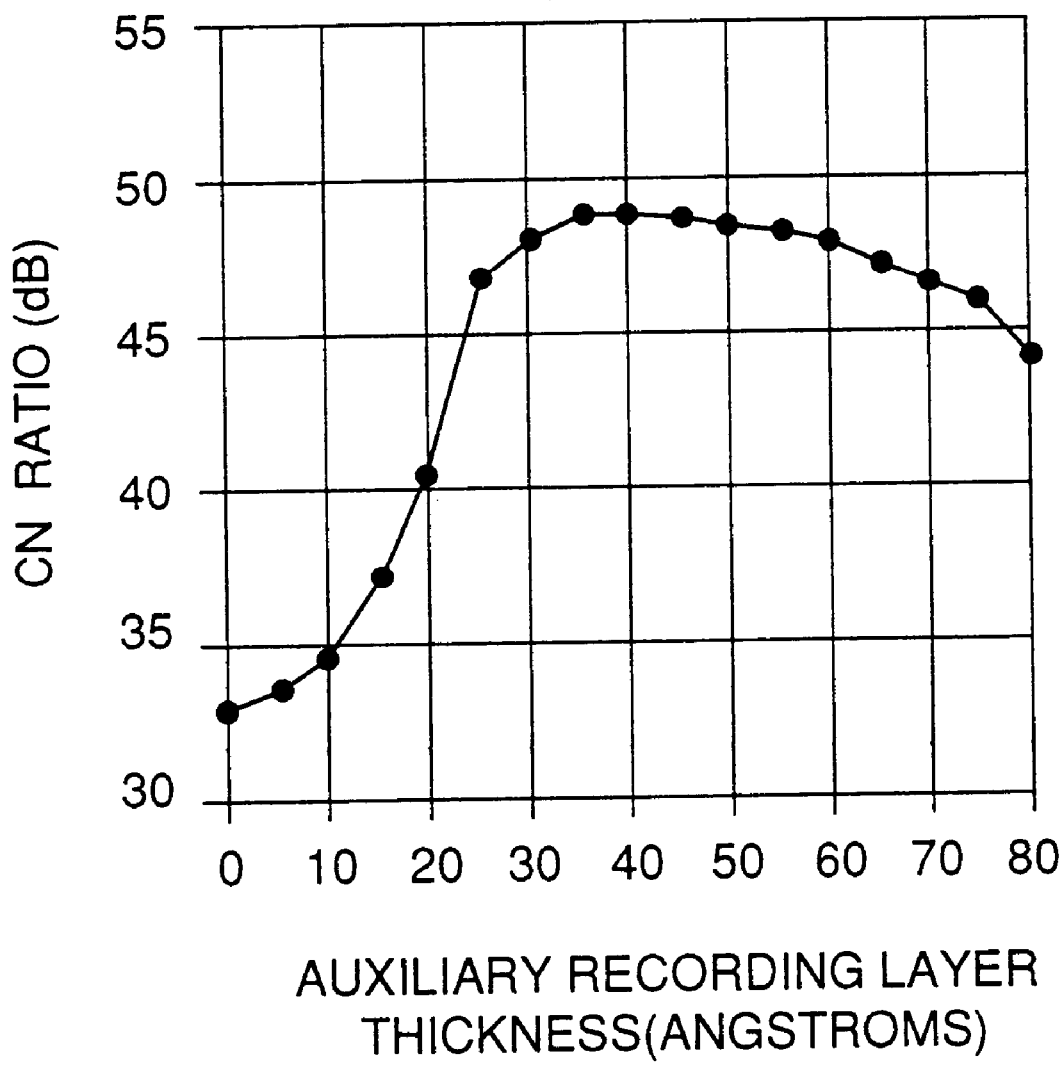
FIG. 20 is a figure showing the relationship between the film thickness of an auxiliary recording layer according to an eighth embodiment of the present invention and the CN ratio.

FIG. 20 is a figure showing the relationship between the film thickness of the auxiliary recording layer 14 and the CN ratio.

The CN ratio when recording was performed using a modulation magnetic field of ±50 Oersted strongly depended upon the thickness of the auxiliary recording layer 14, and a beneficial effect was observed over the range from 20 angstroms to 70 angstroms, and in particular a remarkably great CN ratio was obtained in the region from 25 angstroms to 60 angstroms. Above 60 angstroms, the CN ratio somewhat diminished along with increase of film thickness.

(2) Experiment 13: Relationship between the film thickness of the auxiliary recording layer 14 and the magnetic field sensitivity, when a different Pt/Co magnetic multilayer film was used.

Here, a different Pt/Co magnetic multilayer film was used for the recording layer 13. Apart from the Pt/Co magnetic multilayer film recording layer, the conditions were the same as in Experiment 12. For making the recording layer 13, after the process of laying down a Pt layer of film thickness 15 angstroms and a Co layer of film thickness 5 angstroms upon one another had been repeated 8 times, another Pt layer of film thickness 15 angstroms was superimposed. The coercivity at room temperature of the recording layer by itself was 850 Oersted.

A rare earth-transition metal alloy having a composition Tb0.32Co0.68 was used for the auxiliary recording layer 14. The auxiliary recording layer 14 was formed by DC magnetron sputtering according to a two element co-sputtering method using a Tb target and a Co target under the following conditions: argon gas pressure 0.4 mTorr; and supplied power 100 W. The Curie temperature of the auxiliary recording layer 14 was 350 degrees centigrade. The conditions of manufacture of the first dielectric layer 12, the second dielectric layer 15, and the reflective layer 16 were the same as in Experiment 1.

Test pieces were made with the film thickness of the auxiliary recording layer 14 ranging from 0 to 100 angstroms by steps of 5 angstroms, with the film thicknesses of the first dielectric layer 12, the recording layer 13, the second dielectric layer 15 and the reflective layer 16 being respectively 600, 175, 900, and 600 angstroms, and their sensitivities to the modulation magnetic field were investigated. It should be understood that these are not actually measured film thickness values for the auxiliary recording layer 14, but are values calculated from the speed of formation of the auxiliary recording layer 14 which was measured in advance, and from the time periods for sputtering which were actually measured. Recording upon the test pieces was performed under the following conditions: linear velocity 1.4 m/s; recording frequency 720 kHz; recording power 8.7 mW; and modulation magnetic field ±50 Oersted.

Figure 21:
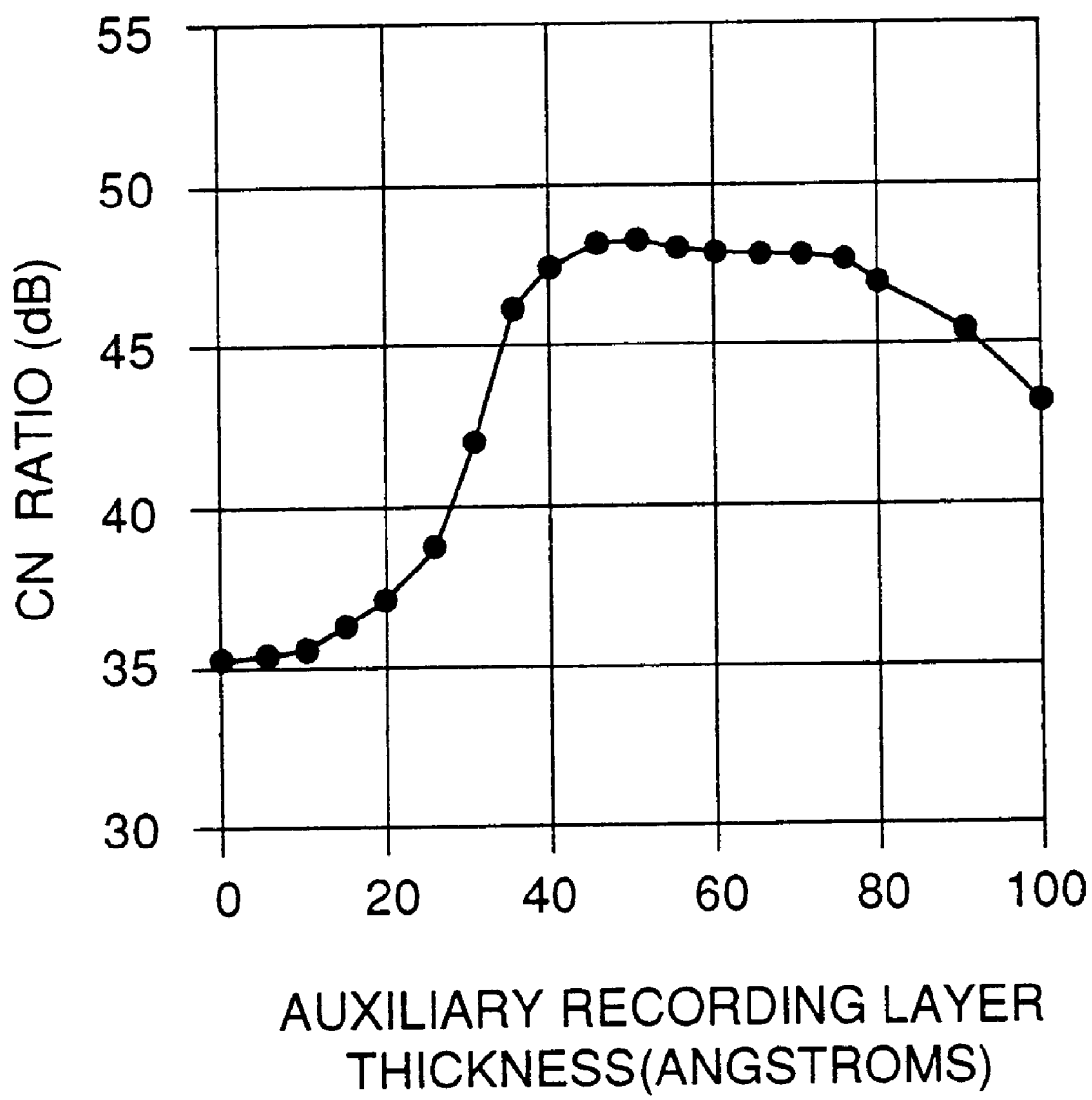
FIG. 21 is a figure showing the relationship between the auxiliary recording layer film thickness and the CN ratio in the case that another magnetic multilayer film has been used as the recording layer in the eighth embodiment.

FIG. 21 is a figure showing the relationship between the film thickness of the auxiliary recording layer 14 and the CN ratio.

The CN ratio when recording was performed using a modulation magnetic field of ±50 Oersted strongly depended upon the thickness of the auxiliary recording layer 14, and a beneficial effect was observed over the range from 25 angstroms to 100 angstroms, and in particular a remarkably great CN ratio was obtained in the region from 35 angstroms to 90 angstroms. Above 80 angstroms, the CN ratio somewhat diminished along with increase of film thickness.

As described above, it is possible to perform recording with a weak magnetic field, not only with a rare earth-transition metal alloy as the recording layer 13, but also using a Pt/Co magnetic multilayer film. Further, a magnetization artificial lattice film made from not only Pt/Co, but also Pd/Co, Pt/Fe, Au/Co, Au/Fe or the like, which has an easy perpendicular axis of magnetization at room temperature and also high coercivity, can be utilized for the recording layer 13.

9. Embodiment 9

This embodiment has the sectional structure of FIG. 1. Rare earth-transition metal alloys are used for the recording layer 13 and for the auxiliary recording layer 14, and a very small amount of Cr is added to the recording layer 13. The main objective of adding the Cr is to suppress change of performance over the passage of time, so as to enhance the dependability of the medium. The Curie temperature of the auxiliary recording layer 14 is higher than that of the recording layer 13. To show exemplary materials for each of the layers: the transparent substrate 11 is polycarbonate substrate; the first dielectric layer 12 and the second dielectric layer 15 are AlSiN layers; the recording layer 13 is a TbFeCoCr layer, the auxiliary recording layer 14 is a DyFeCo layer, and the reflective layer 16 is an Al layer.

Experiments were performed as follows in order to investigate the characteristics of this embodiment.

(1) Experiment 14: Relationship between the film thickness of the auxiliary recording layer 14 and the magnetic field sensitivity.

A rare earth-transition metal alloy having a composition Tb0.14(Fe0.93Co0.07)0.80Cr0.06 was used for the recording layer 13. The recording layer 13 was formed by DC magnetron sputtering, using an alloy target manufactured by casting, under the following conditions: argon gas pressure 1.2 mTorr; and supplied power 300 W. The Curie temperature of the recording layer 13 was 150 degrees centigrade.

A rare earth-transition metal alloy having a composition Dy0.30(Fe0.50Co0.50)0.70 was used for the auxiliary recording layer 14. The auxiliary recording layer 14 was formed by DC magnetron sputtering, using an alloy target manufactured by casting, under the following conditions: argon gas pressure 0.4 mTorr; and supplied power 100 W. Its Curie temperature was 280 degrees centigrade.

AlSiN was used as the material of the first dielectric layer 12 and the second dielectric layer 15. The first dielectric layer 12 and the second dielectric layer 15 were made by sputtering using an AlSiN alloy target under the following conditions: sputter gas Ar 60%+N2 40%; gas pressure 1.7 mTorr; and supplied power 2500 W. The reflective layer 16 was made by sputtering using an Al target under the following conditions: argon gas pressure 1.5 mTorr; and power 660 W.

With this method of sequentially laminating the first dielectric layer 12, the recording layer 13, the auxiliary recording layer 14, the second dielectric layer 15, and the reflective layer 16 upon the surface of the transparent substrate 11, test pieces according to this embodiment were made with the film thickness of the auxiliary recording layer 14 ranging from 0 to 80 angstroms by steps of 5 angstroms, with the film thicknesses of the first dielectric layer 12, the recording layer 13, the second dielectric layer 15 and the reflective layer 16 being respectively 600, 200, 200, and 600 angstroms. And the sensitivities of these test pieces to the modulation magnetic field were investigated. It should be understood that these are not actually measured film thickness values for the auxiliary recording layer 14, but are values calculated from the speed of formation of the auxiliary recording layer 14 which was measured in advance, and from the time periods for sputtering which were actually measured. Recording upon the test pieces was performed under the following conditions: linear velocity 1.4 m/s; recording frequency 720 kHz; recording power 5.8 mW; and modulation magnetic field ±35 Oersted.

Figure 22:
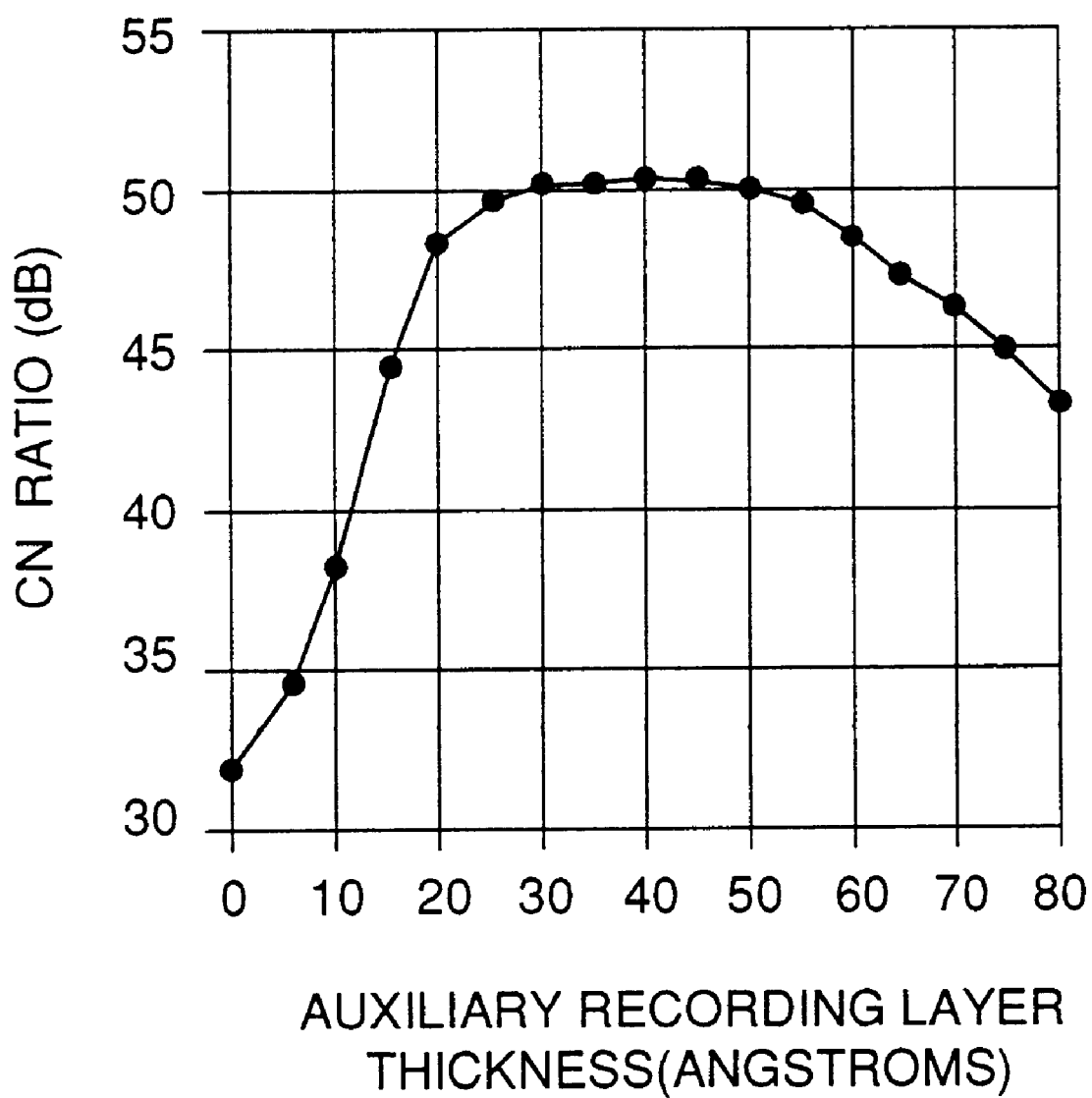
FIG. 22 is a figure showing the relationship between the film thickness of an auxiliary recording layer according to an ninth embodiment of the present invention and the CN ratio.

FIG. 22 is a figure showing the relationship between the film thickness of the auxiliary recording layer 14 and the CN ratio. It will be understood that an improvement of the CN ratio appeared even when an extremely thin auxiliary recording layer 14 of thickness just 10 angstroms was manufactured. The CN ratio when recording was performed using a weak modulation magnetic field of 35 Oersted strongly depended upon the thickness of the auxiliary recording layer 14, and a high CN ratio worth practical use was observed in the range from 15 angstroms to 70 angstroms, and in particular a remarkably great CN ratio was obtained in the range from 25 angstroms to 50 angstroms. In the film thickness range above 55 angstroms, the CN ratio diminished along with increase of film thickness.

(2) Experiment 15: Relationship between the amount of Cr contained in the recording layer 13 and the magnetic field sensitivity.

Next, the relationship between the amount of Cr contained in the TbFeCoCr of the recording layer 13 and the magnetic field sensitivity was investigated. The test pieces were manufactured under the same conditions as in Experiment 1, except for the compositions of the recording layers 13. The recording layers 13 were formed by DC magnetron sputtering, using targets of various different compositions manufactured by alloy casting, under the following conditions: argon gas pressure 1.2 mTorr; and supplied power 300 W.

The compositions of the recording layers 13 which were manufactured are shown in Table 6. The proportions between Fe and Co were adjusted so that the Curie temperature of the recording layers 13 was constant.

TABLE 6

| Test piece number | Composition | Elapsed time for drop in C/N [h] |
|---|---|---|
| 6-1 | Tb0.15(Fe0.96Co0.04)0.85 | 900 |
| 6-2 | Tb0.15(Fe0.95Co0.05)0.82Cr0.03 | 1100 |
| 6-3 | Tb0.15(Fe0.94Co0.06)0.79Cr0.06 | 1300 |
| 6-4 | Tb0.15(Fe0.92Co0.08)0.77Cr0.08 | 1400 |
| 6-5 | Tb0.15(Fe0.89Co0.11)0.75Cr0.10 | 1500 |
| 6-6 | Tb0.15(Fe0.87Co0.13)0.73Cr0.12 | 1800 |
| 6-7 | Tb0.15(Fe0.86Co0.15)0.72Cr0.13 | >2000 |
| 6-8 | Tb0.15(Fe0.83Co0.17)0.70Cr0.15 | >2000 |

A rare earth-transition metal alloy having composition of Dy0.30(Fe0.50Co0.50)0.70 was used for the auxiliary recording layers 14. The Curie temperature of the auxiliary recording layers 14 was 280 degrees centigrade. For each recording layer composition shown in Table 6, test pieces were made with the film thickness of the auxiliary recording layer 14 ranging from 0 angstroms to 80 angstroms by steps of 5 angstroms, and their sensitivities with respect to a modulation magnetic field for the magneto-optical recording medium were investigated. It should be understood that these are not actually measured values for the film thickness of the auxiliary recording layer 14, but are values calculated from the speed of formation of the auxiliary recording layer 14 which was measured in advance, and from the time periods for sputtering which were actually measured. Recording upon the test pieces was performed under the following conditions: linear velocity 1.4 m/s; recording frequency 720 kHz; recording laser power 6.0 mW; and modulation magnetic field ±35 Oersted.

Figure 23:
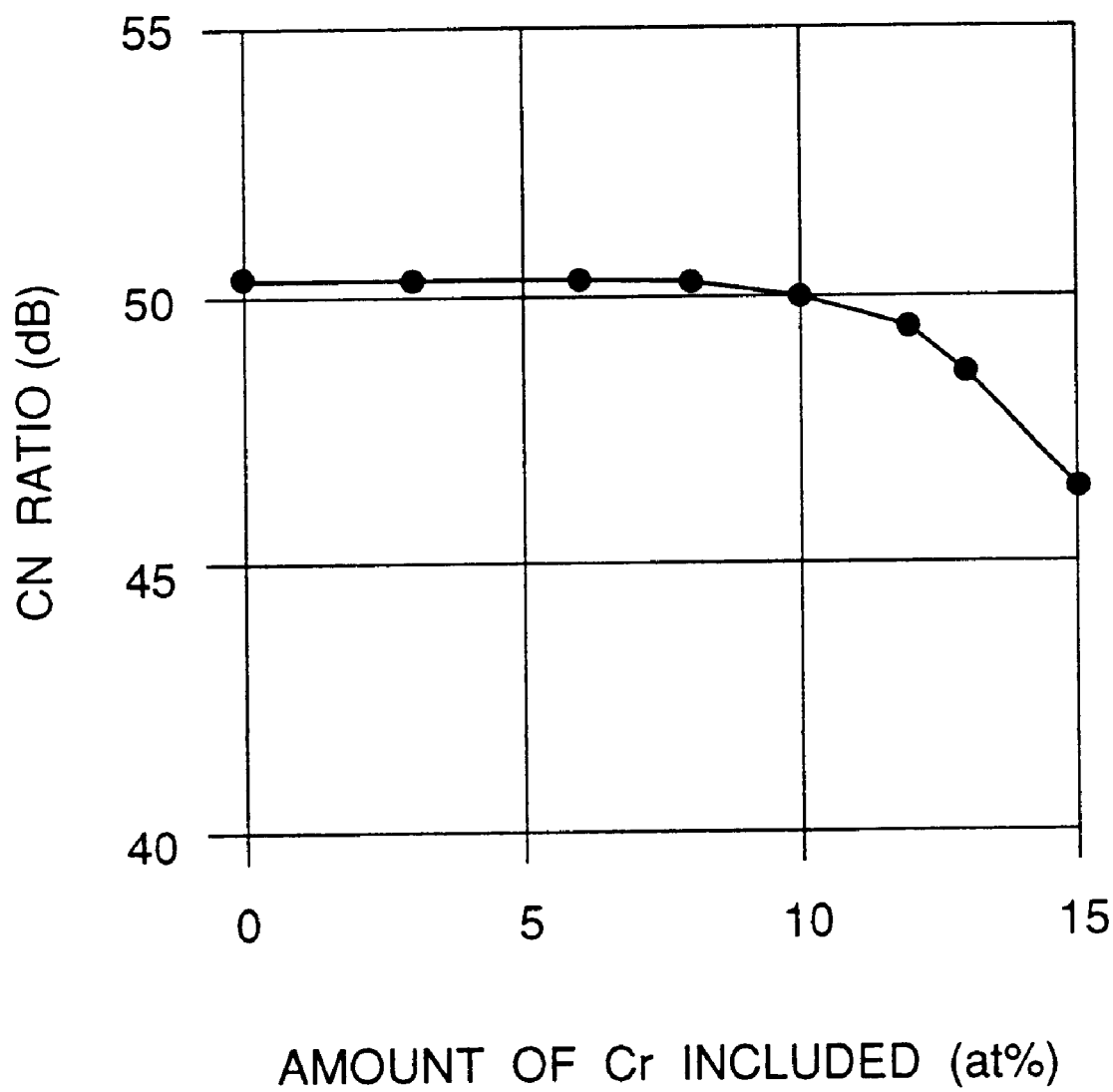
FIG. 23 is a figure showing the relationship between the proportion of Cr included in the recording layer according to the ninth embodiment and the CN ratio.

FIG. 23 shows the relationship between the amount of Cr included in the eight kinds of recording layer composition shown in Table 6 and the CN ratio. A film thickness for the auxiliary recording layer 14 which exhibited the maximum CN ratio for each recording layer composition. The linear velocity and the recording frequency were the same as in Experiment 14. When recording was performed with a modulation magnetic field of ±35 Oersted, the CN ratio exhibited good values for amounts of included Cr less than or equal to 12 at %, exhibited yet higher values when it was less than or equal to 10 at %, and exhibited the highest values when it was less than or equal to 8 at %.

(3) Experiment 16: Relationship between the amount of Cr contained in the recording layer 13 and the reliability.

Next, the relationship between the amount of Cr contained in the TbFeCoCr of the recording layer 13 and the reliability of the medium was investigated. Test pieces of magneto-optical recording medium having recording layers 13 of the eight kinds of composition shown in Table 6 were left in an atmosphere at 80 degrees centigrade and 80% RH, and the CN ratios were measured each 100 hours. The elapsed time period until the CN ratio dropped by 3 dB as compared with that directly after manufacture is shown in Table 6. The recording was performed under the following conditions: linear velocity 1.4 m/s; recording frequency 720 kHz; recording laser power 6.0 mW; and modulation magnetic field ±35 Oersted. Further, the film thickness of the auxiliary recording layer 14 was chosen, for each recording layer composition, as that film thickness for which the CN ratio was the greatest.

With regard to the composition of the test piece number 6-1 in which no Cr was included, the CN ratio had dropped with respect to the value directly after manufacture by 3 dB or more when 900 hours had elapsed. In the range where the amount of included Cr was 15% or less, the greater was the amount of included Cr, the longer was the time period until dropping of the CN ratio; in other words, the greater was the reliability of the medium. However, in practice, it is considered that an amount of included Cr less than or equal to 12 at % is desirable, in view of the relationship with the magnetic field sensitivity shown in FIG. 23.

10. Embodiment 10

This embodiment replaces the Cr contained in the recording layer 13 of the ninth embodiment with Ti, and is one in which the composition of the recording layer 13 is TbFeCoTi. The construction including the compositions of the other layers, and the thicknesses of the various layers and the order of their superposition and so on, is the same as in Embodiment 1. The objective of adding Ti, just as for Cr, is to suppress change of performance of the medium over the passage of time. The following experiments were performed in order to investigate the characteristics of this embodiment.

(1) Experiment 17: Relationship between the amount of Ti contained in the recording layer 13 and the magnetic field sensitivity.

First, the relationship between the amount of Ti and the magnetic field sensitivity was investigated. Apart from the composition of the recording layer 13, the test pieces of magneto-optical recording medium were manufactured under conditions identical to the case of Experiment 15 for Embodiment 9. The manufacture of the recording layer 13 was performed by DC magnetron sputtering, using targets of various different compositions manufactured by alloy casting, under the following conditions: argon gas pressure 1.2 mTorr; and supplied power 300 W.

The recording layer compositions which were tested are shown in Table 7. The proportions between Fe and Co were adjusted so that the Curie temperature of the recording layers 13 was constant.

TABLE 7

| Test piece number | Composition | Elapsed time for drop in C/N [h] |
| --- | --- | --- |
| 7-1 | Tb0.15(Fe0.96Co0.04)0.85 | 900 |
| 7-2 | Tb0.15(Fe0.95Co0.05)0.82Ti0.03 | 1000 |
| 7-3 | Tb0.15(Fe0.92Co0.08)0.79Ti0.06 | 1100 |
| 7-4 | Tb0.15(Fe0.90Co0.10)0.77Ti0.08 | 1200 |
| 7-5 | Tb0.15(Fe0.87Co0.13)0.75Ti0.10 | 1300 |
| 7-6 | Tb0.15(Fe0.84Co0.16)0.73Ti0.12 | 1400 |
| 7-7 | Tb0.15(Fe0.83Co0.17)0.72Ti0.13 | 1500 |
| 7-8 | Tb0.15(Fe0.80Co0.20)0.70Ti0.15 | 1700 |

A rare earth-transition metal alloy having composition of Dy0.30(Fe0.50Co0.50)0.70 was used for the auxiliary recording layers 14. The Curie temperature of the auxiliary recording layers 14 was 280 degrees centigrade. For each recording layer composition shown in Table 7, test pieces were made with the film thickness of the auxiliary recording layer 14 ranging from 0 angstroms to 80 angstroms by steps of 5 angstroms, and the sensitivities of these test pieces with respect to a modulation magnetic field were investigated. It should be understood that these are not actually measured values for the film thickness of the auxiliary recording layer 14, but are values calculated from the speed of formation of the auxiliary recording layer 14 which was measured in advance, and from the time periods for sputtering which were actually measured. Recording upon the test pieces was performed under the following conditions: linear velocity 1.4 m/s; recording frequency 720 kHz; recording laser power 6.0 mW; and modulation magnetic field ±35 Oersted.

Figure 24:
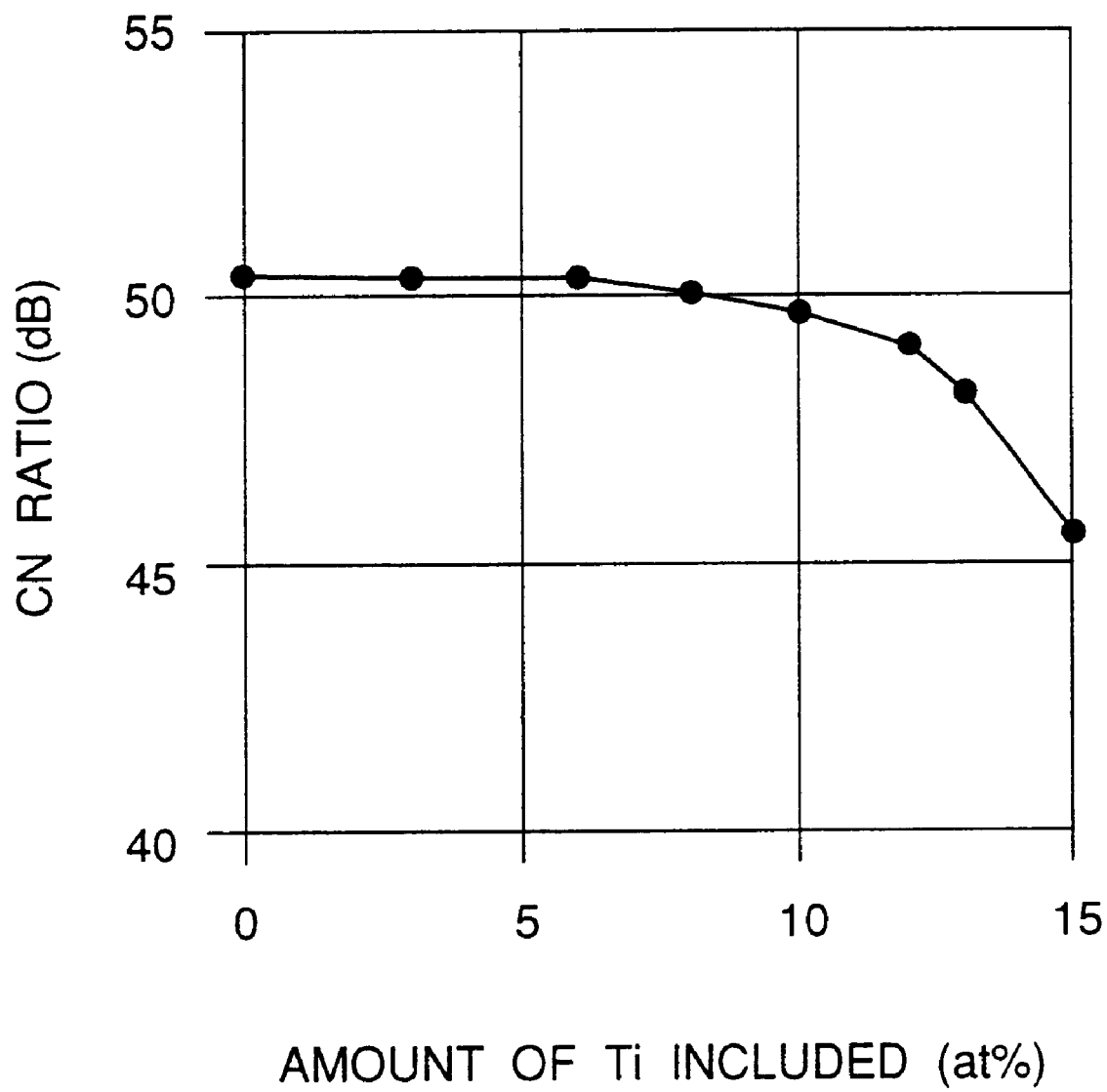
FIG. 24 is a figure showing the relationship between the proportion of Ti included in a recording layer according to a tenth embodiment of the present invention and the CN ratio.

FIG. 24 shows the relationship between the amount of Ti included in the eight kinds of recording layer composition shown in Table 7 and the CN ratio. A film thickness for the auxiliary recording layer 14 which exhibited the maximum CN ratio for each recording layer composition. The linear velocity and the recording frequency were the same as in Experiment 15 for Embodiment 9.

When recording was performed with a modulation magnetic field of ±35 Oersted, the CN ratio exhibited good values for amounts of included Ti less than or equal to 12 at %, exhibited yet higher values when it was less than or equal to 10 at %, and exhibited the highest values when it was less than or equal to 8 at %.

(2) Experiment 18: Relationship between the amount of Ti contained in the recording layer 13 and the reliability.

Next, the relationship between the amount of Ti contained in the TbFeCoTi of the recording layer 13 and the reliability of the medium was investigated. Test pieces of magneto-optical recording medium having recording layers 13 of the eight kinds of composition shown in Table 7 were left in a atmosphere at 80 degrees centigrade and 80% RH, and the CN ratios were measured each 100 hours. The elapsed time period until the CN ratio dropped by 3 dB as compared with that directly after manufacture is shown in Table 7. The recording upon the test pieces was performed under the following conditions: linear velocity 1.4 m/s; recording frequency 720 kHz; recording laser power 6.0 mW; and modulation magnetic field ±35 Oersted. Further, the film thickness of the auxiliary recording layer 14 was chosen, for each recording layer composition, as that film thickness for which the CN ratio was the greatest.

With regard to the composition of the test piece number 7-1 in which no Ti was included, the CN ratio had dropped with respect to the value directly after manufacture by 3 dB or more when 900 hours had elapsed. In the range where the amount of included Ti was 15% or less, it will be understood that the greater was the amount of included Ti, the longer was the time period for the CN ratio to drop; in other words, the greater was the reliability of the medium. However, in practice, it is considered that an amount of included Ti up to 12 at % is desirable, in view of the relationship with the magnetic field sensitivity shown in FIG. 24.

11. Embodiment 11

This embodiment replaces the Cr contained in the recording layer 13 of the ninth embodiment with Al, and is one in which the composition of the recording layer 13 is TbFe-CoAl. The construction including the compositions of the other layers, and the thicknesses of the various layers and the order of their superposition and so on, is the same as in Embodiment 9. The objective of adding Al, just as for Cr or Ti, is to suppress change of performance of the medium over the passage of time. The following experiments were performed in order to investigate the characteristics of this eleventh embodiment.

(1) Experiment 19: Relationship between the amount of Al contained in the recording layer 13 and the magnetic field sensitivity.

The relationship between the amount of Al contained in the TbFeCoAl of the recording layer 13 and the magnetic field sensitivity was investigated. Apart from the composition of the recording layer 13, the test pieces of magneto-optical recording medium were manufactured under conditions identical to the case of Experiment 15 for Embodiment 9. The manufacture of the recording layer 13 was performed by DC magnetron sputtering, using targets of various different compositions manufactured by alloy casting, under the following conditions: argon gas pressure 1.2 mTorr; and supplied power 300 W. The recording layer compositions which were tested are shown in Table 8. The proportions between Fe and Co were adjusted so that the Curie temperature of the recording layers 13 was constant.

TABLE 8

| Test piece number | Composition | Elapsed time for drop in C/N [h] |
| --- | --- | --- |
| 8-1 | Tb0.15(Fe0.96Co0.04)0.85 | 900 |
| 8-2 | Tb0.15(Fe0.96Co0.04)0.82Al0.03 | 1000 |
| 8-3 | Tb0.15(Fe0.94Co0.06)0.79Al0.06 | 1000 |
| 8-4 | Tb0.15(Fe0.93Co0.07)0.77Al0.08 | 1100 |
| 8-5 | Tb0.15(Fe0.90Co0.10)0.75Al0.10 | 1100 |
| 8-6 | Tb0.15(Fe0.89Co0.11)0.73Al0.12 | 1200 |
| 8-7 | Tb0.15(Fe0.87Co0.13)0.72Al0.13 | 1200 |
| 8-8 | Tb0.15(Fe0.85Co0.15)0.70Al0.15 | 1400 |

A rare earth-transition metal alloy having composition of Dy0.30(Fe0.50Co0.50)0.70 was used for the auxiliary recording layers 14. The Curie temperature of the auxiliary recording layers 14 was 280 degrees centigrade. For each recording layer composition, test pieces were made with the film thickness of the auxiliary recording layer 14 ranging from 0 angstroms to 80 angstroms by steps of 5 angstroms, and their sensitivities with respect to a modulation magnetic field were investigated. It should be understood that these are not actually measured values for the film thickness of the auxiliary recording layer 14, but are values calculated from the speed of formation of the auxiliary recording layer 14 which was measured in advance, and from the time periods for sputtering which were actually measured. Recording upon the test pieces was performed under the following conditions: linear velocity 1.4 m/s; recording frequency 720 kHz; recording laser power 6.0 mW; and modulation magnetic field ±35 Oersted.

Figure 25:
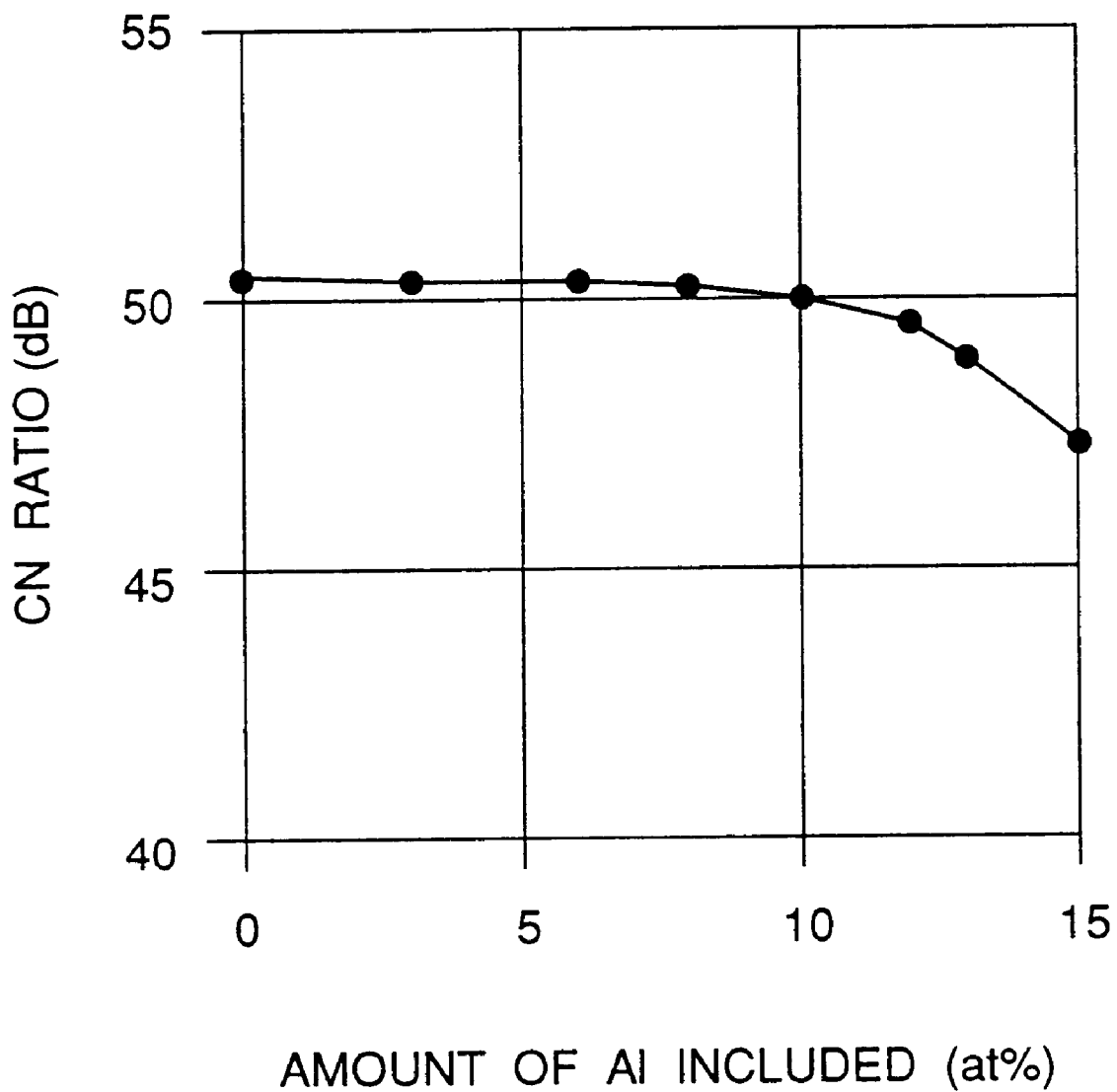
FIG. 25 is a figure showing the relationship between the amount of Al included in a recording layer according to an eleventh embodiment of the present invention and the CN ratio.

FIG. 25 shows the relationship between the amount of Al included in the eight kinds of recording layer composition shown in Table 8 and the CN ratio. For each recording layer composition, a film thickness was chosen for the auxiliary recording layer 14 which exhibited the maximum CN ratio. The linear velocity and the recording frequency were the same as in Experiment 15 for Embodiment 9. When recording was performed with a modulation magnetic field of ±35 Oersted, the CN ratio exhibited good values for amounts of included Al less than or equal to 20 at %, exhibited yet higher values when it was less than or equal to 15 at %, and exhibited the highest values when it was less than or equal to 10 at %.

(2) Experiment 20: Relationship between the amount of Al contained in the recording layer 13 and the reliability.

Next, the relationship between the amount of Al contained in the TbFeCoAl of the recording layer 13 and the reliability of the medium was investigated. Test pieces of magneto-optical recording medium having recording layers 13 of the eight kinds of composition shown in Table 8 were left in an atmosphere at 80 degrees centigrade and 80% RH, and the CN ratios were measured each 100 hours.

The elapsed time period until the CN ratio dropped by 3 dB as compared with that directly after manufacture is shown in Table 8. The recording upon the test pieces was performed under the following conditions: linear velocity 1.4 m/s; recording frequency 720 kHz; recording laser power 6.0 mW; and modulation magnetic field ±35 Oersted. Further, the film thickness of the auxiliary recording layer 14 was chosen, for each recording layer composition, as that film thickness for which the CN ratio was the greatest.

With regard to the composition of the test piece number 8-1 in which no Al was included, the CN ratio had dropped with respect to the value directly after manufacture by 3 dB or more when 900 hours had elapsed. In the range where the amount of included Al was 15% or less, it will be understood that the greater was the amount of included Al, the longer was the time period for the CN ratio to drop; in other words, the greater was the reliability of the medium. However, in practice, it is considered that an amount of included Al up to 12 at % is desirable, in view of the magnetic field sensitivity.

12. Embodiment 12

In this embodiment, a very small amount of Nd is added to the recording layer 13, which is a rare earth-transition metal alloy. The main objective of adding the Nd is to enhance the replay performance of the medium by increasing the Kerr rotation for the short wavelength region. The construction including the compositions of the other layers, and the thicknesses of the various layers and the order of their superposition and so on, is the same as in Embodiment 9.

Experiments were performed as follows in order to investigate the characteristics of this embodiment.

(1) Experiment 21: Relationship between the film thickness of the auxiliary recording layer 14 and the magnetic field sensitivity.

A rare earth-transition metal alloy having a composition $Tb0.14(Fe0.93Co0.07)0.81Nd0.05$ was used for the recording layer 13. The appended figures denote atomic proportions. The recording layer 13 was formed by DC magnetron sputtering, using an alloy target manufactured by casting, under the following conditions: argon gas pressure 1.2 mTorr; and supplied power 300 W. The Curie temperature was 150 degrees centigrade. The other layers 11, 12, 14, 15, and 16 were made by the same methods, and under the same conditions, as in the case of Experiment 1 for Embodiment 1.

With the method of sequentially laminating the first dielectric layer 12, the recording layer 13, the auxiliary recording layer 14, the second dielectric layer 15, and the reflective layer 16 upon the surface of the transparent substrate 11, test pieces according to this embodiment were made with the film thickness of the auxiliary recording layer 14 ranging from 0 to 80 angstroms by steps of 5 angstroms, with the film thicknesses of the first dielectric layer 12, the recording layer 13, the second dielectric layer 15 and the reflective layer 16 being respectively 600, 200, 200, and 600 angstroms. And the sensitivities of these test pieces to the modulation magnetic field were investigated. It should be understood that these are not actually measured film thickness values for the auxiliary recording layer 14, but are values calculated from the speed of formation of the auxiliary recording layer 14 which was measured in advance, and from the time periods for sputtering which were actually measured. Recording upon the test pieces was performed under the following conditions: linear velocity 1.4 m/s; recording frequency 720 kHz; recording power 5.8 mW; and modulation magnetic field ±35 Oersted.

Figure 26:
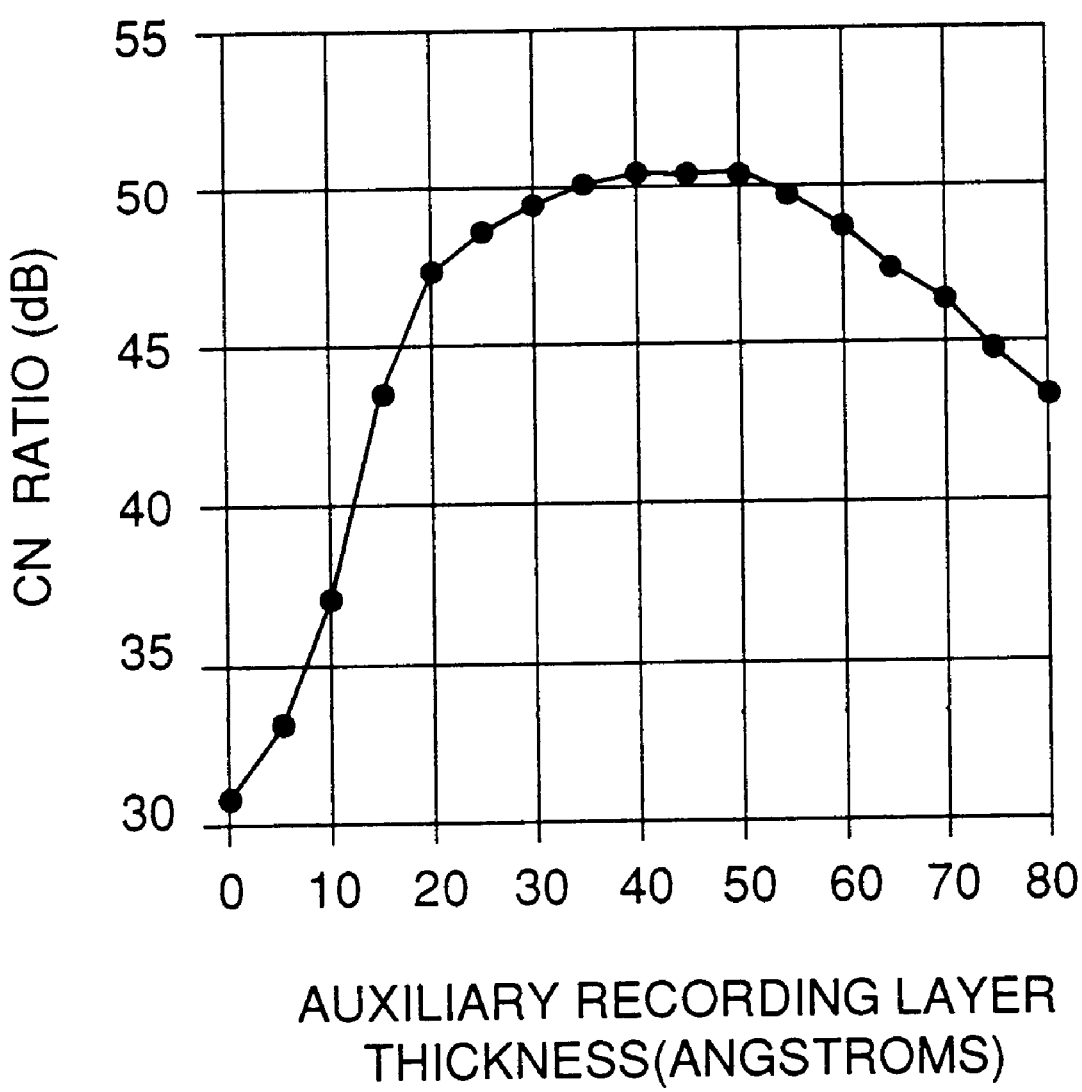
FIG. 26 is a figure showing the relationship between the film thickness of an auxiliary recording layer according to a twelfth embodiment of the present invention and the CN ratio.

FIG. 26 shows the relationship between the film thickness of the auxiliary recording layer 14 and the CN ratio. It will be understood that a beneficial effect for improvement of the CN ratio appeared even when an extremely thin auxiliary recording layer 14 of thickness just 10 angstroms was manufactured. The CN ratio when recording was performed using a weak modulation magnetic field of ±35 Oersted strongly depended upon the thickness of the auxiliary recording layer 14, and a high CN ratio worth practical use was observed in the range from 15 angstroms to 70 angstroms, and in particular a remarkably great CN ratio was obtained in the range from 25 angstroms to 50 angstroms. In the film thickness range above 55 angstroms, the CN ratio diminished along with increase of film thickness.

(2) Experiment 22: Relationship between the amount of Nd contained in the recording layer 13 and the magnetic field sensitivity.

Next, the relationship between the amount of Nd contained in the TbFeCoNd of the recording layer 13 and the magnetic field sensitivity was investigated. The test pieces were manufactured under the same conditions as in Experiment 21, except for the compositions of the recording layers 13. The manufacture of the recording layers 13 was performed by DC magnetron sputtering, using targets of various different compositions manufactured by alloy casting, under the following conditions: argon gas pressure 1.2 mTorr; and supplied power 300 W.

The compositions of the recording layers 13 which were manufactured are shown in Table 9. The proportions between Fe and Co were adjusted so that the Curie temperature of the recording layers 13 was constant.

TABLE 9

| Test piece number | Composition | Kerr rotation at 400 nm [deg] |
|---|---|---|
| 9-1 | Tb0.15(Fe0.96Co0.04)0.85 | 0.260 |
| 9-2 | Tb0.15(Fe0.96Co0.05)0.82Nd0.03 | 0.274 |
| 9-3 | Tb0.15(Fe0.94Co0.06)0.79Nd0.06 | 0.281 |
| 9-4 | Tb0.15(Fe0.93Co0.07)0.79Nd0.08 | 0.288 |
| 9-5 | Tb0.15(Fe0.89Co0.11)0.75Nd0.10 | 0.293 |
| 9-6 | Tb0.15(Fe0.86Co0.14)0.73Nd0.12 | 0.298 |
| 9-7 | Tb0.15(Fe0.85Co0.15)0.72Nd0.13 | 0.300 |
| 9-8 | Tb0.15(Fe0.81Co0.19)0.70Nd0.15 | 0.303 |

A rare earth-transition metal alloy having composition of Dy0.30(Fe0.50Co0.50)0.70 was used for the auxiliary recording layers 14. The Curie temperature of the auxiliary recording layers 14 was 280 degrees centigrade. For each recording layer composition shown in Table 9, test pieces were made with the film thickness of the auxiliary recording layer 14 ranging from 0 angstroms to 80 angstroms by steps of 5 angstroms, and the sensitivities of these magneto-optical recording media with respect to a modulation magnetic field were investigated. It should be understood that these are not actually measured values for the film thickness of the auxiliary recording layer 14, but are values calculated from the speed of formation of the auxiliary recording layer 14 which was measured in advance, and from the time periods for sputtering which were actually measured. Recording upon the test pieces was performed under the following conditions: linear velocity 1.4 m/s; recording frequency 720 kHz; recording laser power 6.0 mW; and modulation magnetic field ±35 Oersted.

Figure 27:
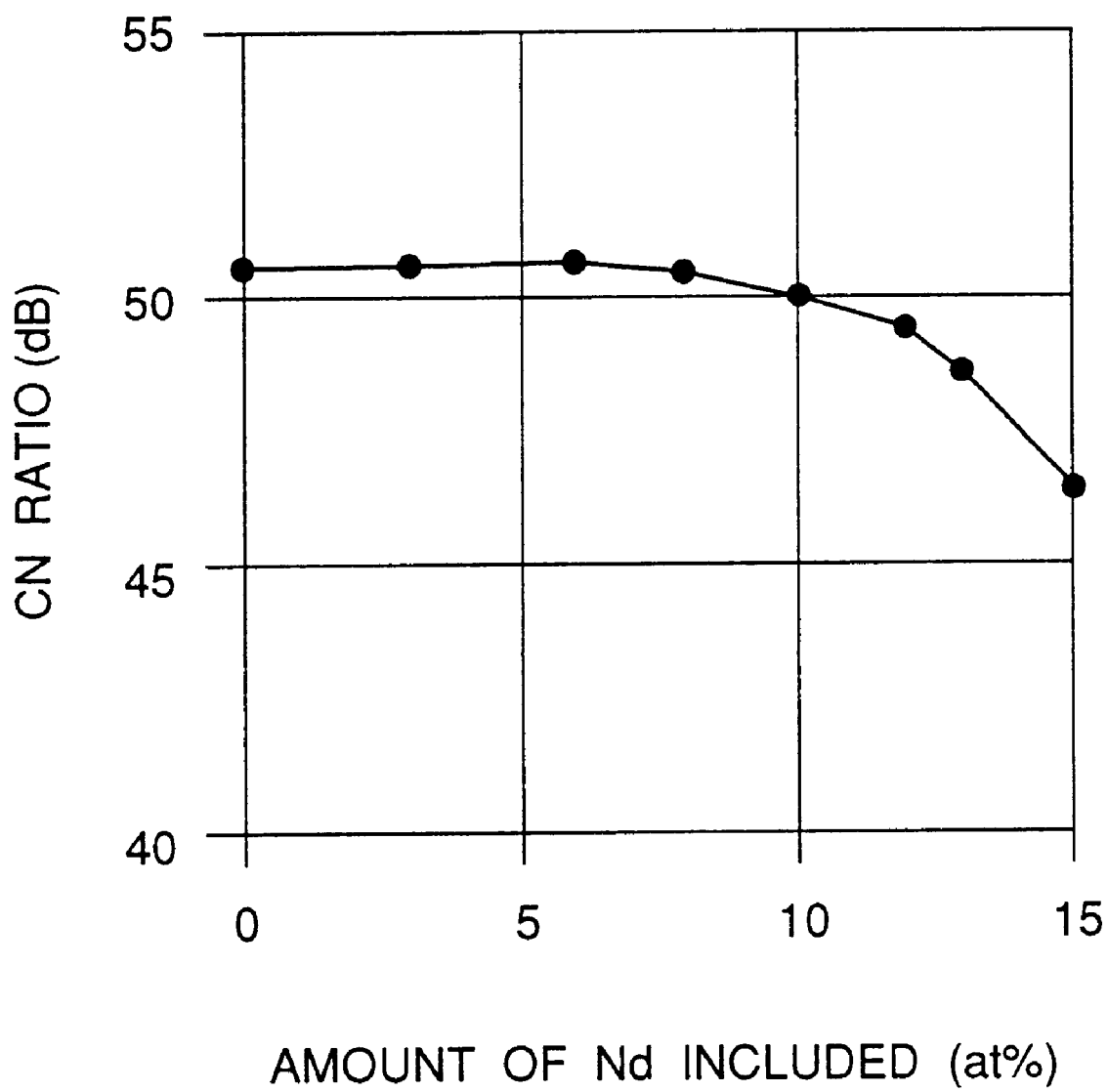
FIG. 27 is a figure showing the relationship between the amount of Nd included in the recording layer according to the twelfth embodiment and the CN ratio.

FIG. 27 shows the relationship between the amount of Nd included in the eight kinds of recording layer composition shown in Table 9 and the CN ratio. A film thickness was chosen for the auxiliary recording layer 14 which exhibited the maximum CN ratio for each recording layer composition. The linear velocity and the recording frequency were the same as in Experiment 21. When recording was performed with a modulation magnetic field of ±35 Oersted, the CN ratio exhibited good values for amounts of included Nd less than or equal to 12at %, exhibited yet higher values when it was less than or equal to 10 at %, and exhibited the highest values when it was less than or equal to 8at %.

(3) Experiment 23: Relationship between the amount of Nd contained in the recording layer 13 and the Kerr rotation in the low wavelength region.

Next, the relationship between the amount of Nd contained in the TbFeCoNd of the recording layer 13 and the Kerr rotation (θk) at a wavelength of 400 nm was investigated. For test pieces having recording layers 13 of the eight kinds of composition shown in Table 9 the θk at a wavelength of 400 nm were measured. The test pieces used here were ones in which a recording layer 13 of 1000 angstroms was formed directly upon a glass substrate, and 600 angstroms of AlSiN was formed thereupon as a protective film. Further, the measurements of θk were performed by illumination of light of 400 nm from the side of the glass substrate. These results are shown as well in Table 9.

With regard to the composition of the test piece number 9-1 in which no Nd was included, θk is 0.26. In the range where the amount of included Nd is 15% or less, θk at a wavelength of 400 nm increases along with increase of the amount of included Nd. The fact that the Kerr rotation of the recording layer 13 increases means that the replay performance of the magneto-optical recording medium are enhanced. Accordingly it will be understood that, in the range where the amount of included Nd is 15% or less, the replay performance in the short wavelength region of the medium is enhanced with the addition of Nd.

13. Embodiment 13

This embodiment replaces the Nd contained in the recording layer 13 of the twelfth embodiment with Pr, and is one in which the composition of the recording layer 13 is TbFeCoPr. The construction including the compositions of the other layers, and the thicknesses of the various layers and the order of their superposition and so on, is the same as in Embodiment 12. The objective of adding Pr, just as for Nd, is to increase the Kerr rotation for the short wavelength region. Experiments were performed as follows in order to investigate the characteristics of this thirteenth embodiment.

(1) Experiment 24: Relationship between the amount of Pr contained in the recording layer 13 and the magnetic field sensitivity.

The relationship between the amount of Pr contained in the TbFeCoPr of the recording layer 13 and the magnetic field sensitivity was investigated. The test pieces were manufactured under the same conditions as in Experiment 21, except for the compositions of the recording layers 13. The manufacture of the recording layers 13 was performed by DC magnetron sputtering, using targets of various different compositions manufactured by alloy casting, under the following conditions: argon gas pressure 1.2 mTorr; and supplied power 300 W.

The compositions of the recording layers 13 which were manufactured are shown in Table 10. The proportions between Fe and Co were adjusted so that the Curie temperature of the recording layers 13 was constant.

TABLE 10

| Test piece number | Composition | Kerr rotation at 400 nm [deg] |
|---|---|---|
| 10-1 | Tb0.15(Fe0.96Co0.04)0.85 | 0.260 |
| 10-2 | Tb0.15(Fe0.95Co0.05)0.82Pr0.03 | 0.269 |
| 10-3 | Tb0.15(Fe0.93Co0.07)0.79Pr0.06 | 0.275 |
| 10-4 | Tb0.15(Fe0.90Co0.10)0.77Pr0.08 | 0.281 |
| 10-5 | Tb0.15(Fe0.87Co0.13)0.75Pr0.10 | 0.290 |
| 10-6 | Tb0.15(Fe0.84Co0.16)0.73Pr0.12 | 0.295 |
| 10-7 | Tb0.15(Fe0.83Co0.17)0.72Pr0.13 | 0.296 |
| 10-8 | Tb0.15(Fe0.79Co0.21)0.70Pr0.15 | 0.299 |

A rare earth-transition metal alloy having composition of Dy0.30(Fe0.50Co0.50)0.70 was used for the auxiliary recording layers 14. The Curie temperature of the auxiliary recording layers 14 was 280 degrees centigrade. For each recording layer composition shown in Table 10, test pieces were made with the film thickness of the auxiliary recording layer 14 ranging from 0 angstroms to 80 angstroms by steps of 5 angstroms, and the sensitivities of these magneto-optical recording media with respect to a modulation magnetic field were investigated. It should be understood that these are not actually measured values for the film thickness of the auxiliary recording layer 14, but are values calculated from the speed of formation of the auxiliary recording layer 14 which was measured in advance, and from the time periods for sputtering which were actually measured. Recording was performed under the following conditions: linear velocity 1.4 m/s; recording frequency 720 kHz; recording laser power 6.0 mW; and modulation magnetic field ±35 Oersted.

Figure 28:
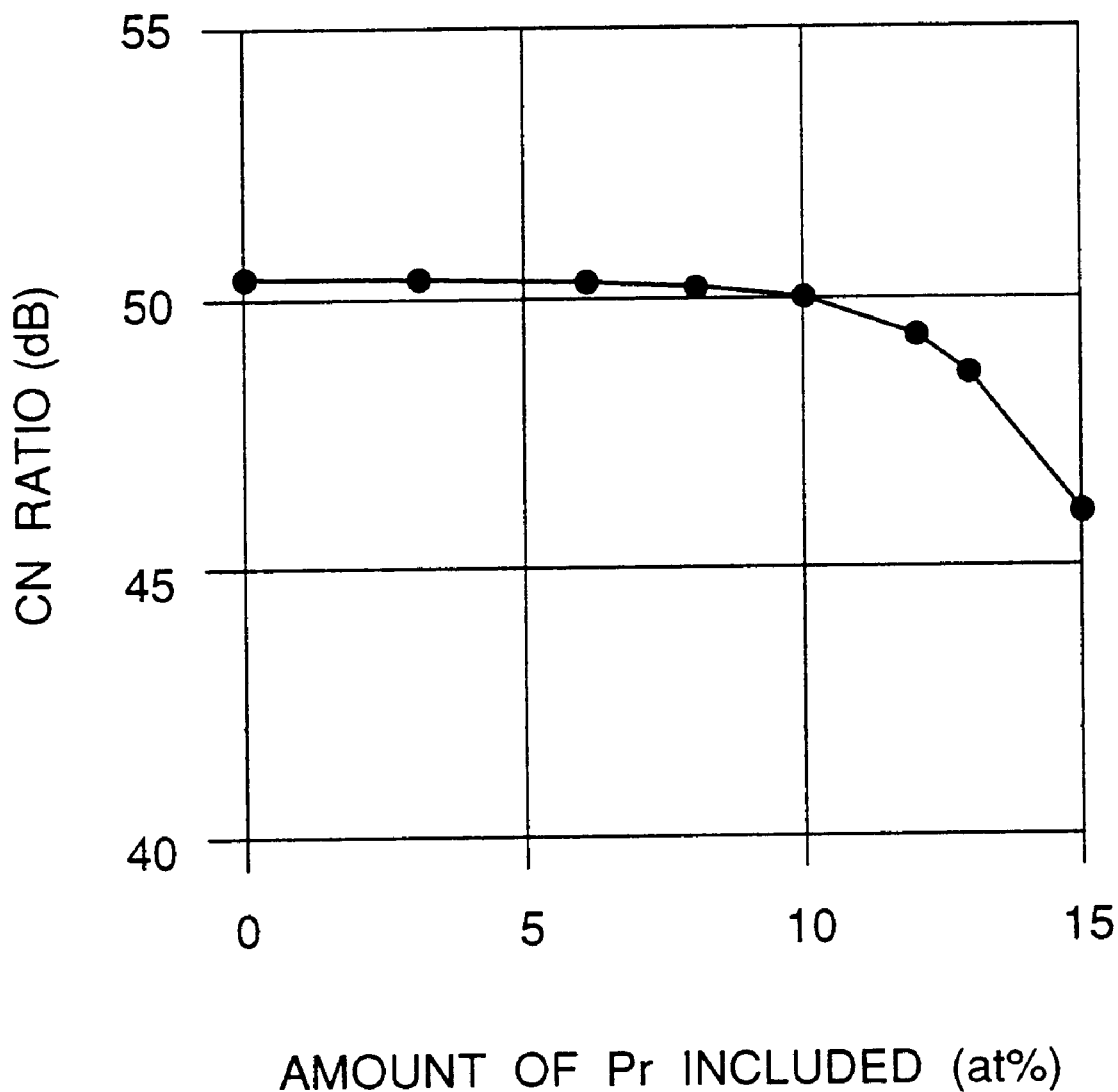
FIG. 28 is a figure showing the relationship between the amount of Pr included in a recording layer according to a thirteenth embodiment of the present invention and the CN ratio.

FIG. 28 shows the relationship between the amount of Pr included in the eight kinds of recording layer composition shown in Table 10 and the CN ratio. A film thickness was chosen for the auxiliary recording layer 14 which exhibited the maximum CN ratio for each recording layer composition. The linear velocity and the recording frequency were the same as in Experiment 21. When recording was performed with a modulation magnetic field of ±35 Oersted, the CN ratio exhibited good values for amounts of included Pr less than or equal to 12 at %, exhibited yet higher values when it was less than or equal to 10 at %, and exhibited the highest values when it was less than or equal to 8 at %.

(2) Experiment 25: Relationship between the amount of Pr contained in the recording layer 13 and the Kerr rotation in the low wavelength region.

Next, the relationship between the amount of Pr contained in the TbFeCoPr of the recording layer 13 and the Kerr rotation (θk) of the medium at a wavelength of 400 nm was investigated. For test pieces having recording layers 13 of the eight kinds of composition shown in Table 10, the θk at a wavelength of 400 nm was measured. The test pieces used here were ones in which a recording layer 13 of 1000 angstroms was formed directly upon a glass substrate, and 600 angstroms of AlSiN was formed thereupon as a protective film. Further, the measurements of θk were performed by illumination of light of 400 nm from the side of the glass substrate. These results are shown as well in Table 10. With regard to the composition of the test piece number 10-1 in which no Pr was included, θk is 0.26. In the range where the amount of included Pr is 15% or less, θk at a wavelength of 400 nm increases along with increase of the amount of included Pr; in other words, it will be understood that the replay performance in the short wavelength region of the medium is enhanced.

14. Embodiment 14

This embodiment replaces the Nd contained in the recording layer 13 of the twelfth embodiment with Sm, and is one in which the composition of the recording layer 13 is TbFeCoSm. The construction including the compositions of the other layers, and the thicknesses of the various layers and the order of their superposition and so on, is the same as in Embodiment 12. The objective of adding Sm, just as for Nd or Pr, is to increase the Kerr rotation for the short wavelength region. Experiments were performed as follows in order to investigate the characteristics of this fourteenth embodiment.

(1) Experiment 26: Relationship between the amount of Sm contained in the recording layer 13 and the magnetic field sensitivity.

The relationship between the amount of Sm contained in the TbFeCoSm of the recording layer 13 and the magnetic field sensitivity was investigated. The test pieces were manufactured under the same conditions as in Experiment 21, except for the compositions of the recording layers 13. The manufacture of the recording layers 13 was performed by DC magnetron sputtering, using targets of various different compositions manufactured by alloy casting, under the following conditions: argon gas pressure 1.2 mTorr; and supplied power 300 W.

The compositions of the recording layers 13 which were manufactured are shown in Table 11. The proportions between Fe and Co were adjusted so that the Curie temperature of the recording layers 13 was constant.

TABLE 10

| Test piece number | Composition | Kerr rotation at 400 nm [deg] |
| --- | --- | --- |
| 11-1 | Tb0.15(Fe0.96Co0.04)0.85 | 0.260 |
| 11-2 | Tb0.15(Fe0.95Co0.05)0.82Sm0.03 | 0.276 |

TABLE 10-continued

| Test piece number | Composition | Kerr rotation at 400 nm [deg] |
| --- | --- | --- |
| 11-3 | Tb0.15(Fe0.93Co0.07)0.79Sm0.06 | 0.288 |
| 11-4 | Tb0.15(Fe0.92Co0.08)0.77Sm0.08 | 0.294 |
| 11-5 | Tb0.15(Fe0.90Co0.10)0.75Sm0.10 | 0.299 |
| 11-6 | Tb0.15(Fe0.87Co0.13)0.73Sm0.12 | 0.305 |
| 11-7 | Tb0.15(Fe0.86Co0.14)0.72Sm0.13 | 0.306 |
| 11-8 | Tb0.15(Fe0.83Co0.17)0.70Sm0.15 | 0.310 |

A rare earth-transition metal alloy having composition of Dy0.30(Fe0.50Co0.50)0.70 was used for the auxiliary recording layers 14. The Curie temperature of the auxiliary recording layers 14 was 280 degrees centigrade. For each recording layer composition shown in Table 11, test pieces were made with the film thickness of the auxiliary recording layer 14 ranging from 0 angstroms to 80 angstroms by steps of 5 angstroms, and the sensitivities of these magneto-optical recording media with respect to a modulation magnetic field were investigated. It should be understood that these are not actually measured values for the film thickness of the auxiliary recording layer 14, but are values calculated from the speed of formation of the auxiliary recording layer 14 which was measured in advance, and from the time periods for sputtering which were actually measured. Recording was performed under the following conditions: linear velocity 1.4 m/s; recording frequency 720 kHz; recording laser power 6.0 mW; and modulation magnetic field ±35 Oersted.

Figure 29:
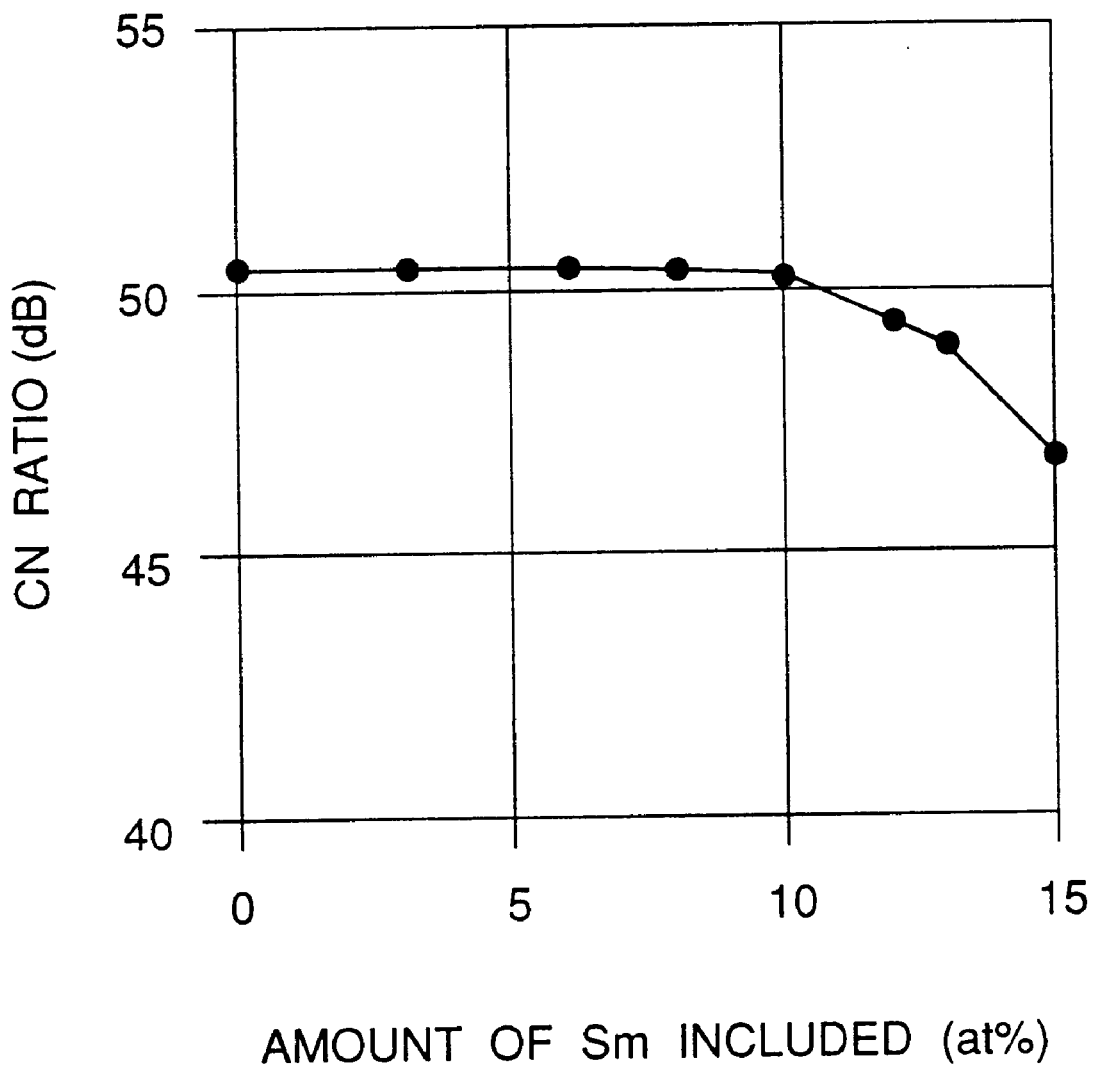
FIG. 29 is a figure showing the relationship between the amount of Sm included in a recording layer according to a fourteenth embodiment of the present invention and the CN ratio.

FIG. 29 shows the relationship between the amount of Sm included in the eight kinds of recording layer composition shown in Table 11 and the CN ratio. A film thickness was chosen for the auxiliary recording layer 14 which exhibited the maximum CN ratio for each recording layer composition. The linear velocity and the recording frequency were the same as in Experiment 21. When recording was performed with a modulation magnetic field of ±35 Oersted, the CN ratio exhibited good values for amounts of included Sm less than or equal to 12 at %, exhibited yet higher values when it was less than or equal to 10 at %, and exhibited the highest values when it was less than or equal to 8 at %.

(2) Experiment 27: Relationship between the amount of Sm contained in the recording layer 13 and the Kerr rotation in the low wavelength region.

Next, the relationship between the amount of Sm contained in the TbFeCoSm of the recording layer 13 and the Kerr rotation (θk) of the medium at a wavelength of 400 nm was investigated. For test pieces having recording layers 13 of the eight kinds of composition shown in Table 11, the θk at a wavelength of 400 nm was measured. The test pieces used here were ones in which a recording layer 13 of 1000 angstroms was formed directly upon a glass substrate, and 600 angstroms of AlSiN was formed thereupon as a protective film. Further, the measurements of θk were performed by illumination of light of 400 nm from the side of the glass substrate. These results are shown as well in Table 11.

With regard to the composition of the test piece number 11-1 in which no Sm was included, θk is 0.26. In the range where the amount of included Sm is 15% or less, θk at a wavelength of 400 nm increases along with increase of the amount of included Sm; in other words, it will be understood that the replay performance in the short wavelength region of the medium is enhanced.

15. Embodiment 15

This embodiment is one to which the method of replay by magnetically induced super-resolution (MSR) can be applied. Before entering upon the description of the embodiment, magnetically induced super-resolution will be explained.

Although the resolusion of magneto-optical recording is limited by the diameter of the laser beam spot, the magnetic super resolution method is a technique for overcoming this. By taking advantage of the temperature distribution in the beam spot, only the information of a portion within the spot is replayed. By doing this it is possible properly to replay information domains which are extremely small as compared with those previously. Accordingly it is possible to record information at high density, so as to realize a magneto-optical recording medium of high capacity.

Various forms have been contemplated for implementation of the magnetic super resolution method. For example, in J. Nakajima, Tech. Dig. MORIS '94 29-Q30 (1994), a method is disclosed which uses a medium containing a replay layer which at room temperature exhibits in-plane magnetic anisotropy, and at high temperatures exhibits perpendicular magnetic anisotropy. In K. Matsumoto, Tech. Dig. MORIS '94 29-Q07 (1994), a method is disclosed which uses a medium containing a replay layer which is a film having an easy perpendicular axis of magnetization, and an intermediate layer which at room temperature exhibits in-plane magnetic anisotropy. In N. Nishimura, Tech. Dig. MORIS '94 29-K04 (1994), a method is disclosed which uses a medium in which both the replay layer and the intermediate layer are magnetization films which exhibit in-plane magnetic anisotropy at room temperature. In T. Kawano, Proc. MORIS '94, J. Magn. Soc. Jpn., Vol. 19, Supplement No. S1 (1995), pp. 326-326, there is proposed a so called R-MSR method which utilizes as the replay layer a magnetization film of which the sublattice magnetization of the rare earth metal is dominant. Other than these, various types of magnetic super resolution method are known.

When the magnetic super resolution method is used as the replay method, it is considered that as a recording method the magnetic field modulation recording method, which has the aspect that domain recording at high density is easily performed, is more suitable than is the optical modulation method. With the optical modulation method, it is difficult reliably to form small domains with the illumination time of the laser pulse. By contrast to this, with magnetic field modulation recording, since the formation of the domains is performed by reversal of the magnetic field, the variation due to external disturbance of the temperature or the like is small, and it is possible to form the edges of the recording domains with good accuracy.

However, none of the above described known magneto-optical recording media to which the magnetic super resolution method can be applied is distinguished from the point of view of sufficiently outstanding magnetic field sensitivity. For some of them a modulation magnetic field of 100 Oersted or greater is required. With the magneto-optical recording medium of the present invention explained below, to which the magnetic super resolution method may be applied, it is possible to perform recording with a modulation magnetic field lower than in the prior art.

Figure 30:
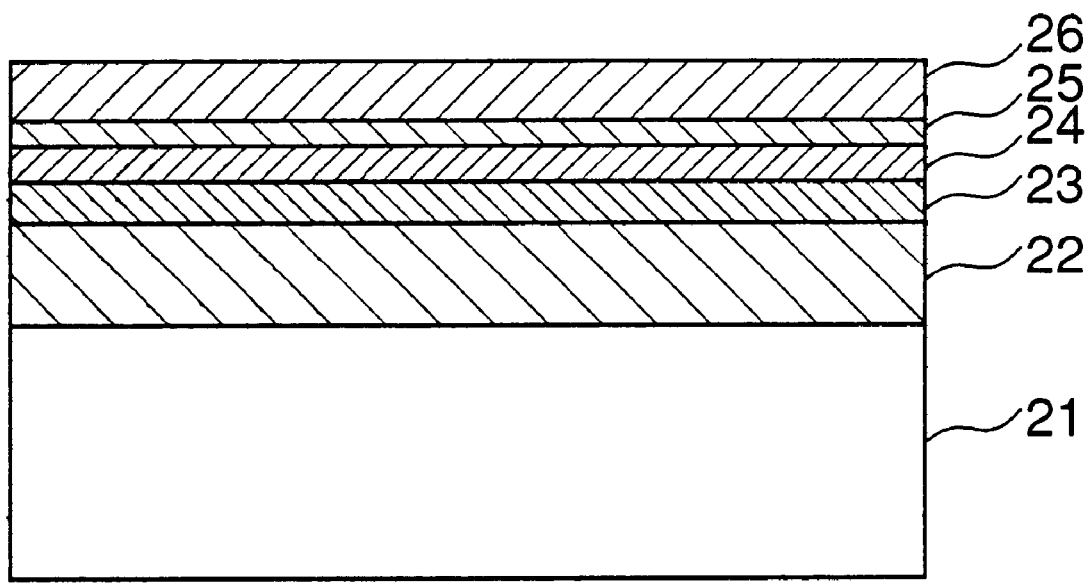
FIG. 30 is a sectional view of a magneto-optical recording medium according to a fifteenth embodiment of the present invention.

FIG. 30 shows the sectional structure of an embodiment of the magneto-optical recording medium according to the present invention which is ideal for the application of the magnetic super resolution method. A first dielectric layer 22, a replay layer 23, a recording layer 24, an auxiliary recording layer 25, and a second dielectric layer 26 are sequentially laminated upon a transparent substrate 21. To show exemplary materials for each of the layers: the transparent substrate 21 is polycarbonate substrate; the first dielectric layer 22 and the second dielectric layer 26 are AlSiN layers; the replay layer 23 is made from $Gd0.29(Fe0.88Co0.12)0.71$; the recording layer 24 is a TbFeCo layer, and the auxiliary recording layer 25 is a DyFeCo layer. The track pitch of the substrate 21 is, for example, 1.6 $\mu$m. The thickness of the auxiliary recording layer 25 is 70 angstroms or less. The Curie temperature of the auxiliary recording layer 25 is higher than that of the recording layer 24. In order to make the Curie temperature of the auxiliary recording layer 25 higher than that of the recording layer 24, it is effective in the rare earth-transition metal alloy of the auxiliary recording layer 25 to make great the amount of the transition metal, specifically Co, or to make great the amount of Gd as the rare earth metal. By this kind of adjustment of composition, it is easily possible to bring the Curie temperature of the auxiliary recording layer 25 to be higher than that of the recording layer 24 by 10 degrees or more.

Experiments were performed as follows in relation to this embodiment.

(1) Experiment 27: Relationship between the film thickness of the auxiliary recording layer 25 and the magnetic field sensitivity.

A rare earth-transition metal alloy having a composition $Tb0.14(Fe0.88Co0.12)0.86$ was used for the recording layer 24. The recording layer 24 was formed by DC magnetron sputtering, using an alloy target manufactured by casting, under the following conditions: argon gas pressure 1.2 mTorr; and supplied power 300 W. The Curie temperature of the recording layer 24 was 205 degrees centigrade.

A rare earth-transition metal alloy having a composition $Gd0.29(Fe0.88Co0.12)0.71$ was used for the replay layer 23. The appended characters denote atomic proportions. The replay layer 23 was formed by DC magnetron sputtering, using an alloy target manufactured by casting, under the following conditions: argon gas pressure 1.2 mTorr; and supplied power 300 W. The replay layer 23 displayed in-plane magnetic anisotropy at room temperature, and displayed perpendicular magnetic anisotropy at high temperature. Further, its Curie temperature was 230 degrees centigrade.

A rare earth-transition metal alloy having a composition $Dy0.30(Fe0.45Co0.55)0.70$ was used for the auxiliary recording layer 25. The auxiliary recording layer 25 was formed by DC magnetron sputtering, using an alloy target manufactured by casting, under the following conditions: argon gas pressure 0.4 mTorr; and supplied power 100 W. The Curie temperature of the auxiliary recording layer 25 was 295 degrees centigrade.

AlSiN was used for the first dielectric layer 22 and the second dielectric layer 26. The first and the second dielectric layers 22 and 26 were made by a sputtering method using an AlSi alloy target under the following conditions: sputter gas Ar 60%+N2 40%; gas pressure 1.7 mTorr; and supplied power 2500 W.

With this method of sequentially laminating the first dielectric layer 22, the replay layer 23, the recording layer 24, the auxiliary recording layer 25, and the second dielectric layer 26 upon the surface of the transparent substrate 21, test pieces of magneto-optical recording medium were made with the film thickness of the auxiliary recording layer 25 ranging from 0 to 80 angstroms by steps of 5 angstroms, with the film thicknesses of the first dielectric layer 22, the replay layer 23, the recording layer 24, and the second dielectric layer 26 being respectively 700, 400, 400, and 600 angstroms; and the sensitivities of these test pieces to the modulation magnetic field were investigated. It should be understood that these are not actually measured film thickness values for the auxiliary recording layer 25, but are values calculated from the speed of formation of the auxiliary recording layer 25 which was measured in advance, and from the time periods for sputtering which were actually measured. Recording upon the test pieces was performed under the following conditions: linear velocity 1.4 m/s; recording frequency 1.75 MHz; recording power 5.8 mW; and modulation magnetic field ±40 Oersted. The length of the recording domains was 0.4 µm.

Figure 31:
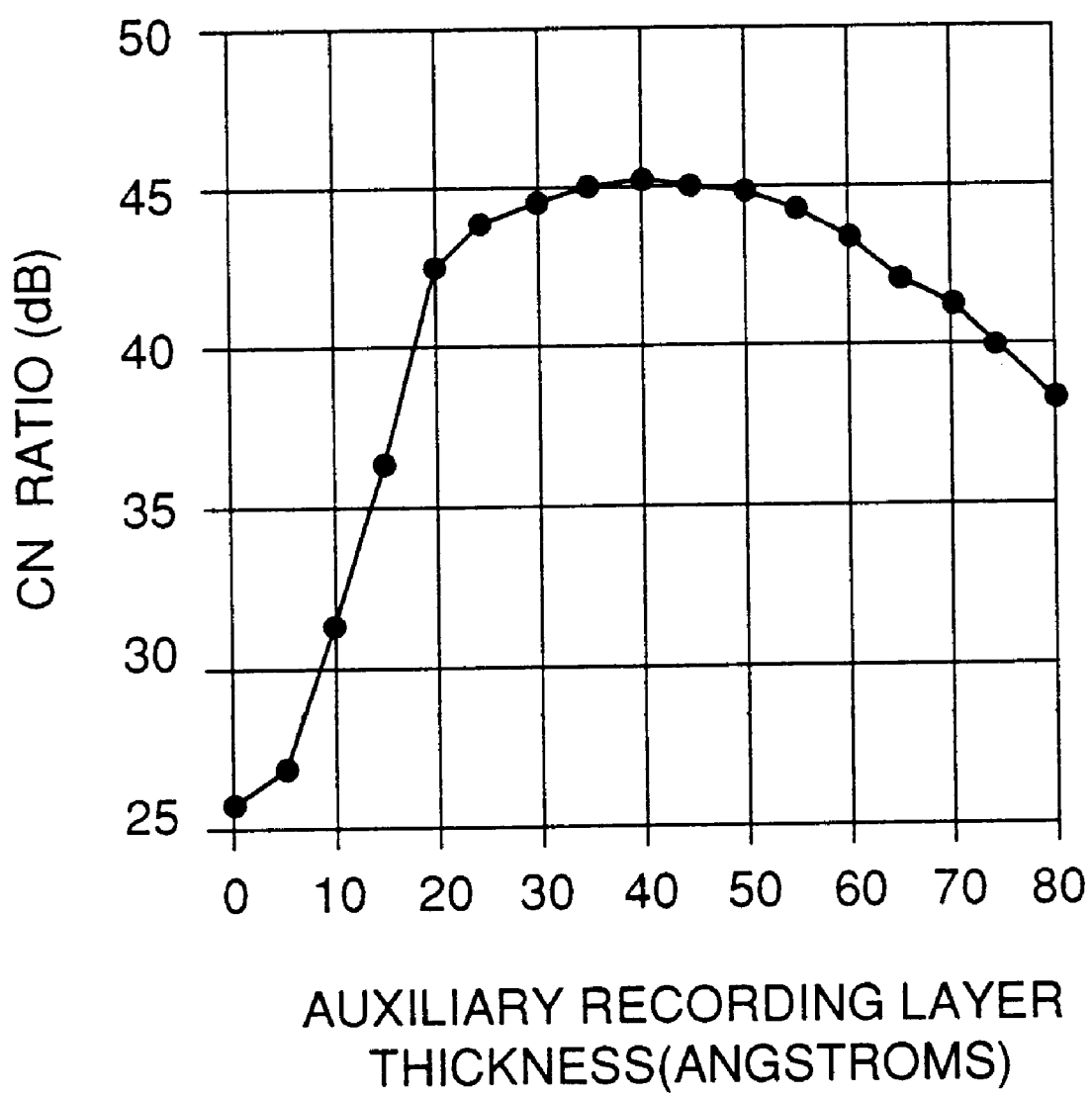
FIG. 31 is a figure showing the relationship between the film thickness of an auxiliary recording layer according to the fifteenth embodiment and the CN ratio.

The relationship between the film thickness of the auxiliary recording layer 25 and the CN ratio is shown in FIG. 31. It will be understood that a beneficial result for improvement of the CN ratio appeared even when an extremely thin auxiliary recording layer 25 of thickness just 10 angstroms was manufactured. The CN ratio when recording was performed using a weak modulation magnetic field of ±40 Oersted strongly depended upon the thickness of the auxiliary recording layer 25, and a beneficial effect was observed from 15 angstroms to 70 angstroms; and in particular a remarkably great CN ratio was obtained in the range from 25 angstroms to 50 angstroms. Above 55 angstroms, the CN ratio diminished along with increase of film thickness.

From the above results, it will be understood that it is possible to record extremely small 0.4 µm recording domains with a small modulation magnetic field of ±40 Oersted, and also that this domain information can be properly replayed.

16. Embodiment 16

Figure 32:
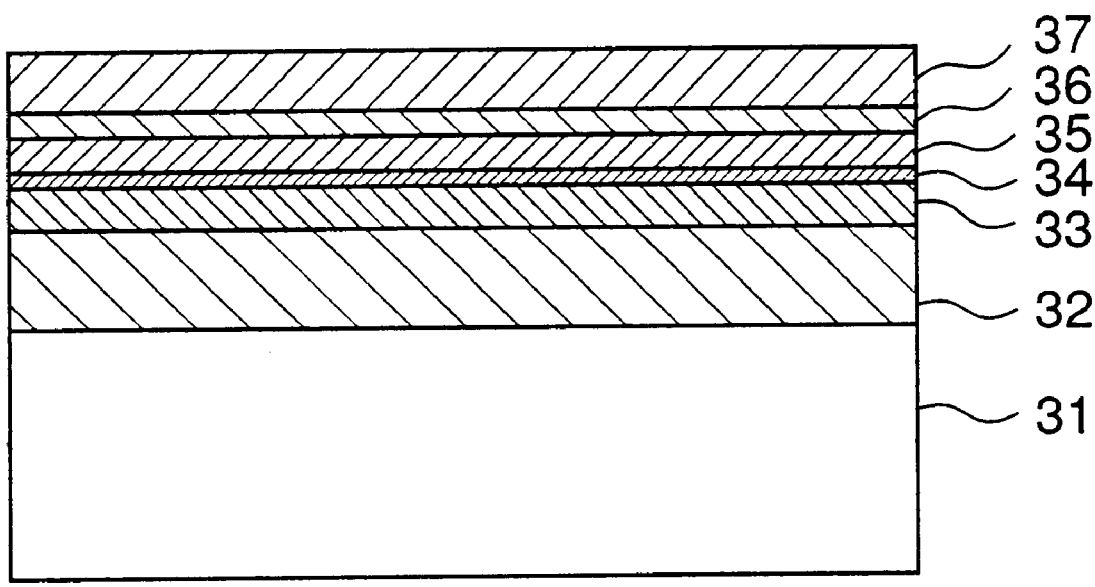
FIG. 32 is a sectional view of a magneto-optical recording medium according to a sixteenth embodiment of the present invention.

FIG. 32 shows the sectional structure of another embodiment of the magneto-optical recording medium of the present invention suitable for the magnetic super resolution method. A first dielectric layer 32, a replay layer 33, a control layer 34, a recording layer 35, an auxiliary recording layer 36, and a second dielectric layer 37 are sequentially laminated upon the surface of a transparent substrate 31. Here, to show exemplary materials for each of the layers: the transparent substrate 31 is polycarbonate substrate; the first dielectric layer 32 and the second dielectric layer 37 are AlSiN layers; the replay layer 33 is a GdFeCo layer; the control layer 34 is a TbFe layer; the recording layer 35 is a TbFeCo layer, and the auxiliary recording layer 35 is a DyFeCo layer. The thickness of the auxiliary recording layer 36 is 70 angstroms or less. The Curie temperature of the auxiliary recording layer 36 is higher than that of the recording layer 35.

Experiments were performed as follows in relation to this embodiment.

(1) Experiment 28: Relationship between the film thickness of the auxiliary recording layer 36 and the magnetic field sensitivity.

A rare earth-transition metal alloy having a composition Tb0.15(Fe0.88Co0.16)0.85 was used for the recording layer 35. The appended characters denote atomic proportions. The recording layer 35 was formed by DC magnetron sputtering, using an alloy target manufactured by casting, under the following conditions: argon gas pressure 1.2 mTorr; and supplied power 300 W. The Curie temperature of the recording layer 35 was 230 degrees centigrade.

A rare earth-transition metal alloy having a composition Gd0.25(Fe0.84Co0.16)0.75 was used for the replay layer 33. The replay layer 33 was formed by DC magnetron sputtering, using an alloy target manufactured by casting, under the following conditions: argon gas pressure 1.2 mTorr; and supplied power 300 W. The Curie temperature of the replay layer 33 was 260 degrees centigrade.

A rare earth-transition metal alloy having a composition Tb0.20Fe0.80 was used for the control layer 34. The control layer 34 was formed by DC magnetron sputtering, using an alloy target manufactured by casting, under the following conditions: argon gas pressure 1.2 mTorr; and supplied power 300 W. The Curie temperature of the control layer 34 was 120 degrees centigrade.

A rare earth-transition metal alloy having a composition Dy0.30(Fe0.40Co0.60)0.70 was used for the auxiliary recording layer 36. The auxiliary recording layer 36 was formed by DC magnetron sputtering, using an alloy target manufactured by casting, under the following conditions: argon gas pressure 0.4 mTorr; and supplied power 100 W. The Curie temperature of the auxiliary recording layer 36 was 305 degrees centigrade.

AlSiN was used for the first dielectric layer 32 and the second dielectric layer 37. The first and the second dielectric layers 32 and 37 were made by a sputtering method using an AlSi alloy target under the following conditions: sputter gas Ar 60%+N2 40%; gas pressure 1.7 mTorr; and supplied power 2500 W.

With this method of sequentially laminating the first dielectric layer 32, the replay layer 33, the control layer 34, the recording layer 35, the auxiliary recording layer 36, and the second dielectric layer 37 upon the surface of the transparent substrate 31, test pieces of magneto-optical recording medium were made with the film thickness of the auxiliary recording layer 35 ranging from 0 to 80 angstroms by steps of 5 angstroms, with the film thicknesses of the first dielectric layer 32, the replay layer 33, the control layer 34, the recording layer 35, and the second dielectric layer 37 being respectively 700, 300, 200, 400, and 600 angstroms; and the sensitivities of these test pieces to the modulation magnetic field were investigated. It should be understood that these are not actually measured film thickness values for the auxiliary recording layer 36, but are values calculated from the speed of formation of the auxiliary recording layer 36 which was measured in advance, and from the time periods for sputtering which were actually measured. Recording upon the test pieces was performed under the following conditions: linear velocity 1.4 m/s; recording frequency 1.75 mHz; recording power 6.8 mW; and modulation magnetic field ±40 Oersted. The length of the recording domains was 0.4 µm.

Figure 33:
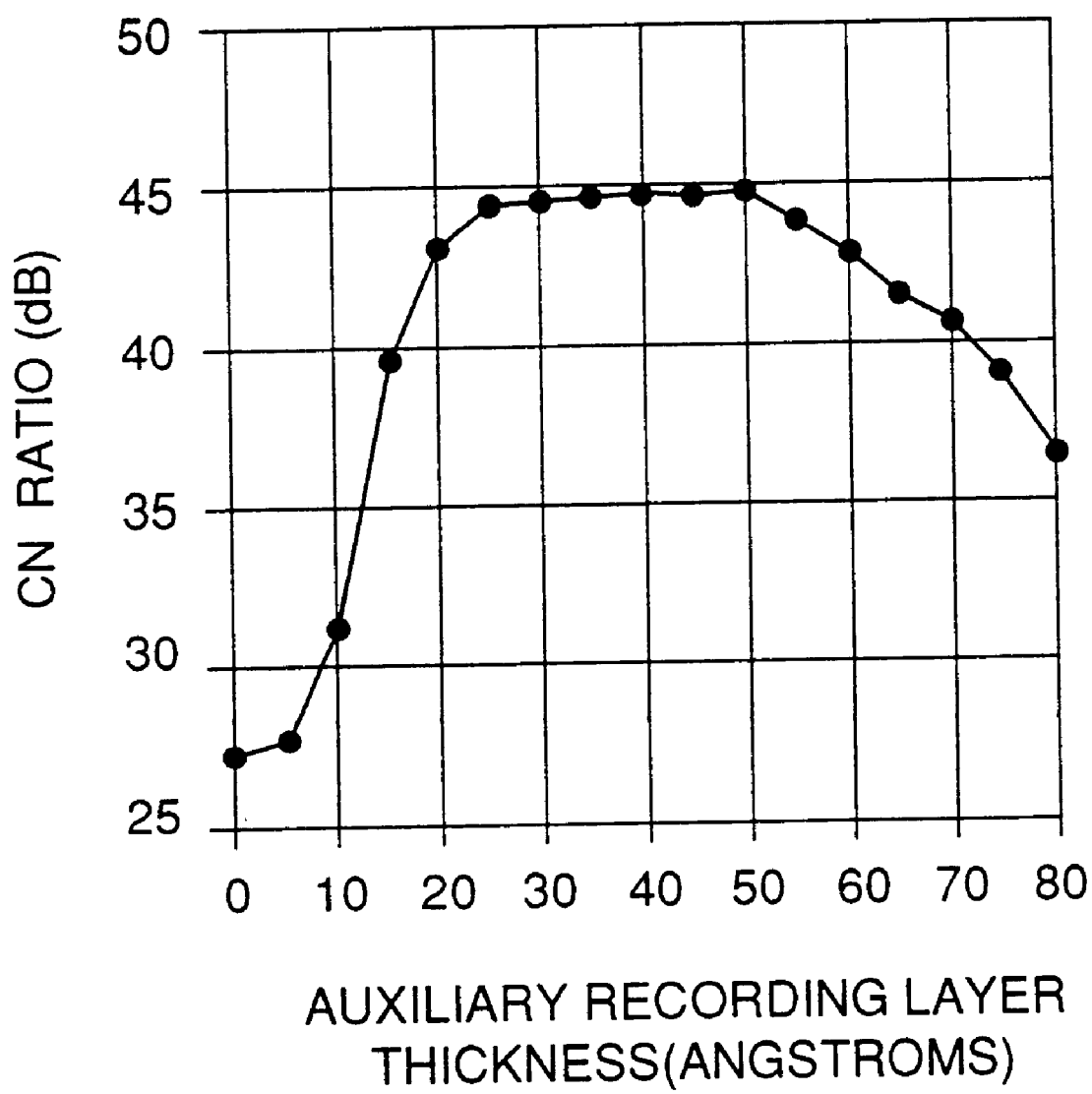
FIG. 33 is a figure showing the relationship between the film thickness of an auxiliary recording layer according to the sixteenth embodiment and the CN ratio.

The relationship between the film thickness of the auxiliary recording layer 36 and the CN ratio is shown in FIG. 33. It will be understood that a beneficial result for improvement of the CN ratio appeared even when an extremely thin auxiliary recording layer 36 of thickness just 10 angstroms was manufactured. The CN ratio when recording was performed using a weak modulation magnetic field of ±40 Oersted strongly depended upon the thickness of the auxiliary recording layer 36, and a beneficial effect was observed from 15 angstroms to 70 angstroms; and in particular a remarkably great CN ratio was obtained in the range from 25 angstroms to 50 angstroms. Above 55 angstroms, the CN ratio diminished along with increase of film thickness.

From the above, it will be understood that a high magnetic field sensitivity is obtained with this embodiment as well, and that it is suitable for application of the magnetic super resolution method.

17. Embodiment 17

This embodiment is one in which the composition of the replay layer 33, only, is altered from that of the sixteenth embodiment. In detail, it is one in which the amount of the rare earth metal included in the rare earth-transition metal alloy which is the replay layer 33 is increased.

Experiments were performed as follows in relation to this embodiment.

(1) Experiment 29: Relationship between the film thickness of the auxiliary recording layer 36 and the magnetic field sensitivity.

A rare earth-transition metal alloy having a composition Gd0.33(Fe0.80Co0.20)0.67 was used for the replay layer 33. The replay layer 33 was formed by DC magnetron sputtering, using an alloy target manufactured by casting, under the following conditions: argon gas pressure 1.2 mTorr; and supplied power 300 W. At room temperature the sublattice magnetization of the rare earth metal of this replay layer 33 was dominant, while at high temperature the sublattice magnetization of its transition metal was dominant. Further, its Curie temperature was 260 degrees centigrade. The first dielectric layer 32, the control layer 34, the recording layer 35, the auxiliary recording layer 36, and the second dielectric layer 37 were formed in the same manner and under the same conditions as in Embodiment 16.

With this method of sequentially laminating the first dielectric layer 32, the replay layer 33, the control layer 34, the recording layer 35, the auxiliary recording layer 36, and the second dielectric layer 37, test pieces were made with the film thickness of the auxiliary recording layer 36 ranging from 0 to 80 angstroms by steps of 5 angstroms, with the film thicknesses of the first dielectric layer 32, the replay layer 33, the control layer 34, the recording layer 35, and the second dielectric layer 37 being respectively 700, 300, 100, 400, and 600 angstroms; and their sensitivities to the modulation magnetic field were investigated. It should be understood that these are not actually measured film thickness values for the auxiliary recording layer 36, but are values calculated from the speed of formation of the auxiliary recording layer 36 which was measured in advance, and from the time periods for sputtering which were actually measured. Recording upon the test pieces was performed under the following conditions: linear velocity 1.4 m/s; recording frequency 1.75 mHz; recording laser power 6.8 mW; and modulation magnetic field ±40 Oersted. The length of the recording domains was 0.4 μm.

Figure 34:
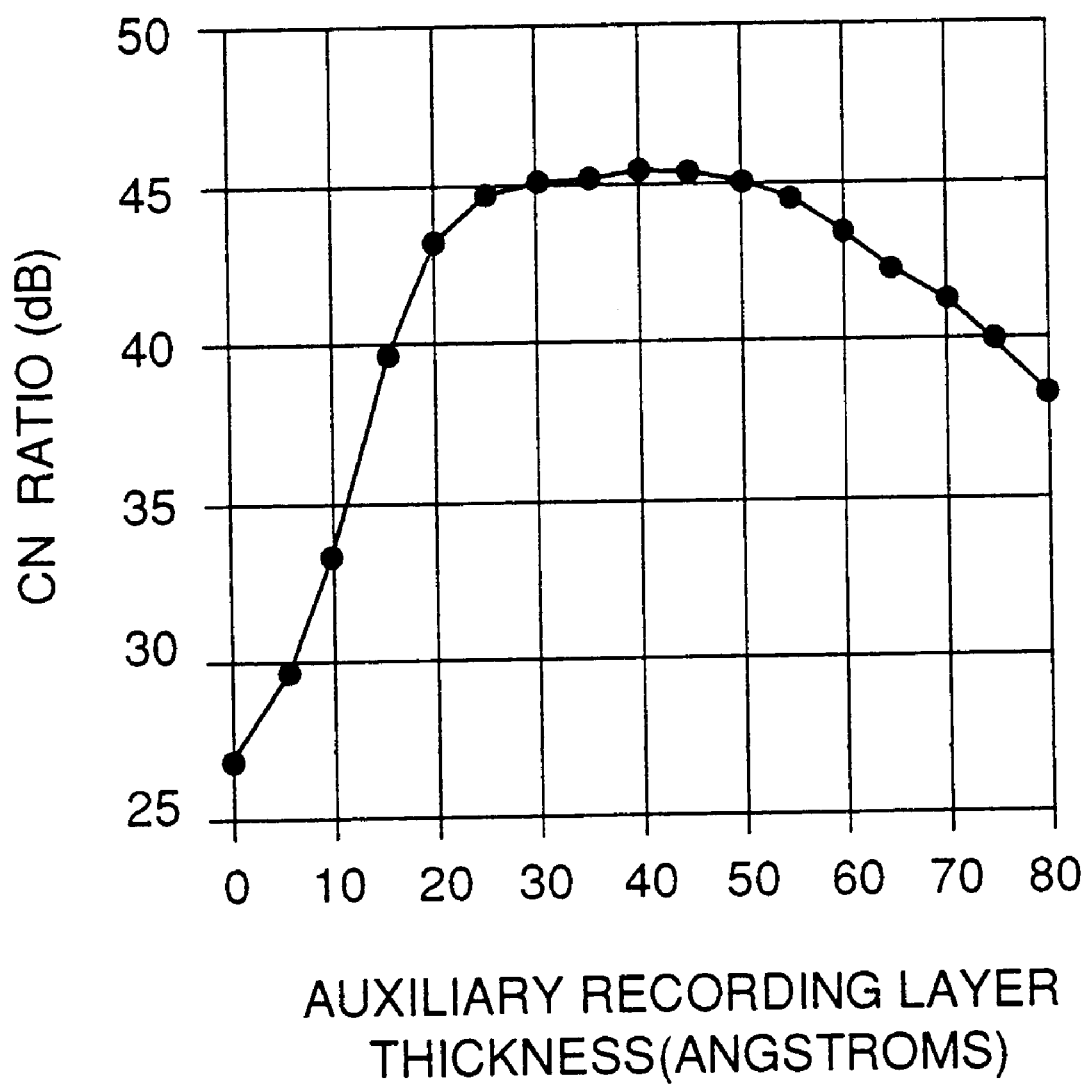
FIG. 34 is a figure showing the relationship between the film thickness of an auxiliary recording layer according to a seventeenth embodiment of the present invention and the CN ratio.

The relationship between the film thickness of the auxiliary recording layer 36 and the CN ratio is shown in FIG. 34. It will be understood that a beneficial result for improvement of the CN ratio appeared even when an extremely thin auxiliary recording layer 36 of thickness just 10 angstroms was manufactured. The CN ratio when recording was performed using a modulation magnetic field of ±40 Oersted strongly depended upon the thickness of the auxiliary recording layer 36, and a beneficial effect was observed from 15 angstroms to 70 angstroms; and in particular a remarkably great CN ratio was obtained in the range from 25 angstroms to 50 angstroms. Above 55 angstroms, the CN ratio diminished along with increase of film thickness.

18. Embodiment 18

This embodiment is one in which, mainly, the composition of the control layer 34 is altered from that of the sixteenth embodiment. In detail, it is one in which the control layer is changed from TbFe to GdFe. Regarding other matters, it is almost identical to the sixteenth embodiment.

Experiments were performed as follows in relation to this embodiment.

(1) Experiment 30: Relationship between the film thickness of the auxiliary recording layer 36 and the magnetic field sensitivity.

A rare earth-transition metal alloy having a composition Tb0.16(Fe0.88Co0.16)0.84 was used for the recording layer 35. The appended characters denote atomic proportions. The recording layer 35 was formed by DC magnetron sputtering, using an alloy target manufactured by casting, under the following conditions: argon gas pressure 1.2 mTorr; and supplied power 300 W. The Curie temperature of the recording layer 35 was 230 degrees centigrade.

A rare earth-transition metal alloy having a composition Gd0.27(Fe0.80Co0.20)0.73 was used for the replay layer 33. The replay layer 33 was formed by DC magnetron sputtering, using an alloy target manufactured by casting, under the following conditions: argon gas pressure 1.2 mTorr; and supplied power 300 W. At room temperature the sublattice magnetization of the rare earth metal of this replay layer 33 was dominant, while at high temperature the sublattice magnetization of its transition metal was dominant. The Curie temperature of the replay layer 33 was 295 degrees centigrade.

A rare earth-transition metal alloy having a composition Gd0.28Fe0.72 was used for the control layer 34. The control layer 34 was formed by DC magnetron sputtering, using an alloy target manufactured by casting, under the following conditions: argon gas pressure 1.2 mTorr; and supplied power 300 W. At room temperature the sublattice magnetization of the rare earth metal of this control layer 34 was dominant. The Curie temperature of the control layer 34 was 185 degrees centigrade.

A rare earth-transition metal alloy having a composition Dy0.30(Fe0.40Co0.60)0.70 was used for the auxiliary recording layer 36. The auxiliary recording layer 36 was formed by DC magnetron sputtering, using an alloy target manufactured by casting, under the following conditions: argon gas pressure 0.4 mTorr; and supplied power 100 W. The Curie temperature of the auxiliary recording layer 36 was 305 degrees centigrade.

The first dielectric layer 32 and the second dielectric layer 37 were made by a sputtering method using an AlSi alloy target under the following conditions: sputter gas Ar 60%+ N2 40%; gas pressure 1.7 mTorr; and supplied power 2500 W.

With this method of sequentially laminating the first dielectric layer 32, the replay layer 33, the control layer 34, the recording layer 35, the auxiliary recording layer 36, and the second dielectric layer 37 upon the surface of the transparent substrate 31, test pieces of magneto-optical recording medium were made with the film thickness of the auxiliary recording layer 36 ranging from 0 to 80 angstroms by steps of 5 angstroms, with the film thicknesses of the first dielectric layer 32, the replay layer 33, the control layer 34, the recording layer 35, and the second dielectric layer 37 being respectively 700, 400, 100, 350, and 600 angstroms; and their sensitivities to the modulation magnetic field were investigated. It should be understood that these are not actually measured film thickness values for the auxiliary recording layer 36, but are values calculated from the speed of formation of the auxiliary recording layer 36 which was measured in advance, and from the time periods for sputtering which were actually measured. Recording upon the test pieces was performed under the following conditions: linear velocity 1.4 m/s; recording frequency 1.75 mHz; recording power 6.8 mW; and modulation magnetic field ±40 Oersted. The length of the recording domains was 0.4 μm.

Figure 35:
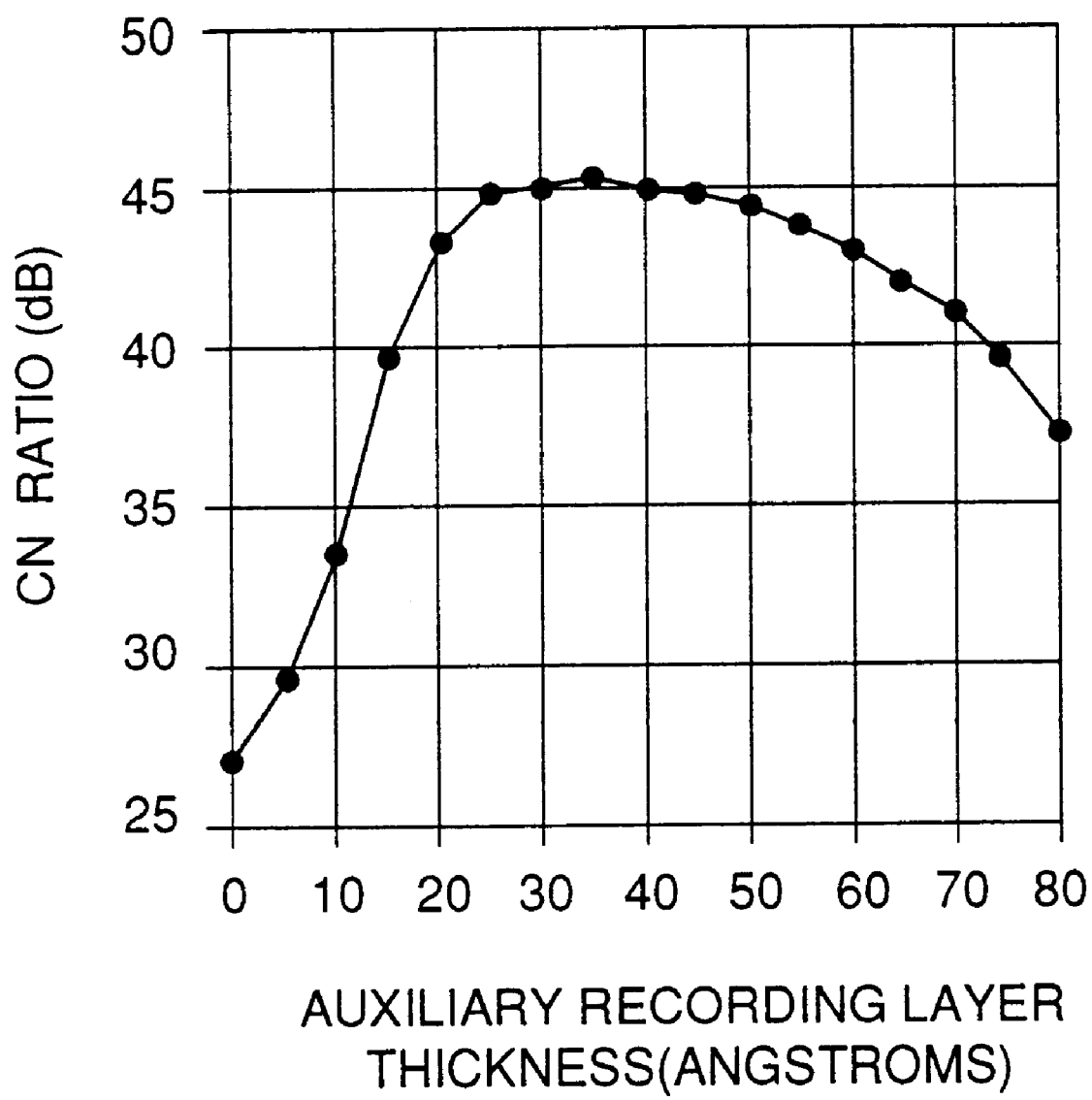
FIG. 35 is a figure showing the relationship between the film thickness of an auxiliary recording layer according to an eighteenth embodiment of the present invention and the CN ratio.

The relationship between the film thickness of the auxiliary recording layer 36 and the CN ratio is shown in FIG. 35. It will be understood that a beneficial result for improvement of the CN ratio appeared even when an extremely thin auxiliary recording layer 36 of thickness just 10 angstroms was manufactured. The CN ratio when recording was performed using a modulation magnetic field of ±40 Oersted strongly depended upon the thickness of the auxiliary recording layer 36, and a beneficial effect was observed from 15 angstroms to 70 angstroms; and in particular a remarkably great CN ratio was obtained in the range from 25 angstroms to 50 angstroms. Above 55 angstroms, the CN ratio diminished along with increase of film thickness.

Accordingly it will be understood that a high magnetic field sensitivity suitable for the magnetic super resolution method is obtained with this eighteenth embodiment as well. It should be noted that, without limitation to the structure of any of the above described embodiments, it is also possible to improve the magnetic field sensitivity for various other embodiments of media for use with the magnetic super resolution method as well, by following the theory of the present invention.

It should be noted that the present invention is not limited only to the embodiments described above, and it is possible to realize it as various other embodiments in which changes, improvements, or corrections have been supplemented. The present invention is effective even if other materials not described above are used for the recording layer. For example, it is possible to improve the characteristics of a magneto-optical recording medium by providing an auxiliary recording layer according to the theory of the present invention, even if an alloy like PtMnSb, CuCrSeBr, PtCo or PdCo, or an oxide film like Spinel ferrite ($CoFe_2O_4$) or garnet is used for the recording layer.

Although in the embodiments the recording method was described as being magnetic field modulation recording, a high CN ratio with a low magnetic field is obtained also for a magneto-optical field modulation recording method in which both the light and the magnetic field are modulated together, or for the optical modulation method known from the prior art. Accordingly it is considered that the present invention is effective over an extremely wide range.

Since with the magneto-optical recording medium of the present invention it is possible to perform recording even with a weak magnetic field, accordingly it is possible to reduce the size of the magnetic head for the magneto-optical drive, and it is possible to reduce the amount of electrical power used in the magnetic head considerably, so that the beneficial effect is obtained that the cost of the drive circuitry for the magnetic head is reduced. Furthermore, it is possible to perform recording stably even if the distance between the magnetic head and the magneto-optical recording medium varies.

What is claimed is:

1. A magneto-optical recording medium comprising a recording layer and an auxiliary recording layer having a film thickness of less than or equal to 100 angstroms, said recording layer having a composition expressed as $HRE_x(Fe_{1-y}Co_y)_{1-x}$ with HRE representing a heavy rare earth metal wherein $0.08 \leq x \leq 0.20$;

said auxiliary recording layer having a second composition different than said composition of said recording layer; and a stabilizing layer with a third composition different from said second composition and said composition of said recording layer, disposed below said recording layer wherein said stabilizing layer is thinner than said recording layer, has a higher Curie temperature than said recording layer and has a greater coercive field at room temperature than said recording layer.

2. A magneto-optical recording medium according to claim 1, characterized in that the HRE is at least one element selected from Tb, Dy, and Gd.

3. A magneto-optical recording medium according to claim 1, wherein $0.0 \leq y \leq 0.3$.

4. A magneto-optical recording medium according to claim 1, wherein $0.11 \leq x \leq 0.16$ and also $0.0 \leq y \leq 0.3$.

5. A magneto-optical recording medium according to claim 1, wherein, when the Curie temperature of said recording layer is taken as Tc1 and the Curie temperature of said auxiliary recording layer is taken as Tc2: Tc2>Tc1.

6. A magneto-optical recording medium according to claim 5, wherein: Tc2−Tc1>30K.

7. A magneto-optical recording medium according to claim 1, wherein, when the composition of said auxiliary recording layer is expressed as $HRE_v(Fe_{1-w}Co_w)_{1-v}$: $0.25 \leq v \leq 0.35$ and $0.2 \leq w \leq 1.0$.

8. A magneto-optical recording medium comprising a recording layer with a first composition and an auxiliary recording layer with a second composition having a film thickness of less than or equal to 100 angstroms, the value of the magnetization of said recording layer at room temperature being at least 150 emu/cc; and a stabilizing layer with a third composition disposed below said recording layer wherein said stabilizing layer is thinner than said recording layer, has a higher Curie temperature than said recording layer and has a greater coercive field at room temperature than said recording layer, wherein said first, second, and third compositions are different from one another.

9. A magneto-optical recording medium according to claim 8, wherein said auxiliary recording layer includes a heavy rare earth-transition metal alloy.

10. A magneto-optical recording medium according to claim 8, wherein said recording layer includes a heavy rare earth-transition metal alloy.

11. A magneto-optical recording medium according to claim 8, wherein said recording layer includes one type of magnetic multilayer film selected from among the magnetic multilayer films of Pt/Co, Pd/Co, Pt/Fe, and Au/Co.

12. A magneto-optical recording medium according to claim 8, wherein said recording layer includes one type of alloy selected from PtMnSb, CuCrSeBr, PtCo, and PdCo.

13. A magneto-optical recording medium according to claim 8, wherein said recording layer includes one or the other of the oxide films spinel ferrite and garnet.

14. A magneto-optical recording medium according to claim 8, wherein, when the Curie temperature of said recording layer is taken as Tc1 and the Curie temperature of said auxiliary recording layer is taken as Tc2: Tc2>Tc1.

15. A magneto-optical recording medium according to claim 13, wherein: Tc2−Tc1>30K.

16. A magneto-optical recording medium comprising a recording layer and an auxiliary recording layer having a film thickness of less than or equal to 100 angstroms, said recording layer having a composition expressed as $HRE_x(Fe_{1-y}Co_y)_{1-x-z}A_z$ with HRE representing a heavy rare earth metal and A representing at least one type of element selected from among Al, Ti, and Cr, and wherein: $0.08 \leq x \leq 0.20$ and also $0 \leq z \leq 0.12$;

said auxiliary recording layer having a second composition different from said composition of said recording layer; and a stabilizing layer with a third composition different from said second composition and said composition of said recording layer, disposed below said recording layer wherein said stabilizing layer is thinner than said recording layer, has a higher Curie temperature than said recording layer and has a greater coercive field at room temperature than said recording layer.

17. A magneto-optical recording medium according to claim 16, wherein $0.11 \leq x \leq 0.16$ and also $0.0 \leq z \leq 0.08$.

18. A magneto-optical recording medium according to claim 16, wherein $0.11 \leq x \leq 0.16$ and also $0.0 \leq y \leq 0.3$.

19. A magneto-optical recording medium comprising a recording layer and an auxiliary recording layer having a film thickness of less than or equal to 100 angstroms, said recording layer having a composition expressed as $HRE_x(Fe_{1-y}Co_y)_{1-x-z}B_z$ with HRE representing a heavy rare earth metal and B representing at least one type of element selected from among Pr, Nd, and Sm, and wherein: $0 \leq z \leq 0.12$;

said auxiliary recording layer having a second composition different from said composition of said recording layer; and a stabilizing layer with a third composition different from said second composition and said composition of said recording layer, disposed below said recording layer wherein said stabilizing layer is thinner than said recording layer, has a higher Curie temperature than said recording layer and has a greater coercive field at room temperature than said recording layer.

20. A magneto-optical recording medium according to claim 18, wherein $0.11 \leq x \leq 0.16$ and also $0.0 \leq z \leq 0.08$.

21. A magneto-optical recording medium according to claim 18, wherein $0.11 \leq x \leq 0.16$ and also $0.0 \leq y \leq 0.3$.

22. A magneto-optical recording medium comprising a recording layer and an auxiliary recording layer having a film thickness of less than or equal to 100 angstroms, and capable of reproducing using a magnetic superresolution method wherein with HRE representing a heavy rare earth metal, said recording layer has a composition expressed as $HRE_x(Fe_{1-y}Co_y)_{1-x}$, and $0.08 \leq x \leq 0.20$;

said auxiliary recording layer having a second composition different from said composition of said recording layer;

a reproduction layer with a third composition different from said second composition and said composition of said recording layer, disposed below said recording layer; and a control layer with a fourth composition different from said second composition, said composition of said recording layer and said third composition, disposed on said reproduction layer.

23. A magneto-optical recording medium according to claim 22, wherein $0.11. \leq x \leq 0.16$ and also $0.0 \leq y \leq 0.3$.

24. A magneto-optical recording medium according to claim 22, wherein the value of the magnetization of said recording layer at room temperature is at least 150 emu/cc.

25. A magneto-optical recording medium according to claim 22, wherein, when the composition of said auxiliary recording layer is expressed as $HREv(Fe1-wCow)1-v$: $0.25 \leq v \leq 0.35$ and $0.2 \leq w \leq 1.0$.

26. A disk storage device including a magneto-optical recording medium comprising a recording layer and an auxiliary recording layer having a film thickness of less than or equal to 100 angstroms, said recording layer having a composition expressed as $HRE_x(Fe_{1-y}Co_y)_{1-x}$ with HRE representing a heavy rare earth metal wherein $0.08 \leq x \leq 0.20$;

said auxiliary recording layer having a second composition different from said composition of said recording layer; and a stabilizing layer with a third composition different from said second composition and said composition of said recording layer, disposed below said recording layer wherein said stabilizing layer is thinner than said recording layer, has a higher Curie temperature than said recording layer and has a greater coercive field at room temperature than said recording layer.

27. A disk storage device including a magneto-optical recording medium comprising a recording layer with a first composition and an auxiliary recording layer with a second composition having a film thickness of less than or equal to 100 angstroms, the value of the magnetization of said recording layer at room temperature being at least 150 emu/cc; and a stabilizing layer with a third composition disposed below said recording layer wherein said stabilizing layer is thinner than said recording layer, has a higher Curie temperature than said recording layer and has a greater coercive field at room temperature than said recording layer, wherein said first, second, and third compositions are different from one another.

* * * * *